(12) United States Patent
Tabuchi

(10) Patent No.: US 7,587,112 B2
(45) Date of Patent: Sep. 8, 2009

(54) OPTICAL DEVICE AND LIGHT CONTROL METHOD

(75) Inventor: Haruhiko Tabuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 864 days.

(21) Appl. No.: 11/076,308

(22) Filed: Mar. 10, 2005

(65) Prior Publication Data

US 2006/0104181 A1    May 18, 2006

(30) Foreign Application Priority Data

Nov. 12, 2004   (JP) .............................. 2004-328933

(51) Int. Cl.
| | |
|---|---|
| G02B 6/10 | (2006.01) |
| G02B 6/12 | (2006.01) |
| G02B 6/26 | (2006.01) |
| G02B 6/28 | (2006.01) |
| G02B 6/32 | (2006.01) |
| G02B 6/34 | (2006.01) |
| H04B 10/00 | (2006.01) |
| H04B 10/08 | (2006.01) |
| H04J 14/02 | (2006.01) |
| G11B 7/135 | (2006.01) |

(52) U.S. Cl. .................... 385/129; 385/14; 385/15; 385/24; 385/31; 385/32; 385/33; 385/34; 385/37; 385/130; 385/131; 385/132; 398/1; 398/9; 398/79; 398/84; 398/88; 398/118; 398/128; 398/130; 369/112.01; 369/112.06; 369/112.08; 369/112.11; 369/112.13

(58) Field of Classification Search ............ 385/14, 385/15, 24, 31–34, 37, 129–132; 398/1, 398/9, 79, 84, 88, 118, 128, 130
See application file for complete search history.

(56) References Cited

U.S. PATENT DOCUMENTS

| | | | |
|---|---|---|---|
| 6,108,471 A | 8/2000 | Zhang et al. .................. 385/37 |
| 6,204,946 B1 | 3/2001 | Aksyuk et al. ............... 359/131 |
| 6,263,127 B1 | 7/2001 | Dragone et al. ................ 385/24 |
| 6,501,877 B1 | 12/2002 | Weverka et al. ............... 385/31 |
| 6,549,699 B2 | 4/2003 | Belser et al. ................... 385/24 |
| 6,671,428 B1 | 12/2003 | Yang et al. ..................... 385/18 |
| 7,116,851 B2 * | 10/2006 | Welch et al. ................... 385/14 |
| 7,236,660 B2 * | 6/2007 | Ducellier et al. .............. 385/24 |
| 2003/0053750 A1 * | 3/2003 | Yang et al. ..................... 385/27 |
| 2004/0151432 A1 * | 8/2004 | Tabuchi et al. ................ 385/37 |

FOREIGN PATENT DOCUMENTS

| | | |
|---|---|---|
| JP | 2000-347065 | 12/2000 |
| JP | 2003-515187 | 4/2003 |

* cited by examiner

*Primary Examiner*—Brian M. Healy
*Assistant Examiner*—Hung Lam
(74) *Attorney, Agent, or Firm*—Staas & Halsey LLP

(57) ABSTRACT

In order to prevent a spectrum of a wavelength channel from becoming narrower, a device according to the present invention includes a light dividing section capable of dividing a wavelength spectrum in an input light beam and outputting a plurality of divided light beams, which are spatially separated and have wavelength spectrum portions different from each other, and a wavelength-to-special-position-converter capable of spatially multiplexing the wavelength spectrum portions of the plurality of divided light beams from the light dividing section.

33 Claims, 40 Drawing Sheets

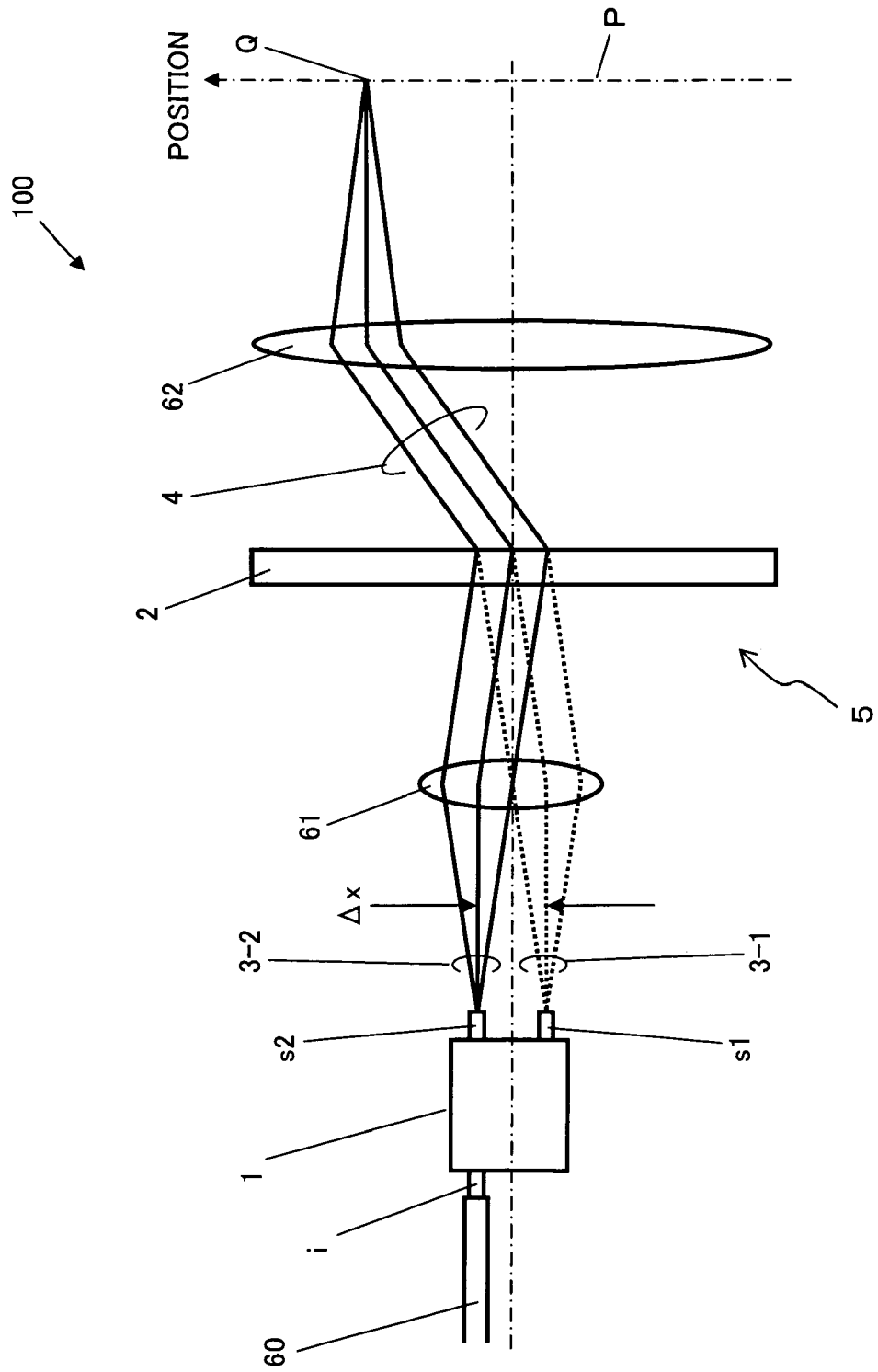

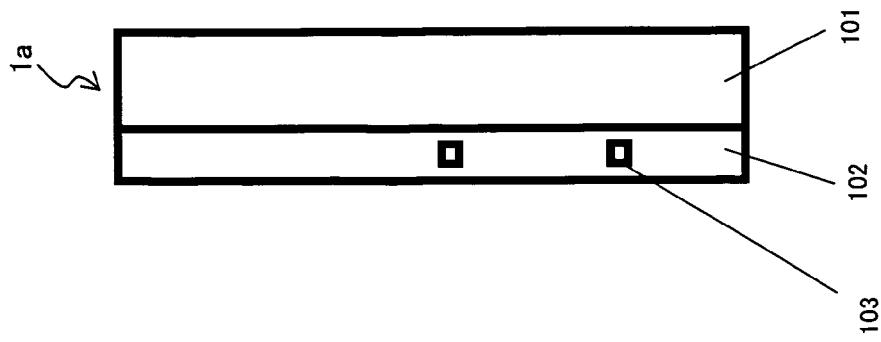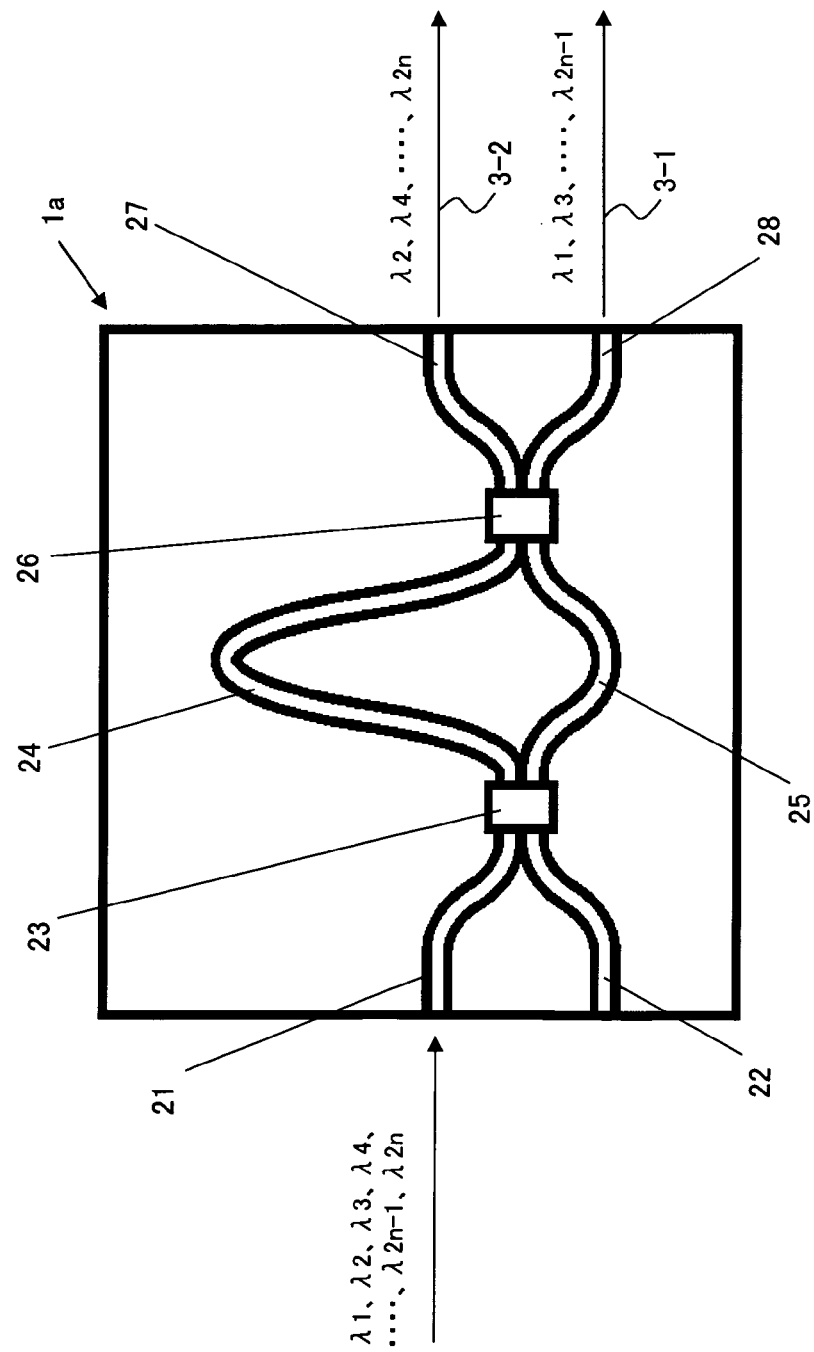

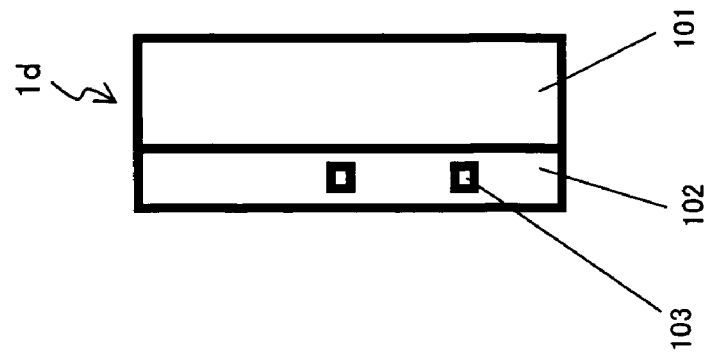
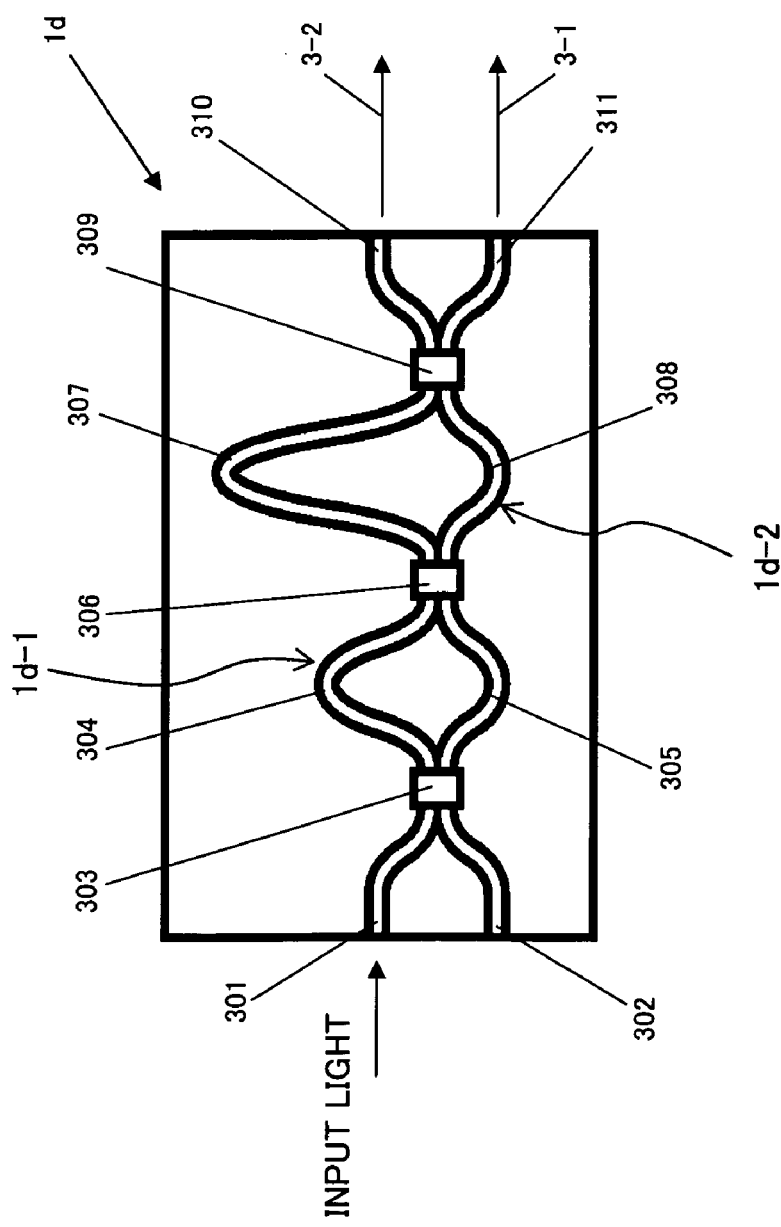

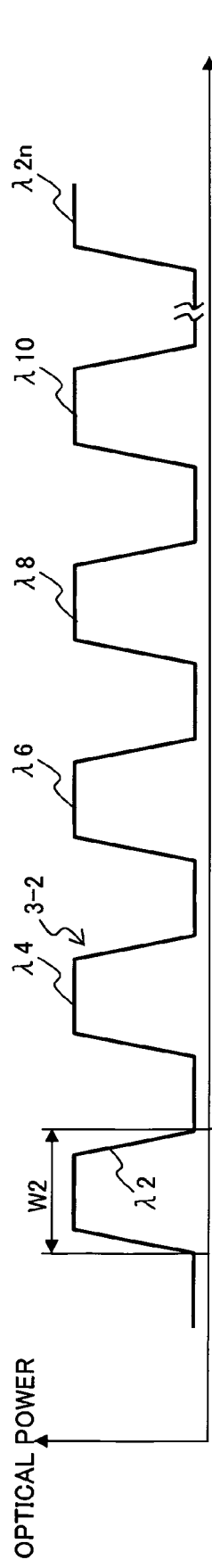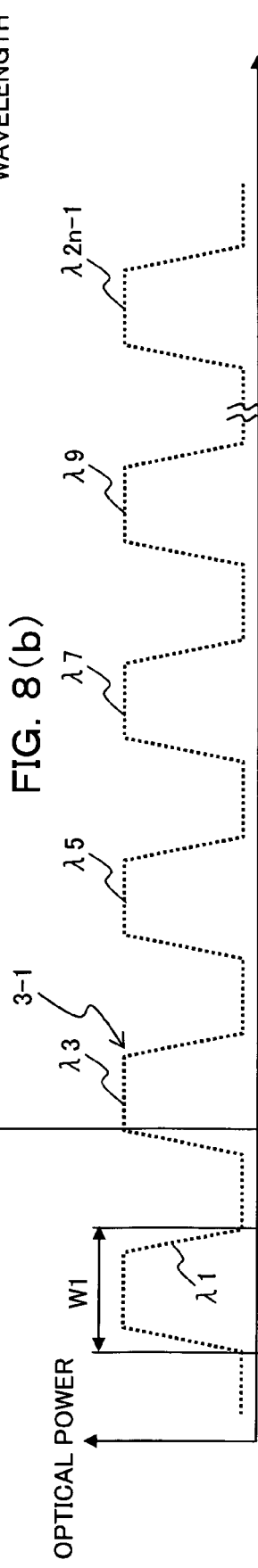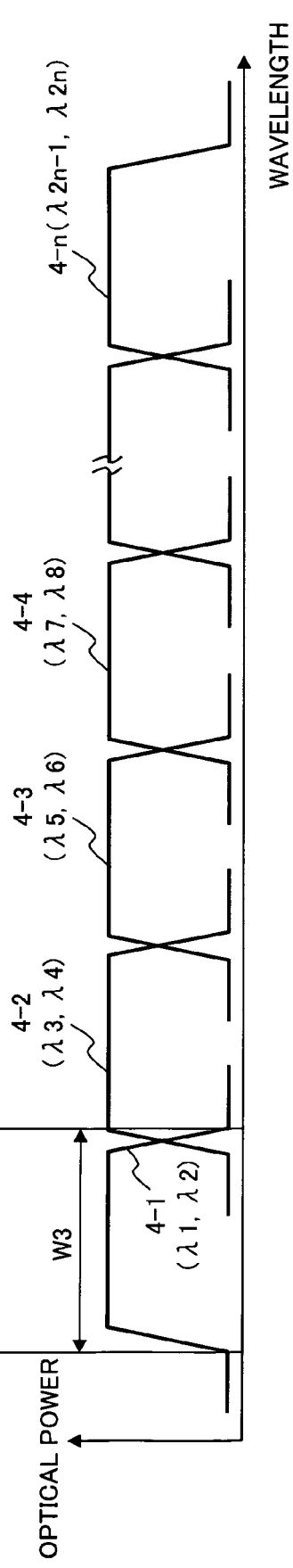

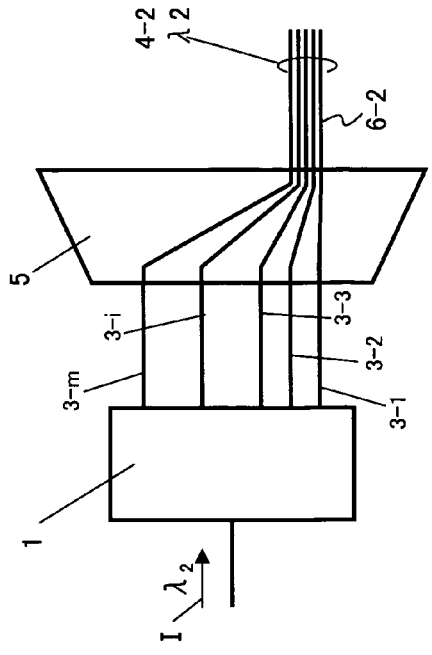
FIG. 9(a)
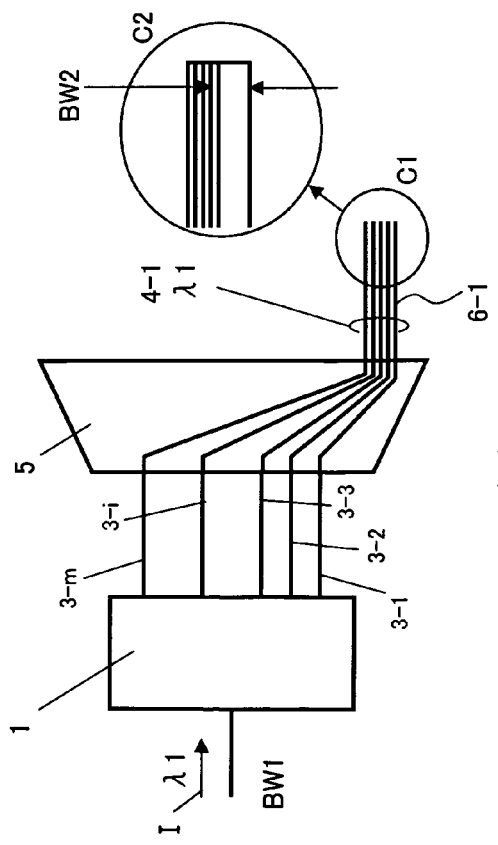
FIG. 9(b)
FIG. 9(c)
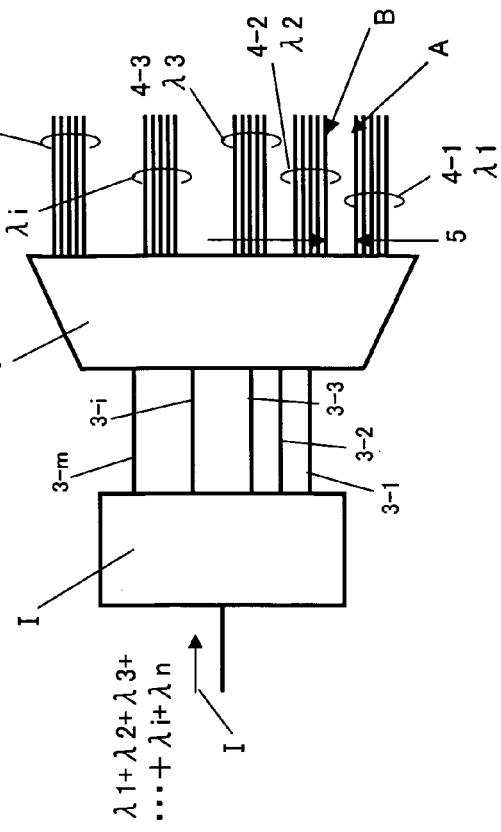
FIG. 9(d)

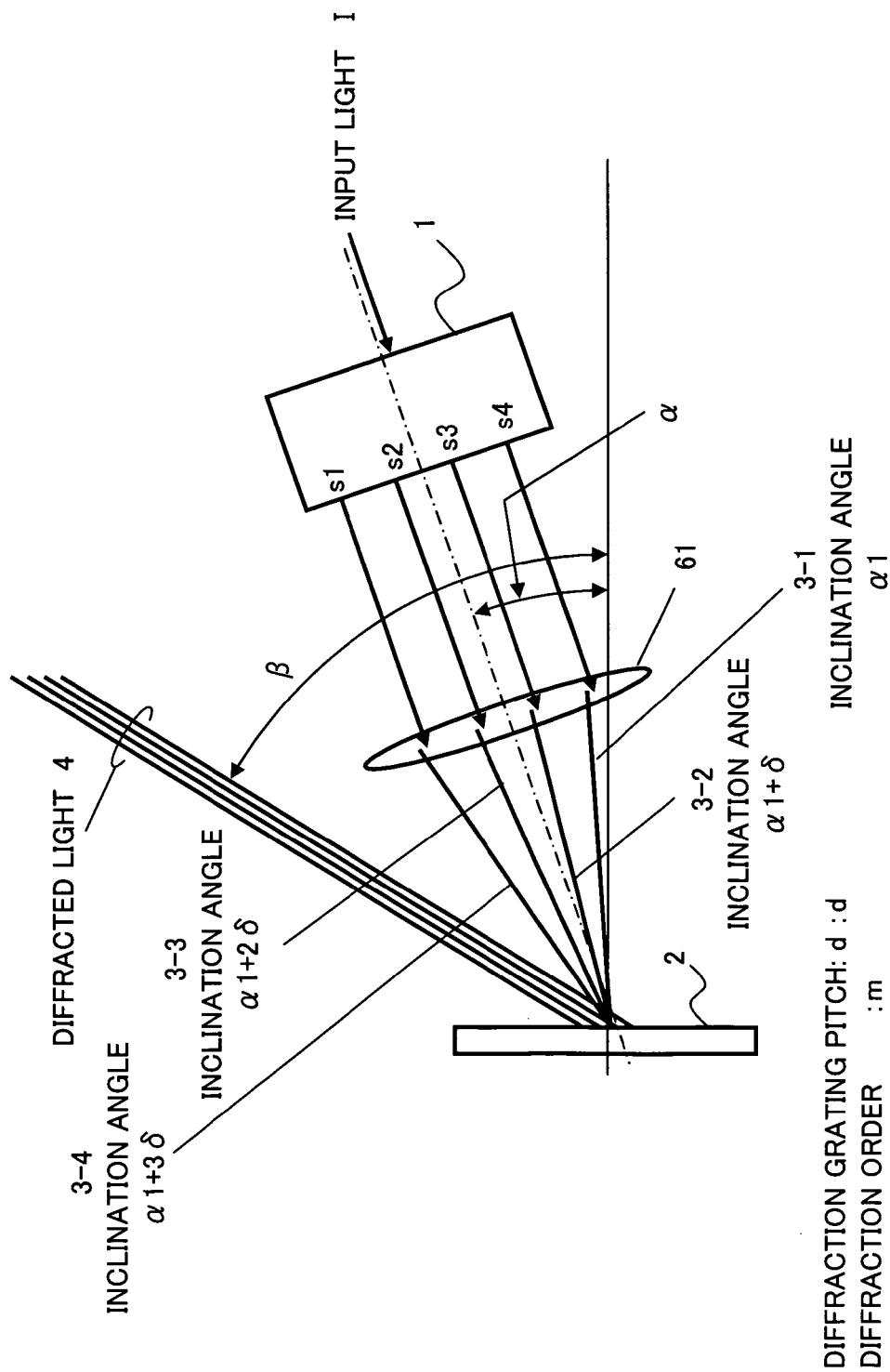

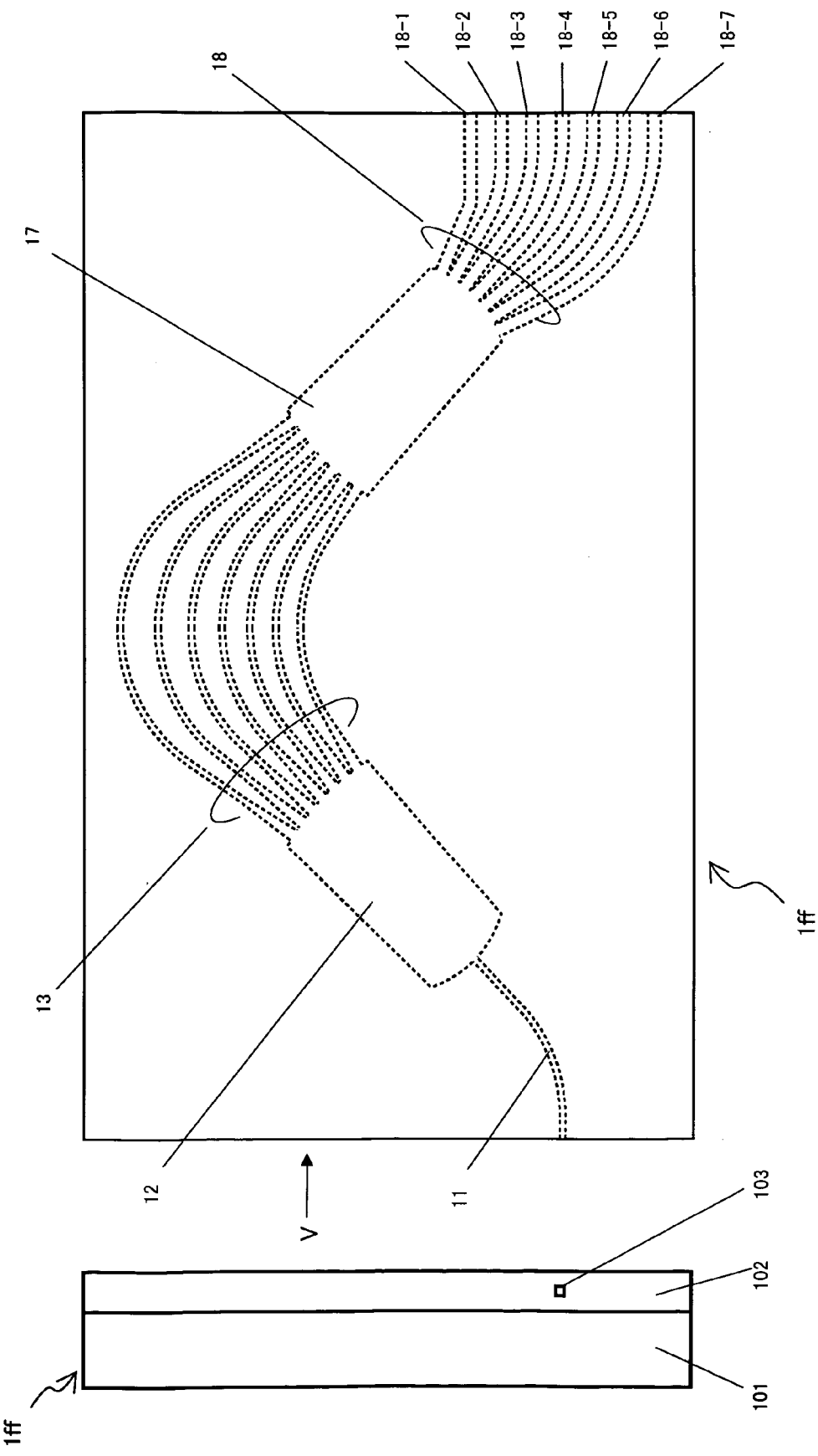

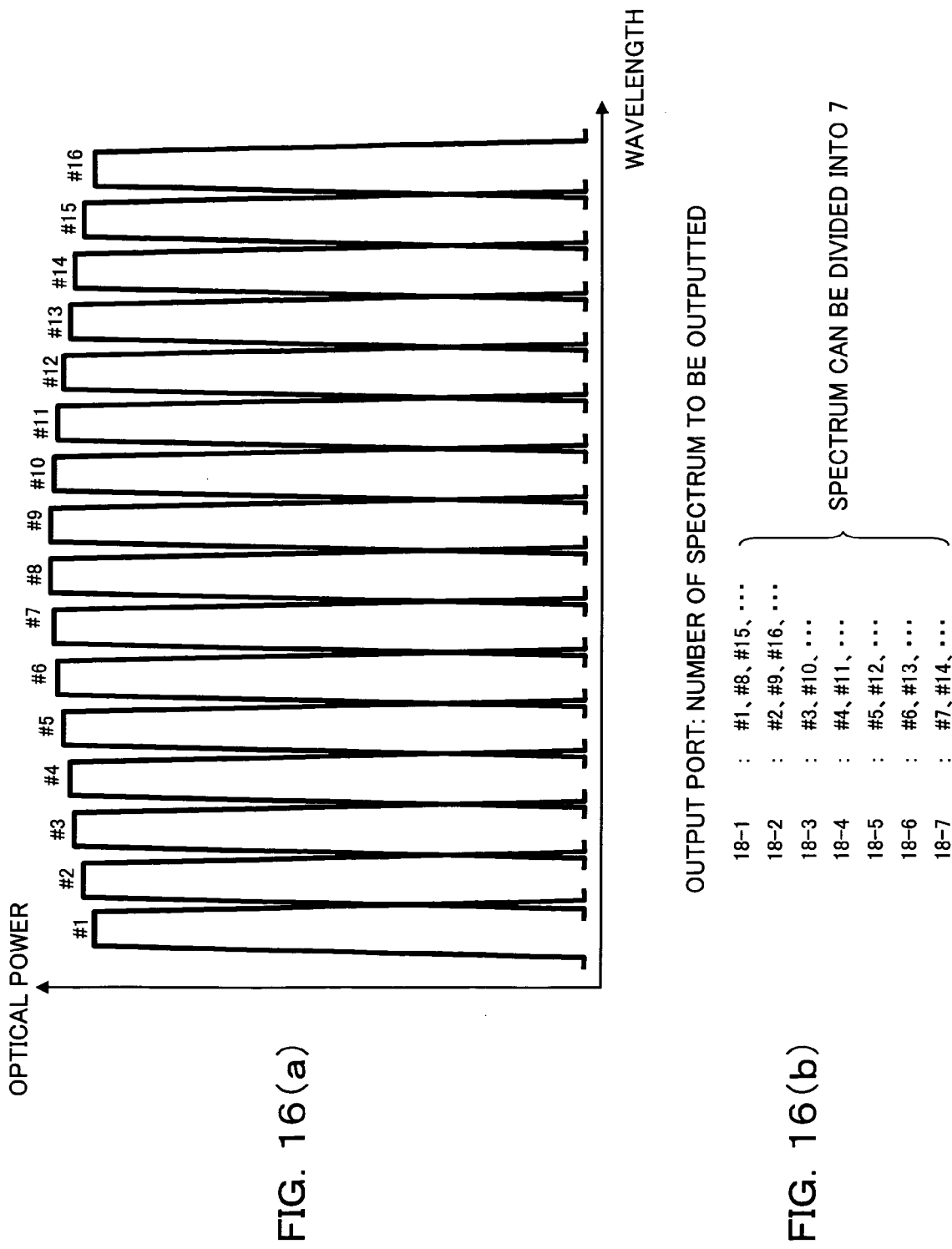

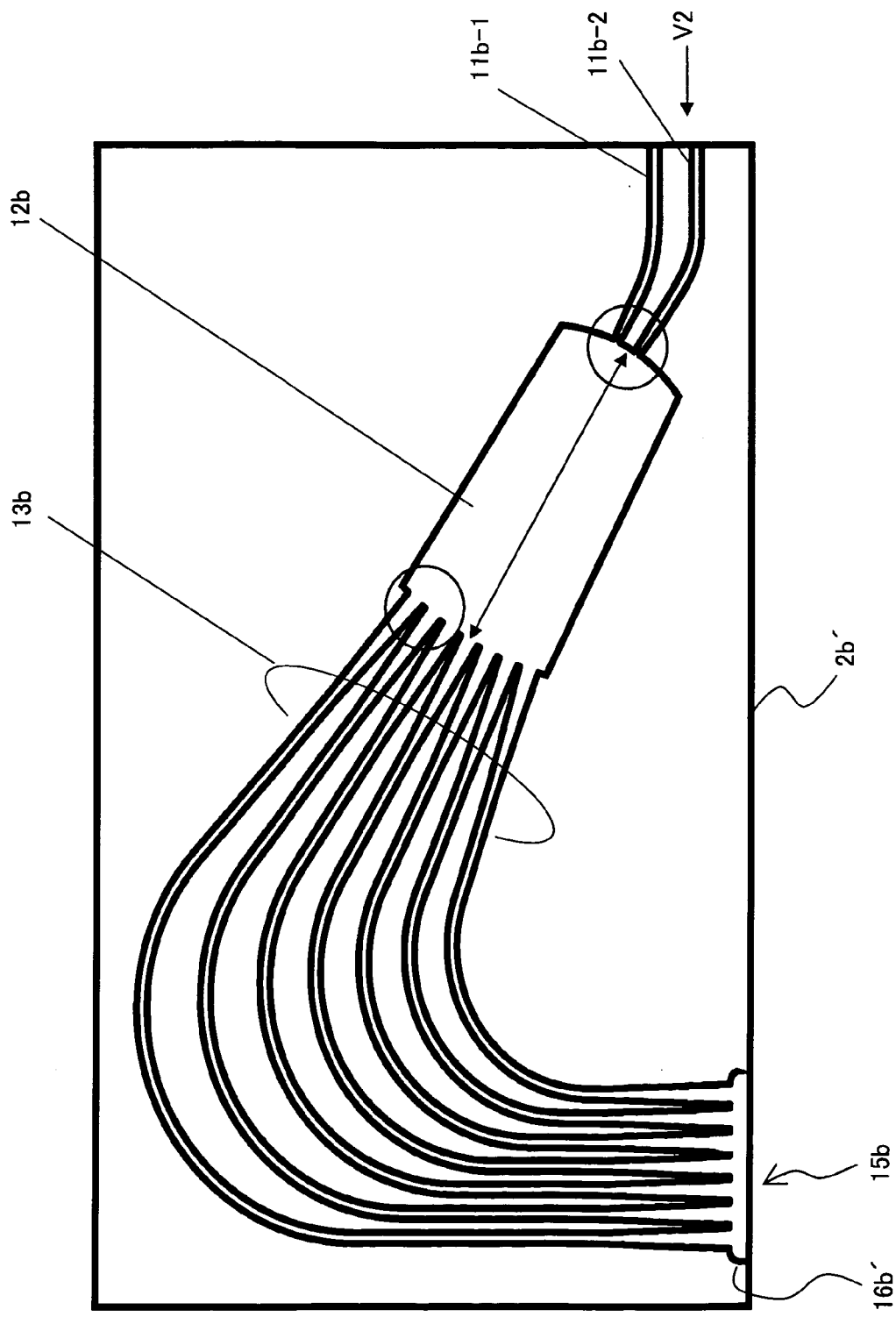

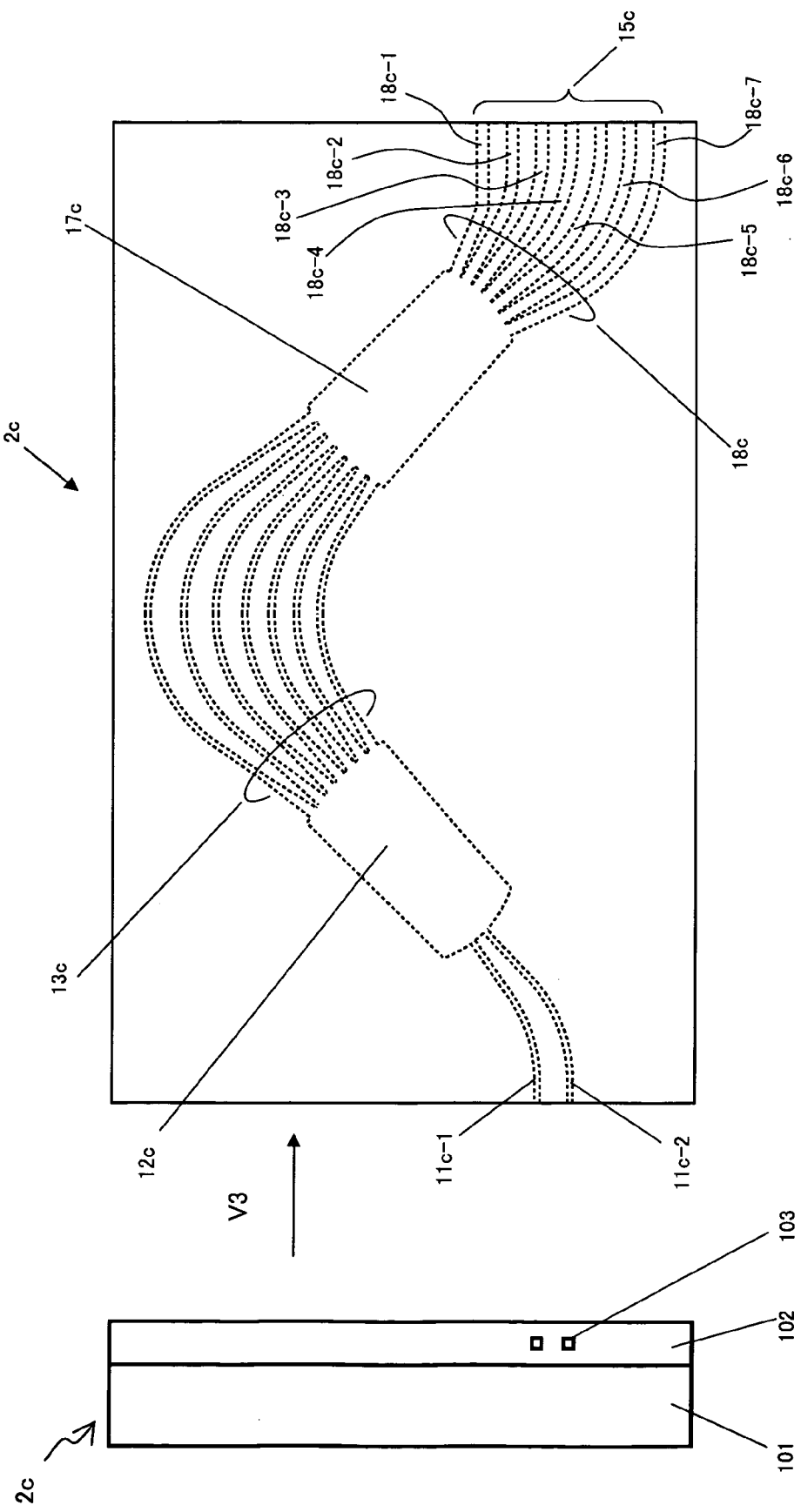

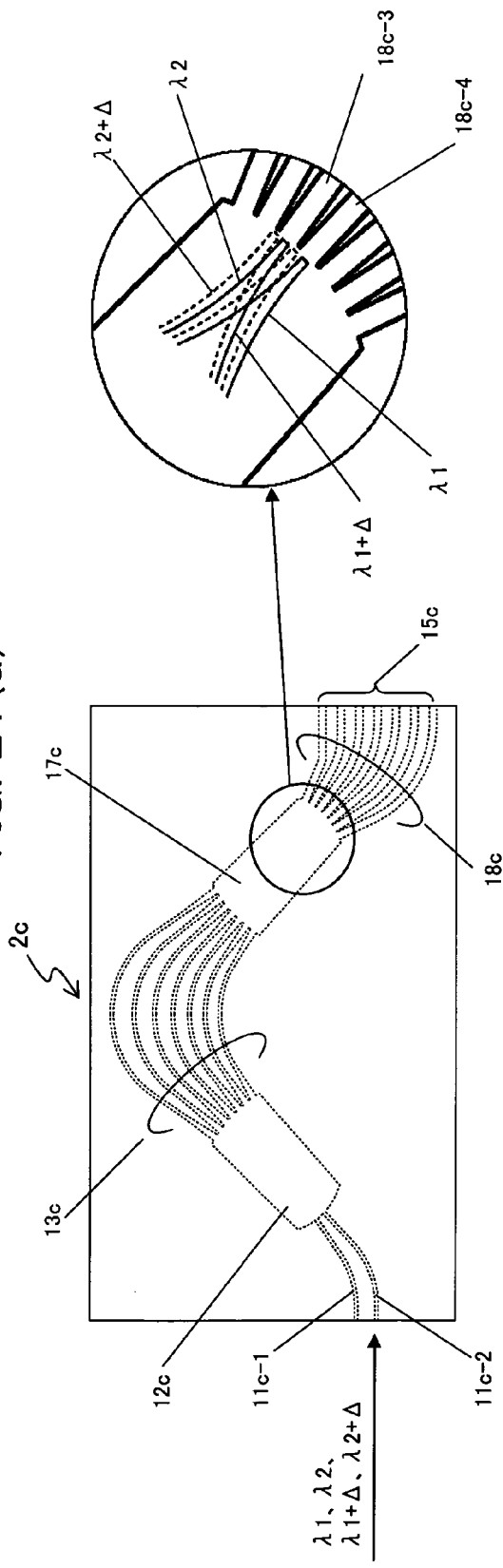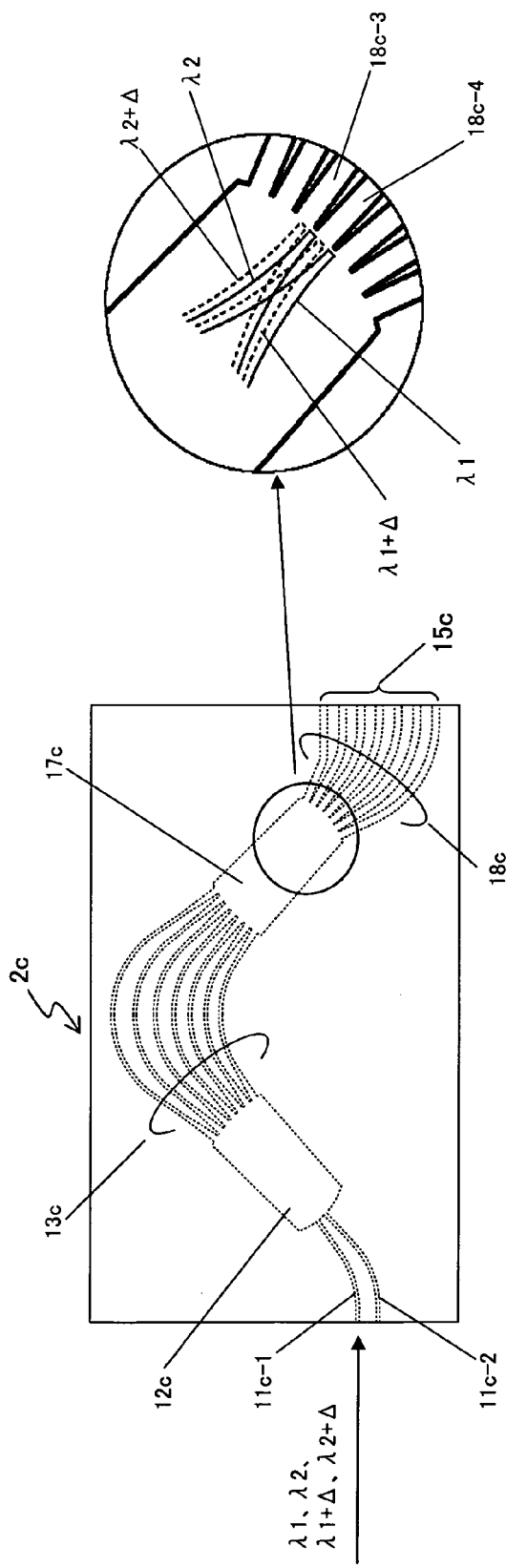

OPTICAL DEVICE AND LIGHT CONTROL METHOD

BACKGROUND OF THE INVENTION

1) Field of the Invention

The present invention relates to an optical device and a light control method suitably used in a field of optical communication, particularly to an optical device and a light control method suitably used in a wavelength division multiplexing communication system.

2) Description of the Related Art

In a network of wavelength division multiplexing (WDM) communication, a plurality of nodes are disposed in a mesh-like state, and in each of the nodes, and it is arranged so that wavelength-division multiplexed light beam is separated based on the wavelength, and set up which node other than its own should be connected based on the wavelength; thereby, light paths based on the wavelength for connecting two specific nodes can be set up freely. Owing to this, the net configuration of a mesh-like network can be changed freely.

By employing the light path based on the wavelength, which is set up as described above, the following problems are eliminated; i.e., time delay necessary for converting the light beam into electricity once to read the signals and converting the signals into the light beam again; decrease of through-put due to the limitation of speed in electrical processing; necessity to select a decoder due to difference in decoding method; and further necessity of providing an expensive decoder for decoding the signals encoded with a deep code and soon. Hereinafter, the device, which is used for switching the light path used in a node as described above, will be referred to as "wavelength selection switch".

In the node, which is disposed in a network of the WDM communication, in addition to the function as described above for switching the light path based on the wavelength, the following functions are also further required; i.e., to separate wavelength-division multiplexed light beam based on the wavelength; to measure the optical power thereof; to control the optical power to a specific value; and to detect faults such as fiber break or the like.

As for the configuration of a wavelength-dividing filter for separating wavelength-division multiplexed light beam based on the wavelength as described above, there are, for example, such configuration in which diffraction grating type wavelength dividing filter and periphery optical system are combined set forth in the patent documents 1 to 4 listed below, or such configuration, in which a diffraction grating type wavelength dividing filter and a periphery optical system are combined set forth in the patent documents 5 and 6.

Patent documents 1 to 4 respectively disclose a wavelength-dividing filter in which a reflective diffraction grating and a periphery optical system are combined. Patent documents 5 and 6 respectively disclose a wavelength-dividing filter in which a transmissive diffraction grating named as VPG (Volume Phase Grating) as a diffraction grating and a periphery optical system are combined. Difference between the filters disclosed in these patent documents 1 to 4 and the filters disclosed in the patent documents 5 and 6 is only a point that the diffraction grating is a reflective type or a transmissive type; thus there is no substantially significant difference.

FIG. 40 schematically illustrates the configuration of a wavelength-dividing filter set forth in the above-mentioned patent documents 1 to 6 being simplified along with basic elements of the periphery optical system. The wavelength-dividing filter shown in FIG. 40 includes a wavelength dividing filter (dividing section) 500-1, a light control section 7 and a multiplexing section (multiplxer) 500-2.

The dividing section 500-1 being the wavelength-dividing filter 500-1 is formed of a diffraction grating and the like as a primary member, and separates an input light beam (input light) 4a to spatially continuous spectrums (light to be used) 4b. That is, the dividing section 500-1 divides the input light beam 4a into the spectrums 4b in which wavelength component is sequentially distributed from the shorter wavelength to the longer wavelength corresponding to the outputted position.

The light control section 7 includes a plurality of optical elements 7-1 to 7-n (in FIG. 40, 5 optical elements 7-1 to 7-5) disposed in parallel that performs control processing on each of the partial wavelength spectrum component with respect to the light beam divided by the dividing section 500-1. The optical elements 7-1 to 7-n may be formed of, for example, a mirror having limited widths or a light-attenuating element having a specific opening.

For example, as shown as an example in FIG. 40, as the optical elements 7-1 to 7-n, light attenuating elements having specific openings are employed, and light beams only that have been filtered out through the light control section 7 are multiplexed again by the multiplexing section 500-2, and being connected to an unshown optical fiber, a WDM light beam (wavelength-division multiplexed light beam) in which the optical power is adjusted is obtained. That is, the light beam within a specific spectrum space in the light beam 4a having a spectrum of which wavelength component has been spatially separated by the dividing section 500-1 can be adjusted in the intensity of transmitted light beam by the optical elements 7-1 to 7-n as the light attenuating elements.

Or, mirrors may be employed as the optical elements 7-1 to 7-n, thereby the light beam is caused to be reflected in a plurality of directions, multiplexed by a plurality of multiplexers 500-2, and connected to a plurality of unshown optical fibers. Thus, the light beam outputted from one optical fiber can be arbitrary inputted to a plurality of other optical fibers based on the wavelength. Accordingly, the mirrors can be caused to function as optical switches (wavelength selection switches) that allow the light beam separated based on the wavelength to propagate in specific directions.

In FIG. 40, a transmissive type optical model is shown as an example. When the dividing section 500-1 and multiplexing section 500-2 are optically connected to each other by the light control section 7 as the mirror, an optical model substantially the same as that shown in FIG. 40 can be configured.

Furthermore, when the above-described optical elements 7-1 to 7-n are configured using photoelectric transfer elements that convert the received light into electrical signals, the light beam, which has been wavelength-divided by the dividing section 500-1, can be monitored to detect faults such as fiber break.

(Patent document 1): Japanese Patent Laid-Open(Kokai) No. 2000-347065

(Patent document 2): Published application Japanese translation of PCT No. 2003-515187

(Patent document 3): U.S. Pat. No. 6,204,946

(Patent document 4): U.S. Pat. No. 6,549,699

(Patent document 5): U.S. Pat. No. 6,108,471

(Patent document 6): U.S. Pat. No. 6,671,428

However, in the above-described example shown in FIG. 40, there reside gaps 7G between the optical elements 7-1 to 7-n constituting mirrors or the like as described above, which are hardly eliminated. Even the light beams divided by dividing section 500-1, the light beams 4c located at the portions of these gaps 7G cannot enter the light control section 7 resulting in unusable light beam (invalid light) 4c. Therefore, there resides such a problem that, compared to the light beam 4a which has been divided by the dividing section 500-1, the waveband of the spectrum of the light beams (light to be used) 4b, which is received by the light control section 7 and utilized, apart thereof is lost. That is, there resides such problem that the spectrum of the wavelength channel is substantially reduced.

Since a part of the spectrum of the light beam, which is received by the above-described light control section 7 and utilized, is lost, such a problem resides in; i.e., a defect is caused in the flatness of the transmission loss characteristics with respect to the wavelength of the waveband in the light beam outputted from the light control section 7.

SUMMARY OF THE INVENTION

In view of the above-mentioned problems, the present invention has been proposed. An object of the present invention is to provide an optical device and a light control method, which are capable of reducing light beam positioned at gap portions among optical elements for control processing of wavelength spectrum components, which are divided based on wavelength, and preventing the spectrum of the wavelength channel from becoming narrower.

Another object of the present invention is to provide an optical device and a light control method capable of improving the evenness of the transmission loss characteristics with respect to the wavelength of spectrum.

In order to achieve the above objects, an optical device according to the present invention comprises a light dividing section capable of dividing a light beam having a first waveband into a plurality of second waveband; and a wavelength-to-spatial-position-converter capable of converting said light beams having a first waveband and second wavebands into spacially spread light beams; wherein said light beam having a first waveband is a channel waveband of wavelength division multiplexing optical transport system; said spatially spread light beams are spread so that the spacially position occupied by a component of said spread light beams and a wavelength component of said light beams are correlated, and spacially width occupied by a light beam is propotional to the width of the wavelength range included said light beam; and said light dividing section and said wavelength-to-spatial-position-converter are arranged so that sum of the spacially width occupied by said a plurality of light beam having second wavebands are narrower than the spatially width occupied by said light beam having a first waveband.

Also, the light dividing section may be preferably comprised of a flat optical circuit. Further, the flat optical circuit may be comprised of an asymmetric Mach-Zehnder interferometer.

The asymmetric Mach-Zehnder interferometer includes two directional couplers combined by two waveguide arms with different length, as shown in FIG. 2a. This Mach-Zehnder interferometer can works as a light divider for the light dividing section of present invention. It is to be noted that a practical configuration and manufactureing example of the asymmetric Mach-Zehnder interferometer are described in the document Doc-1.

Doc-1: Journal of Lightwave Technology, vol. 6, No. 6, pp. 1003-1010 (1988)

Furthermore, the flat optical circuit may be comprised of a plurality of Mach-Zehnder interferometers being connected to each other in series, which determines phase of interfering light beam and have two branch guides of which length is different from each other. Or, the flat optical circuit may be comprised of an array guide grating.

It is to be noted that the flat optical circuit is light guide device including a flat substrate, a clad formed on the substrate and a core having a refractive index higher than that of the clad, which is formed being embedded in the clad. A practical configuration and manufacturing example of the flat optical circuit are described in the document Doc-1.

In the above-mentioned optical device, the wavelength-to-spacial-position-converter may include an optical diffraction section of which diffraction direction changes depending on the inputting method and the light wavelength of the light beam, and the optical diffraction section may be arranged so that the plurality of divided light beams from the light dividing section are diffracted thereby the light beams in which each of the wavelength spectrum portions is spatially multiplexed are outputted therefrom.

In this case, the optical diffraction section may be formed as an incident-angle dependent light diffraction section in which, as the inputting method of the light beam, the diffraction direction changes depending on the incident angle of the light beam, and arranged so as to output the light beams, in which, owing to the diffraction in the incident-angle dependent light diffraction section, each of the wavelength spectrum portions with respect to the plurality of divided light beams from the light dividing section is multiplexed.

Further, the incident-angle dependent light diffraction section may include a diffraction grating, which is formed in a substantially flat plate shape having two primary faces, for causing the diffraction direction to change depending on the incident angle of the light beam with respect to the primary face under the wavelength of the incident light being fixed, and a first lens for guiding the plurality of divided light beams from the light dividing section to the diffraction grating at an incident angle arranged for each of the plurality of divided light beams.

In this case, the diffraction grating may be comprised of a ruled diffraction grating.

Further, the optical diffraction section constituting the wavelength-to-spacial-position-converter may be preferably formed as an incident-position dependent light diffraction section in which, as the light inputting method, the diffraction direction changes depending on the incident-position of the light beam, and arranged so as to output the light beams, in which, owing to the diffraction in the incident-position dependent light diffraction section, each of the wavelength spectrum portions with respect to the plurality of divided light beams from the light dividing section is multiplexed.

In this case, the incident-position dependent light diffraction section may be comprised of a flat light guide device, which includes a flat substrate and is comprised of a clad formed on the substrate and a core having a refractive index higher than that of the clad, and the pattern of the core comprises an input light guide pattern portion comprised of a plurality of guide patterns formed corresponding to the number of the divided light beams, of which core section is exposed at the end surface position to which a plurality of divided light beams spatially divided by the light dividing section is guided; an input slab pattern portion of which one end is formed continuously with the input light guide pattern portion so as to allow the light beams from the input light guide pattern portion to propagate freely while spreading being diffracted, and the other end thereof has an arc pattern around the portion continuing with the input light guide pattern portion; and a channel guide pattern portion comprised of a plurality of guide patterns disposed in parallel, which continues with the other end of the input slab pattern portion so that the length thereof changes sequentially, and the end portion opposite to the input slab pattern portion in the channel guide pattern portion is arranged so as to be disposed linearly at predetermined clearance with the core section being exposed so that the light beams of which diffraction direction is changed are output from the core section in the channel guide pattern portion.

Or, the incident-position dependent optical circuit may be comprised of a flat light guide device, which includes a flat substrate and is comprised of a clad formed on the substrate and a core having a refractive index higher than that of the clad, and the pattern of the core comprises an input light guide pattern portion comprised of a plurality of guide patterns formed corresponding to the number of the divided light beams, of which core section is exposed at the end surface position to which a plurality of divided light beams spatially divided by the light dividing section is guided; an input slab pattern portion of which one end is formed continuously with the input light guide pattern portion so as to allow the light beam from the input light guide pattern portion to propagate freely while spreading being diffracted, and the other end thereof has an arc pattern; an output guide pattern portion comprised of a plurality of guide patterns of which core section is exposed at the output end face; an output slab pattern portion of which one end is formed continuously with the output light guide pattern portion so as to allow the light beam from the output light guide pattern portion to propagate freely while spreading being diffracted, and the other end thereof has an arc pattern; and a channel guide pattern portion which connects the arc pattern portion of the input slab pattern portion and the arc pattern portion of the output slab pattern portion and is comprised of a plurality of guide patterns disposed in parallel so that the length thereof changes sequentially, and the plurality of divided light beams are input to the input light guide pattern portion and the light beams in which each of the wavelength spectrum portions with respect to the plurality of divided light beams from the light dividing section is multiplexed through the output guide pattern portion is outputted therefrom.

Further, a portion for containing a gas may be formed between a plurality of guide patterns constituting the output guide pattern portion. In this case, it may be arranged so that a groove is formed between a plurality of guide patterns constituting the output guide pattern portion, a plurality of cores as the guide patterns constituting the output guide pattern portions are exposed, a gas is embedded in the clad between a plurality of guide patterns constituting the output guide pattern portion.

Also, the portion constituting the output guide pattern portion may be formed in an element separately from the other portion constituting the flat light guide device, and the separate element is connected being bonded to the other portion.

In this case, a plurality of the wavelength spectrum portions constituting each of the divided light beams with a bandwidth of a second waveband may be included leaving a first waveband clearance, and the first waveband in each of the divided light beams is allotted in accordance with the second waveband in the plurality of divided light beams. Further, the wavelength spectrum multiplexing section may be arranged so as to output the light beams constituting the wavelength spectrum portions to be multiplexed as a plurality of wavelength-separated light beams provided with spatial clearance.

Also, the optical device according to the present invention includes a light dividing section capable of dividing wavelength spectrum in input light and outputting a plurality of divided light beams spatially separated from each other, each having a wavelength spectrum portion different from each other, and a wavelength spectrum portion multiplexing section capable of spacially multiplexing the wavelength spectrum portions with respect to said plurality of divided light beams from said light dividing section, wherein: each of said divided light beams include a plurality of the wavelength spectrum portions each of which has a bandwidth of second waveband and is distributed at interval of a first waveband, and the first waveband is allotted in accordance with the second waveband; said wavelength spectrum portion multiplexing section is arranged so as to output the light beams which are the result of said spacially multiplexing of the wavelength spectrum portions, with providing spatial clearance corresponding to the number of the second wavebands; and a plurality of optical elements for processing the light beams constituting said wavelength spectrum portions spatially multiplexed by said wavelength spectrum portion multiplexing section is provided corresponding to the number of the second wavebands constituting said multiplexed wavelength spectrum portions.

In this case, a clearance-adjusting element capable of adjusting the spatial clearance between the light beams constituting the wavelength spectrum portions multiplexed by the wavelength spectrum portion multiplexing section may be preferably provided. Further, the clearance-adjusting element may be preferably comprised of a lens disposed behind the wavelength spectrum multiplexing section.

Or, the clearance-adjusting element may be comprised of a light guide device disposed behind the wavelength spectrum multiplexing section.

Further, the optical element may be preferably comprised of a light-reflecting element capable of reflecting the light beams constituting wavelength spectrum portions multiplexed by the wavelength spectrum portion multiplexing section and varying the inclination angle with respect to the reflecting surface.

Further, the optical element may be comprised of a transmission light variable element capable of varying transmission light intensity with respect to the light beams constituting wavelength spectrum portions multiplexed by the wavelength spectrum portion multiplexing section, and the optical element may be comprised of a photoelectric transfer element for performing photoelectric transfer with respect to the light beams constituting wavelength spectrum portions multiplexed by the wavelength spectrum multiplexing section.

Also, the optical device according to the present invention includes a first and a second optical modules, each of which includes a light dividing section capable of dividing wavelength spectrum in input light beam and outputting a plurality of divided light beams spatially separated from each other, each having a wavelength spectrum portion different from each other, and a wavelength spectrum portion multiplexing section capable of spatially multiplexing the wavelength spectrum portions with respect to the plurality of divided light beams from the light dividing section, disposed being faced to each other so that the divided light beams outputted from the wavelength spectrum portion multiplexing section in one of the first and second optical modules are optically connected to the other wavelength spectrum portion multiplexing section, wherein a plurality of the wavelength spectrum portions constituting each of the divided light beams with a bandwidth of a second waveband are included leaving a first waveband clearance, the first waveband in each of the divided light beams is allotted in accordance with the second waveband in the plurality of divided light beams, and the optical device further comprises a plurality of optical elements for processing the light beams constituting the wavelength spectrum portions, which are spatially multiplexed by the wavelength spectrum portion multiplexing section, is provided on light paths between the optically connected wavelength spectrum portion multiplexing sections corresponding to the number of the second wavebands constituting the multiplexed wavelength spectrum portion.

Further, the optical device of the present invention includes a plurality of optical modules each of which including a light dividing section capable of dividing wavelength spectrum in input light beam and outputting a plurality of divided light beams spatially separated from each other, each having a wavelength spectrum portion different from each other, and a wavelength spectrum portion multiplexing section capable of spatially multiplexing the wavelength spectrum portions with respect to the plurality of divided light beams from the light dividing section, wherein a plurality of the wavelength spectrum portions constituting each of the divided light beams with a bandwidth of a second waveband are included leaving a first waveband clearance, the first waveband in each of the divided light beams is allotted in accordance with the second waveband in the plurality of divided light beams, and the optical device further comprises a plurality of reflecting members, which are capable of reflecting the light beams constituting the wavelength spectrum portions spatially multiplexed by the wavelength spectrum portion multiplexing section constituting each of the optical modules corresponding to the number of the second wavebands constituting the multiplexed wavelength spectrum portion and varying the inclination angle of the reflecting surface, are provided; wherein the plurality of reflecting members are arranged so as to vary the inclination angle with respect to the reflecting surface so that light beams constituting wavelength spectrum portions from the wavelength spectrum portion multiplexing section constituting one optical module are guided to wavelength spectrum portion multiplexing section constituting the other optical module.

Further, a light control method according to the present invention includes the steps of dividing wavelength spectrum in input light beam to output as a plurality of divided light beams having wavelength spectrum portions different from each other; and multiplexing and outputting each of the wavelength spectrum portions with respect to the plurality of divided light beams.

Further, a wavelength spectrum of the input light may correspond to a wavelength spectrum of single channel in Wavelengh Division Multiplexing.

Also, the optical device of the present invention comprises a light dividing means which spatially divides optical waveband to first spatial wavebands and second spatial wavebands, which are formed to divide said first waveband to a plurality of spectral components, so as to occupy certain spatial widths correspondent to these spectral distributions; wherein said first wavebands have center optical frequencies of substantially uniform frequency difference between adjacent wavebands and spatially disposed substantially at an uniform space, and spatial widths occupied by one of said first wavebands (I1) is wider than the sum of spatial width occupied by all second wavebands (I2) created from one of said first waveband.

Further, the optical device of the present invention comprises a first light dividing means which spectoroscopically divides plurality of first wavebands (I1) to a plurality of second wavebands (I2) so as to spectoroscopically divide each of said first waveband to a plurality of spectral waveband component correspondent to said a plurality of second waveband, and a second light dividing means which spatially divides said a plurality of second waveband so as to occupy certain spatial widths correspondent to these spectral distributions, wherein said first wavebands have center optical frequencies of substantially uniform frequency difference between adjacent wavebands, and by the cooperation of said first light dividing means and said second light dividing means, said first wavebands and said second wavebands are spatially divided as the manner of that spatial widths occupied by one of said first wavebands (I1) is wider than the sum of spatial width occupied by said a plurality of waveband component correspondent to said second wavebands (I2).

Also, the light control method of the present invention comprises the steps of: dividing each first wavebands having center optical frequency of substantially uniform frequency difference between adjacent wavebands to a plurality of second wavebands having substantially same wavelength bandwidth, dividing each said first waveband and said second waveband spatially as the manner of that said first waveband are disposed in a straight line at substantially uniform first space correspondent to said center frequency difference of said first wavebands, and simultaneously said a plurality of second waveband are disposed in a strait line so as that spatial width occupied said first space is wider than the sum of spatial width occupied said a plurality of second waveband.

As described above, since the light dividing section and the wavelength-to-spacial-position-converter or wavelength spectrum portion multiplexing section are provided, such advantage can be obtained that, when an optical element for control processing wavelength spectrum components divided based on wavelength, light beams, which are positioned at gap portions between the optical elements, can be reduced; thus, the spectrum of wavelength channels can be prevented from becoming narrower.

Also, since a light beam of full spectrum can be inputted to optical elements without loss, compared to conventional arts, such advantage that the evenness of transmission loss with respect to the wavelength of spectrum can be improved.

BRIEF DESCRIPTION OF THE DRAWINGS

FIG. 1 shows an optical device according to a first embodiment of the present invention;

FIG. 2(a) and FIG. 2(b) are diagrams showing an example of a light dividing section constituting the optical device according to the first embodiment of the present invention;

FIG. 3(a) and FIG. 3(b) are diagrams showing another example of the light dividing section constituting the optical device according to the first embodiment of the present invention;

FIG. 4(a) to FIG. 4(c), FIG. 5(a) to FIG. 5(d), FIG. 6, FIG. 7 and FIG. 8(a) to FIG. 8(c) are diagrams for illustrating the operation of the optical device according to the first embodiment of the present invention;

FIG. 9(a) to FIG. 9(d), FIG. 10(a) to FIG. 10(c), FIG. 11, FIG. 12 are diagrams for illustrating the operation of a modification of the optical device according to first embodiment of the present invention;

FIG. 13, FIG. 14, FIG. 15(a) and FIG. 15(b) are diagrams each showing a modification of the light dividing section constituting the optical device according to the first embodiment of the present invention;

FIG. 16(a) and FIG. 16(b) are diagrams for illustrating the operation of the light dividing section shown in FIG. 15(a) and FIG. 15(b);

FIG. 19 is a diagram showing the modification of the wavelength-to-spacial-position-converter constituting the optical device according to the first embodiment of the present invention;

FIG. 20(a) and FIG. 20(b) are diagrams showing the modification of the wavelength-to-spacial-position-converter constituting the optical device according to the first embodiment of the present invention;

FIG. 21(a), FIG. 21(b) and FIG. 22 are diagrams for illustrating the operation of the modification shown in FIG. 20(a) and FIG. 20(b);

DESCRIPTION OF THE PREFERRED EMBODIMENTS

Figure 4A:
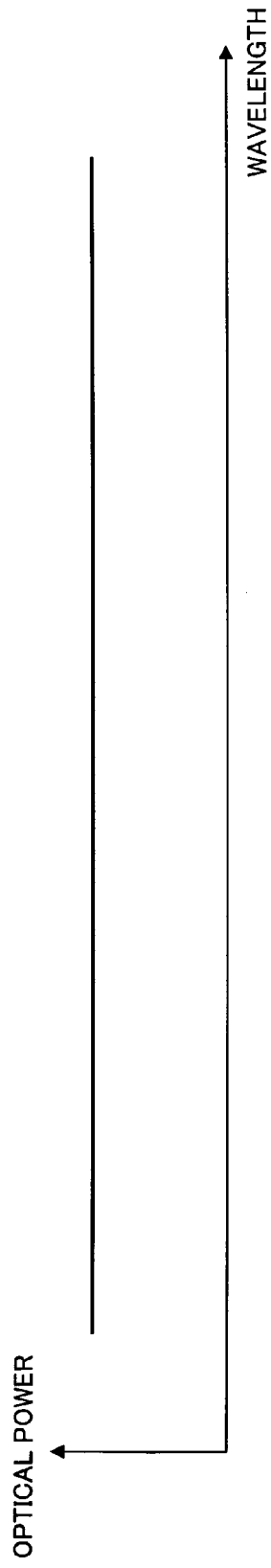

Hereinafter, referring to the drawings, embodiments of the present invention will be described.

In addition to the above-described object of the present invention, other technical problems, means for solving the technical problems and working-effects thereof will be clarified by the following disclosure of the embodiments.

[A] Description of First Embodiment

[A-1] Configuration

Figure 40:
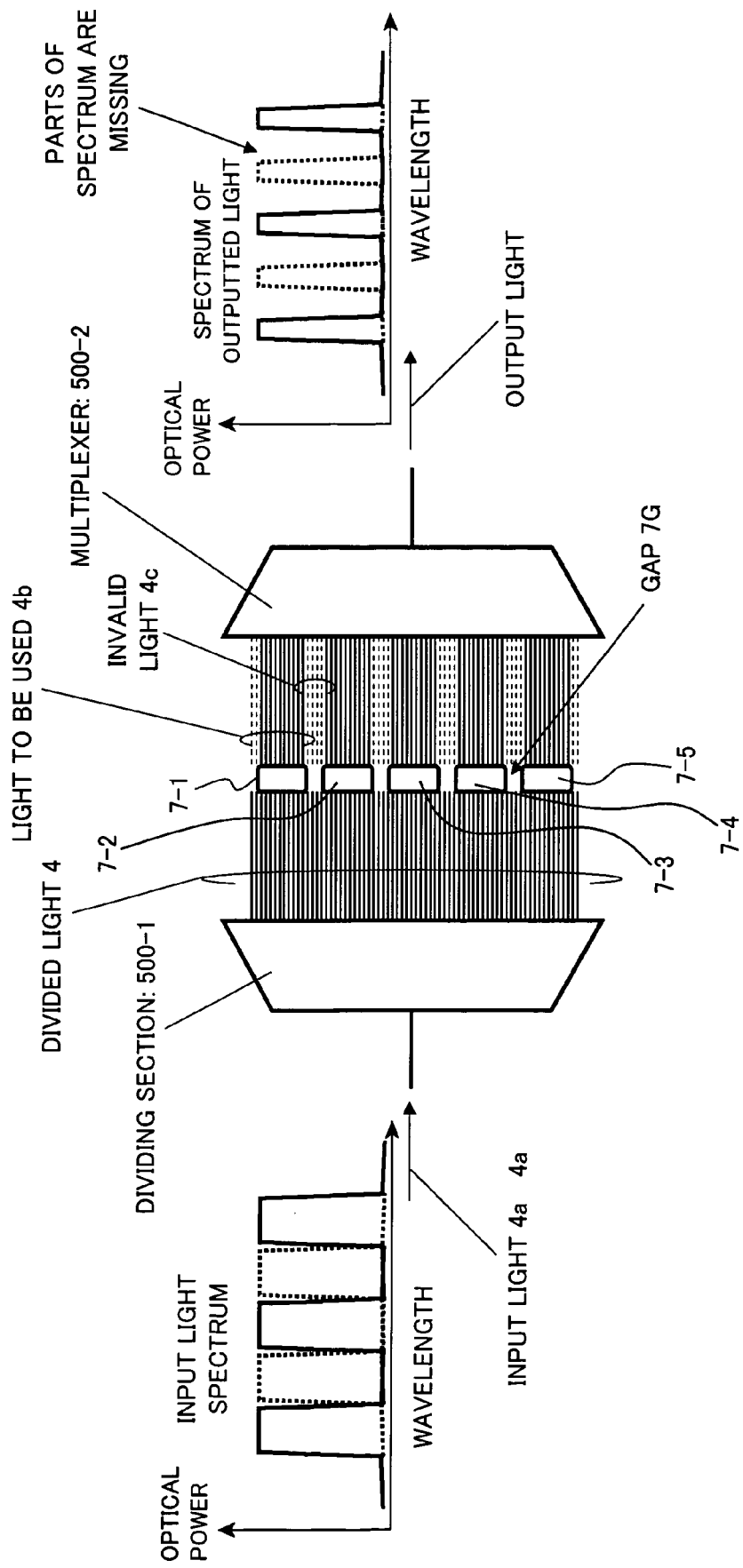
FIG. 40 shows a conventional art.

FIG. 1 is a diagram showing an optical device according to a first embodiment of the present invention. An optical device 100 shown in FIG. 1 has a configuration capable of performing wavelength division of wavelength-division multiplexed light beam, which is inputted via an optical fiber 60, and outputting wavelength-separated light beam, which has been adapted not to pass through the above-described gap shown in FIG. 40. The optical device 100 includes a light dividing section 1, a lens 61, an optical diffraction section 2 and a lens 62. Each of the elements will be described below in detail.

[A-11] Light Dividing Section 1

The light dividing section 1 is capable of dividing wavelength spectrum with respect to the wavelength-division multiplexed light beam, which is inputted via the optical fiber 60, and outputting the same as a plurality (2 in this case) of divided light beams 3-1 and 3-2, which have wavelength spectrum portions different from each other and spatially separated from each other. As a first mode, for example, the light dividing section 1 may be constituted of a light guide device 1a shown in FIG. 2(a) and FIG. 2(b). FIG. 2(a) is a plane view showing the light guide device 1a: and FIG. 2(b) is a side view showing the light guide device 1a. The wording "wavelength spectrum" means a beam of light, which is distributed on the basis of wavelength.

As shown in FIG. 2(a) and FIG. 2(b), the light guide device 1a constitutes a flat guide type Mach-Zehnder interferometer and has, on a substrate 101, core patterns 21 to 28 formed of a clad 102 and a core 103 having a refractive index higher than that of the clad 102, which is embedded in the clad 102. In FIG. 2(a), the core patterns 21 to 28 are indicated with solid lines. However, actually, as illustrated by the end portions of the core patterns 27 and 28 in FIG. 2(b), the core patterns 21 to 28 are embedded in the clad 102.

For the substrate 101, for example, a silicon substrate, and for the clad 102 and the core 103, for example, a silica glass ($SiO_2$) deposited by CVD (Chemical Vapor Deposition) method may be used. Further, for the core 103, a silica glass ($SiO_2$) doped with an impurity such as germanium may be used.

The core patterns (light guides) 21 and 22 constitute light guides of which length is substantially equal to each other; and for example, the light guide 21 is arranged so as to be connected with the optical fiber 60 as an input port i shown in FIG. 1. Further, the core pattern (MMI coupler) 23 constitutes a 3 dB coupler interposed between the above light guides 21 and 22 and the core patterns (branch guides) 24 and 25 as light guides of which length is different from each other. Likewise, the core pattern (MMI coupler) 26 constitutes a 3 dB coupler interposed between the above light guides 24 and 25 and the core patterns 27 and 28 as light guides of which length is equal to each other.

In the light guide device 1a constituted as described above, a phase difference is generated between the light beams propagating through the core patterns 24 and 25. Based on this phase difference, it is arranged so that divided light beams 3-2 and 3-1 allotted with spectrum of the light alternately from the shorter wavelength side in the inputted wavelength-division multiplexed light beam are outputted respectively from the light guide (core pattern) 27 and light guide (core pattern) 28.

Figure 4B:
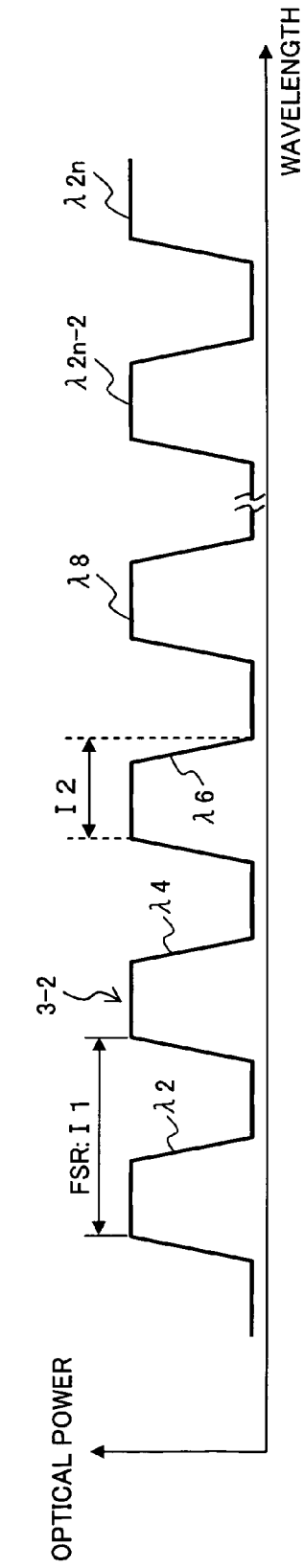
Figure 4C:
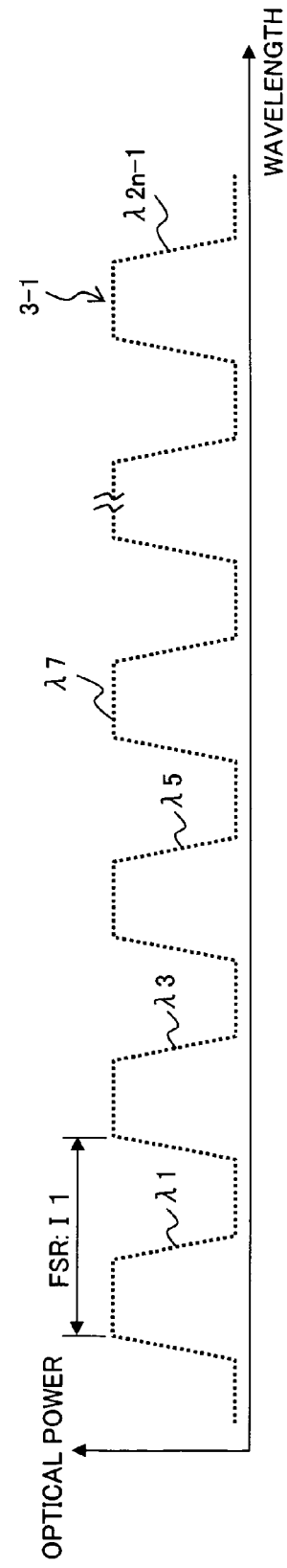

For example, when a beam of light, which has a continuous spectrum (from the shorter wavelength side, $\lambda 1, \lambda 2, \ldots, \lambda 2n$) as shown in FIG. 4(a), is inputted to the light guide device 1a as the light dividing section 1 via the optical fiber 60, a divided light beam 3-2, which has wavelength spectrum portions ($\lambda 2, \lambda 4, \ldots, \lambda 2n$) as shown in FIG. 4(b), is outputted from the light guide 28 constituting an s1 port in FIG. 1; and from the light guide 27 constituting an s2 port in FIG. 1, the divided light beam 3-1, which has wavelength spectrum portions ($\lambda 1, \lambda 3, \ldots, \lambda 2n-1$) as shown in FIG. 4(c), is outputted.

The wavelength spectrum portions, which constitute each of the divided light beams 3-1 and 3-2, has a plurality of bandwidths I2 as second wavebands including wavelength intervals (FSR) I1 as first wavebands. The wavelength intervals I1 in each of the divided light beams 3-1 and 3-2 are allotted based on the bandwidth I2 in the above-mentioned two divided light beams 3-1 and 3-2. That is, when the wavelength-division multiplexed light beam shown in FIG. 4(a) is divided based on the wavelength, the wavelength spectrum portions of the two divided light beams 3-1 and 3-2 are allotted so as to complement each other at wavelength intervals I1.

In this case, as described above, the divided light beam 3-1 includes n of wavelength spectrum portions λ1, λ3, . . . and λ2n-1 each having the bandwidth I2. The divided light beam 3-2 includes n of wavelength spectrum portions λ2, λ4, . . . and λ2n each having the bandwidth I2.

The above-mentioned wavelength intervals I1 can be set up, for example, to approximately 0.8 nm (FSR=100 GHz) by adjusting the optical path difference, which is generated by the light guides 24 and 25 in the light guide device 1a.

For example, by setting the thickness of under clad, which is the clad 102 at the substrate 101 side with respect to the core 103, and the over clad, which is the clad 102 opposite to the substrate 101, to approximately 15 μm respectively, the thickness of the core 103 to approximately 4.5 μm, the branching ratio between the MMI couplers 23 and 26 to 1 to 1; and as for the length, by adjusting so that the light path length of the light guide 24 is longer than that of the light guide 25 by approximately 1.5 mm; thereby, the light dividing section 1 that divides the spectrum of approximately 0.8 nm into two can be formed.

Owing to the light guide device 1a as the light dividing section 1 configured as described above, for example, since the size of the section of the core 103 can be reduced to 5 μm×5 μm, and the length of the core pattern 24 can be reduced to approximately 10 mm, the size of the device can be reduced.

As for the light dividing section 1 shown in FIG. 1, as a second mode, the above-described light guide device 1a in the light guide device shown in FIG. 3 may be modified so that the light dividing section 1 may be configured in a light guide device 1d shown in FIG. 3(a) and FIG. 3(b). FIG. 3(a) is a plane view of the light guide device 1d; and FIG. 3(b) is a side view of the light guide device 1d.

The light guide device 1d shown in FIG. 3(a) and FIG. 3(b) is also configured as a flat optical circuit, which is formed with a clad 102 and a core 103 on a substrate 101. Pluralities of Mach-Zehnder interferometers 1d-1 and 1d-2, which have two branch guides 304, 305, 307 and 308, which determine the phase of interfering light beam and are different from each other in length, are connected in series.

In the core patterns 301 to 311 constituting the core 103, the core patterns (3 dB couplers) 303, 306 and 309 are MMI (multi mode interference) type 3 dB couplers. Further, in the core patterns (branch guides) 304 and 305 constituting the Mach-Zehnder interferometer 1d-1, the pattern length is adjusted so the an optical path difference of approximately 750 μm is generated; and the core patterns (branch guides) 307 and 308 constituting the Mach-Zehnder interferometer 1d-2 is adjusted so the an optical path difference of approximately 1.5 mm is generated respectively.

Owing to this, in the light guide device 1d shown in FIG. 3(a) and FIG. 3(b) also, the same as the above-described case shown in FIG. 2(a) and FIG. 2(b), it is arranged so that, with respect to the wavelength-division multiplexed light beam as the input light beam, the divided light beams having wavelength spectrum portions different from each other are outputted through the light guides 310 and 311.

[A-12] First Lens 61, Diffraction Grating 2 and Second Lens 62

The first lens 61 is constituted of, for example, a collimate lens to change a plurality of divided light beams 3-1 and 3-2, which are output from the light dividing section 1, to collimated light beams respectively, and guides the beams to the next optical diffraction section 2 at a incident angle, which has been set up for each of the plurality of divided light beams 3-1 and 3-2. That is, it is arranged so that the incident angle when the divided light beams 3-1 and 3-2 changed to collimated light beams are inputted to the optical diffraction section 2 can be set up for each of the divided light beams 3-1 and 3-2.

The diffraction grating 2 (optical diffraction section 2) is for changing the diffraction direction of the light beams depending on the inputting method and the light wavelength, and is constituted of, for example, a ruled diffraction grating, which will be described later. The diffraction grating 2 changes the diffraction direction depending on the above-described light wavelength and the incident angle of the light beams, which is set up by the first lens 61, and is provided as an incident-angle dependent light diffraction section. The diffraction grating 2 is arranged to output the light beams, in which each of the wavelength spectrum portions of the divided light beams 3-1 and 3-2 is spatially multiplexed by diffracting the plurality of divided light beams 3-1 and 3-2 from the light dividing section 1.

The second lens 62 is, as described above, for condensing the light beams of which wavelength spectrum components of the divided light beams 3-1 and 3-2 have been spatially multiplexed by the diffraction grating 2. The second lens 62 is arranged so that the light beams outputted from the second lens 62 are condensed at a point on the same plane.

Figure 5A:
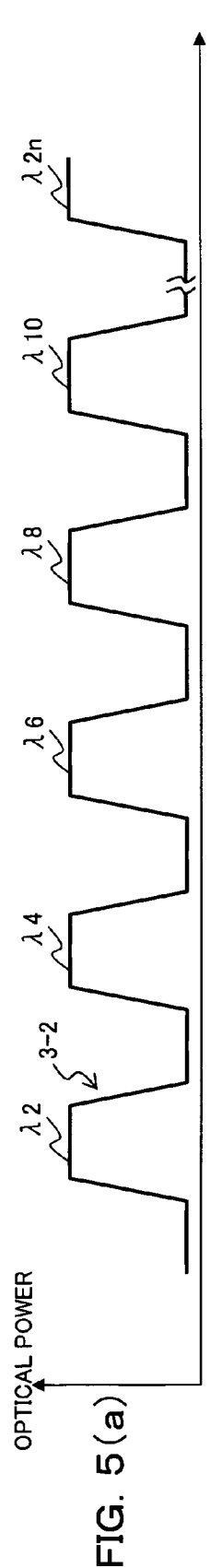
Figure 5B:
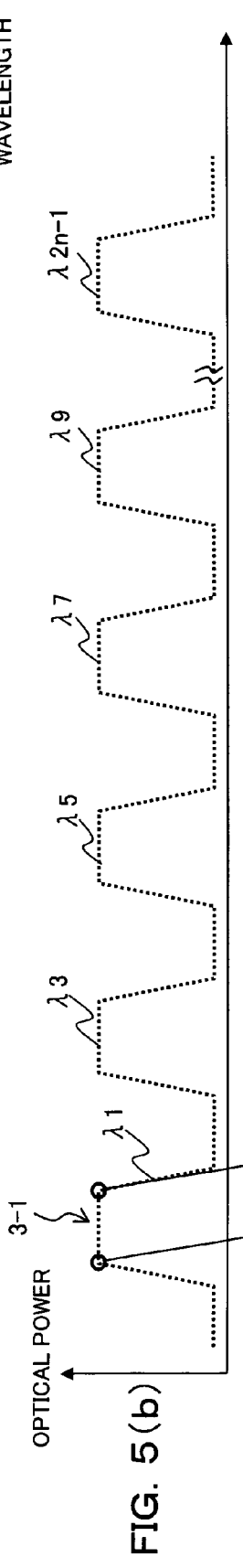
Figure 5C:
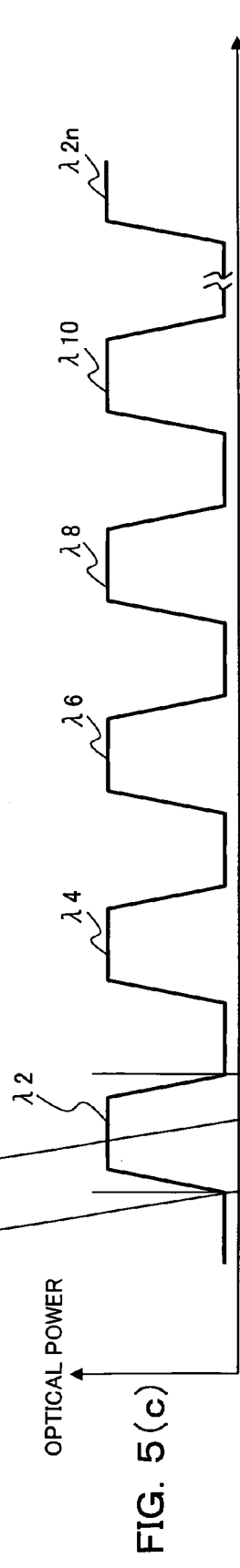
Figure 5D:
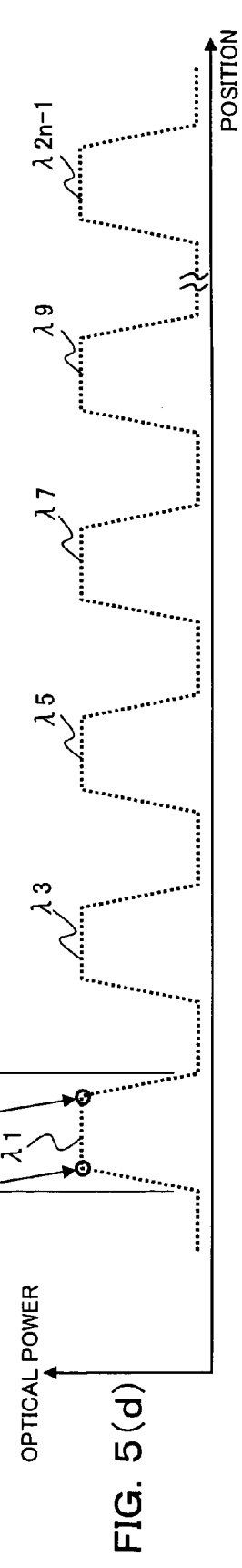

FIG. 5(a) and FIG. 5(b) show the spectrums of the light beams 3-2 and 3-1 having the divided wavelength, which has been spectrum-divided by the light dividing section 1 in FIG. 1, respectively. FIG. 5(c) and FIG. 5(d) show the spatial distribution at the condensing point Q of the divided light beams 3-2 and 3-1 through the second lens 62, respectively. The condensing point of the divided light beams 3-2 and 3-1 is a spatial point along the line indicated by the arrowhead P in FIG. 1.

For example, in FIG. 1, by setting the distance ΔX between the ports s1 and s2 of the light dividing section 1 to approximately 14 μm, and by selecting the focal distance of the first lens 61 and the distance of the diffraction grating 2 to 27 mm, the spatial point of the outputted light beam from the s2 port [refer to FIG. 5(c)] and the spatial point of the outputted light beam from the s1 port [refer to FIG. 5(d)] coincide with each other. In FIG. 1, as the light beams outputted from the diffraction grating 2, light beams 4 of a single wavelength spectrum portion (having a second waveband 12) constituting the light beams in which the divided light beams 3-2 and 3-1 are multiplexed are taken as an example.

Figure 6:
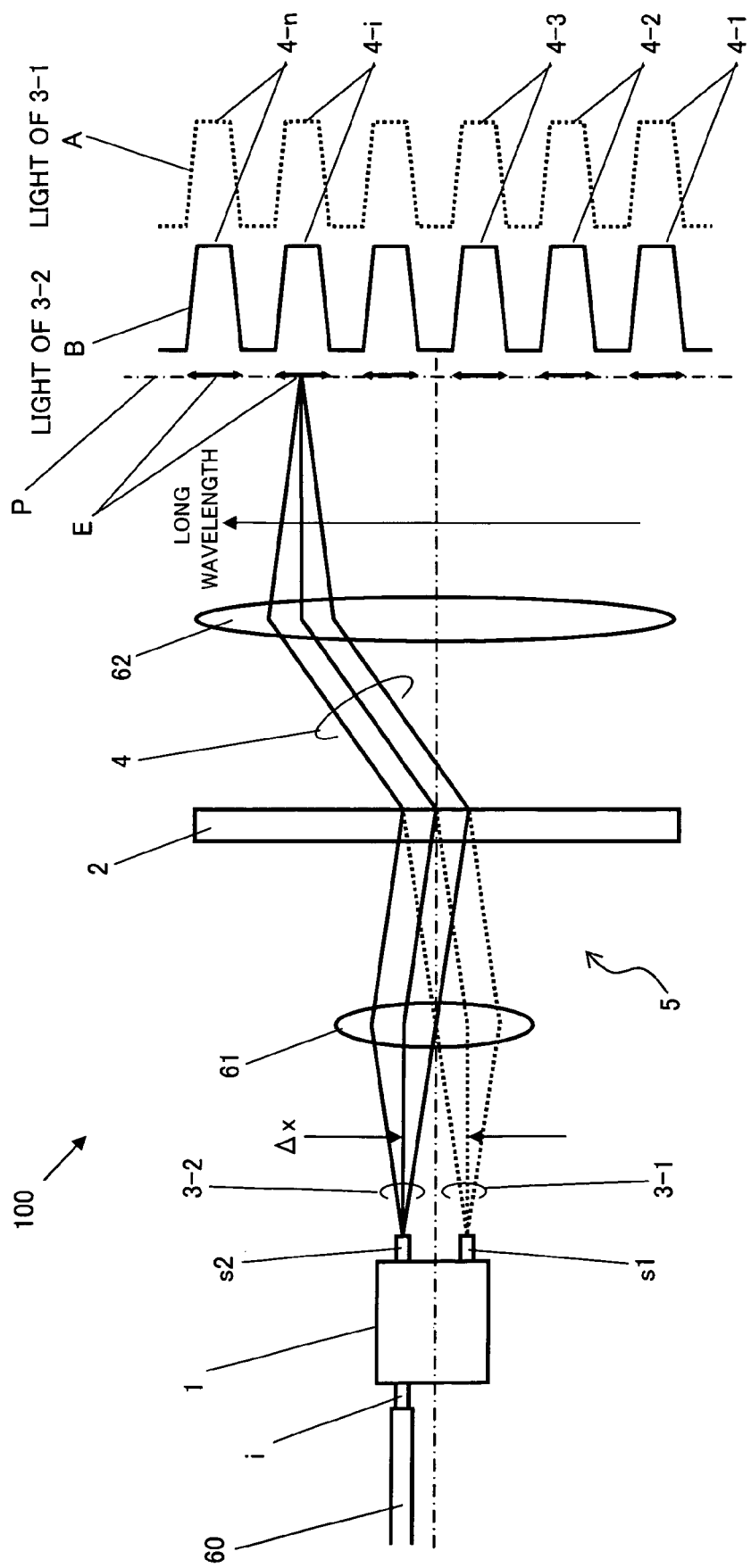

FIG. 6 schematically illustrates the distribution of points where the divided light beams 3-2 and 3-1, which are outputted from the light dividing section 1 in FIG. 1, are condensed. As shown in FIG. 6, the points where the divided light beam 3-1 is condensed distribute, as indicated with A in FIG. 6, in the wavelength spectrum portions each having the second waveband as the spectrums 4-1 to 4-n. Also, the points where divided light beam 3-2 is condensed distribute, as indicated with B in FIG. 6, in the wavelength spectrum portions each having second waveband as the spectrum 4-1 to 4-n. That is, in the divided light beams 3-1 and 3-2, as shown in the spectrums 4-1 to 4-n, since the condensing points thereof are multiplexed, the multiplexed wavelength spectrum portions are distributed at the points indicated with the arrowhead E respectively.

Between the neighboring wavelength spectrum portions (between the spectrum 4-1 and the spectrum 4-2, between the spectrum 4-2 and the spectrum 4-3; hereinafter, the same as the above), in-spectrum gaps can be formed. In this case, the width of the portions where the spectrums are distributed and the gaps between the spectrums are substantially equal to each other. Using the above-described first lens 61 and the diffraction grating 2, the wavelength-to-spacial-position-converter 5, which is capable of spatially multiplexing the wavelength spectrum portions of the plurality of divided light beams 3-1 and 3-2 from the light dividing section 1, is thus constituted.

Figure 7:
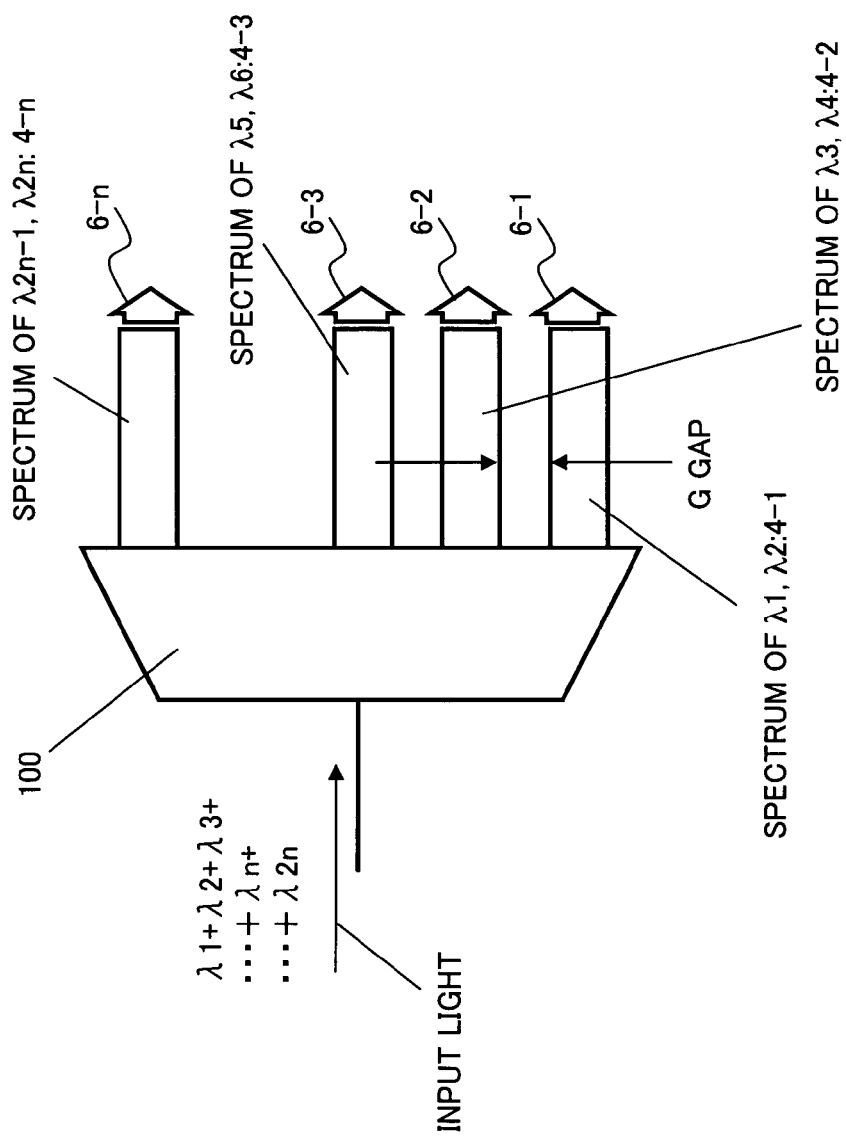

That is, as shown in FIG. 7, when the wavelength-division multiplexed light beam ($\lambda 1$ to $\lambda 2n$) is inputted as the input light beam I to the optical device 100 in the above-described light dividing section 1, the optical device 100 outputs wavelength-separated light beams 6-1 and 6-n in which spatial gaps (clearances) G are formed. Here, the spectrum 4-1 in the wavelength-separated light beam 6-1 includes the wavelength spectrum portions $\lambda 1$ and $\lambda 2$ in the above-described divided light beams 3-2 and 3-1; likewise, the wavelength-separated light beam 6-2 includes the spectrums $\lambda 3$ and $\lambda 4$; and the wavelength-separated light beam 6-n includes the spectrums $\lambda 2n-1$ and $\lambda 2n$. Thus, the wavelength-separated light beams 6-1 and 6-n, which has no loss with respect to the wavelength components of the wavelength-division multiplexed light beams as the input light beam I, can be outputted.

The absolute value of the clearance, which is equivalent to the gap G in each of the condensing points of the above-described wavelength-separated light beams 6-1 to 6-n, changes depending on the focal distance of the second lens 62; the longer focal distance results in the larger width. For example, by setting the focal distance of the second lens 62 to approximately to 95 mm, the clearance of the above-described neighboring wavelength-separated light beams 6-1 to 6-n can be set to approximately 100 μm.

That is, the second lens 62, which disposed behind the first lens 61 and the diffraction grating 2 constituting the wavelength-to-spacial-position-converter 5, constitutes a clearance-adjusting element capable of adjusting the spatial clearance of the light beams constituting the wavelength spectrum portions, which are multiplexed by the wavelength-to-spacial-position-converter 5.

FIG. 8(a) and FIG. 8(b) show the spectrum of the outputted light beams at the port s1 and port s2 of the light dividing section 1 respectively. Further, FIG. 8(c) shows the spectrum of the light beam returned to the optical fiber 60 when assuming that, in the configuration in FIG. 1, the focal distance of the second lens 62 is set to approximately 95 mm, and a mirror array with pitch of approximately 100 μm and width of approximately 70 μm is disposed at the condensing point Q.

In this condition, the spectrum of the light beam returned to the optical fiber 60 is equivalent to the spectrum of the light beam received by the mirror. For example, a wavelength spectrum portion W1 in the spectrum of the output light beam from the port s1 [refer to FIG. 8(a)] and a wavelength spectrum portion W2 in the spectrum of the output light beam from the port s2 [refer to FIG. 8(b)] are multiplexed with each other at the same condensing point. Accordingly, as shown in FIG. 8(c), for example, it is possible to reflect these wavelength spectrum portions W1 and W2 and to return the light beam having a spectrum of a width W3 to the optical fiber 60 using one mirror. The width of W3 is substantially equal to the wavelength intervals of 0.8 nm in each channel.

The spectrum with the width of W3 is equivalent to the spectrums 4-1 to 4-n shown in FIG. 6 and FIG. 7. That is, it is possible to reflect each of the wavelength-separated light beams 6-1 and 6-n with one mirror.

[A-2] Working-effect

In the optical device 100 according to the first embodiment of the present invention configured as described above, when a wavelength-division multiplexed light beam, which has, for example, a continuous spectrum as shown FIG. 4(a) is inputted via the optical fiber 60, in the light dividing section 1, the light beam is separated into two divided light beams 3-1 and 3-2, in which wavelength spectrum portions different from each other are distributed [refer to FIG. 4(b) and FIG. 4(c)], and outputted to the diffraction grating 2 through the first lens 61.

The condensing points of the above divided light beams 3-1 and 3-2 can be multiplexed with each other at a point on a plane P shown in FIG. 6 through the first lens 61, the diffraction grating 2 and the second lens 62 constituting the wavelength-to-spacial-position-converter as well as wavelength spectrum portion multiplexing section. Accordingly, as shown at the points indicated with the arrowheads E, the wavelength-separated light beams (6-1 to 6-n in FIG. 7) with respect to the inputted wavelength-division multiplexed light can be distributed with a clearance between the beams.

Owing to this, in the optical device 100, the clearance can be formed spatially with respect to the light beams, which are divided based on the wavelength, without reducing the spectrum of the light beam of the inputted wavelength-division multiplexed light beam. Accordingly, with respect to the light beams, which are divided based on the wavelength and formed with the clearances, the light beams of full spectrum can be inputted to an optical element such as a mirror without loss.

As described above, the optical device 100 according to the first embodiment of the present invention includes the light dividing section 1 and the wavelength-to-spacial-position-converter 5. Accordingly, the following advantage is obtained; i.e., even when an optical element for controlling and processing the wavelength spectrum components, which are divided based on the wavelength, is provided, it is possible to reduce the light beam positioned at the gaps between the optical elements; and thus, the spectrum for the wavelength channel can be prevented from being reduced.

Further, since the light beams with full spectrums can be inputted to the optical element without loss, compared to the conventional art, such advantage that the evenness of the transmission loss characteristics of the spectrum with respect to the wavelength can be improved.

[A-3] Modification

[A-31] Modification of the Number of the Divided Light Beams by the Light Dividing Section 1

In the above-described optical device 100 according to the first embodiment, the input light beam is divided into two divided light beams 3-1 and 3-2, which have wavelength spectrum portions different from each other, by the light dividing section 1. However, the present invention is not limited to the above. It may be arranged so that the input light beam is divided into an arbitrary number of divided light beams more than two.

For example, as shown in FIG. 9(d), when an input light beam I, of which wavebands $\lambda 1$ to $\lambda n$ corresponding to channels #1 to #n are multiplexed based on the divided wavelength, is inputted, the input light beam is separated into m of divided light beams (m is two or more), which has wavelength spectrum portions different from each other, by the light dividing section 1; and in the wavelength-to-spacial-position-converter 5, the wavelength spectrum portions with respect to them of divided light beams from the light dividing section 1 are spatially multiplexed; thereby the wavelength-separated light beams 6-1 to 6-n can be outputted.

Here, the wavelength spectrum portions constituting each of the divided light beams, which are divided by the light dividing section 1 are divided into a plurality of (n) light beams based on the bandwidth of the second waveband including a clearance in the first waveband corresponding to the channel clearance, and the first waveband in each of the divided light beams is allotted based on the second waveband in m of divided light beams. That is, in the light dividing section 1, the wavebands λ1 to λn of each channel are divided into m of wavelength spectrum portions (divided wavebands) respectively.

The wavelength-to-spacial-position-converter 5, the light beams with respect to the wavelength spectrum portion of each channel are duplexed and outputted therefrom. Thereby, the wavelength-separated light beams 6-1 to 6-n are outputted being formed with spatial gaps.

Taking the light beam of wavelength λ1 allotted to the channel #1 as an example, as shown in FIG. 9(*a*), the light dividing section 1 divides the light beam of wavelength λ1 into m of wavelength spectrum portions and outputs as m of divided light beams respectively. Thus, the wavelength-separated light beam 6-1 is outputted from the bottom position in FIG. 9(*a*) through the first lens 61, the diffraction grating 2 and the second lens 62 constituting the wavelength-to-spacial-position-converter 5.

Figure 10A:
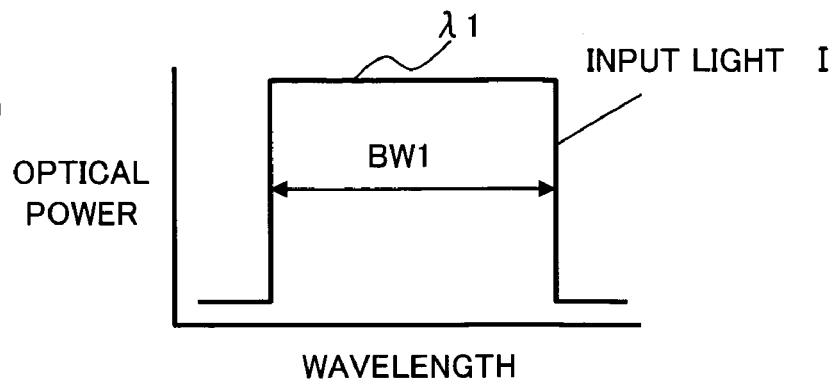
Figure 10B:
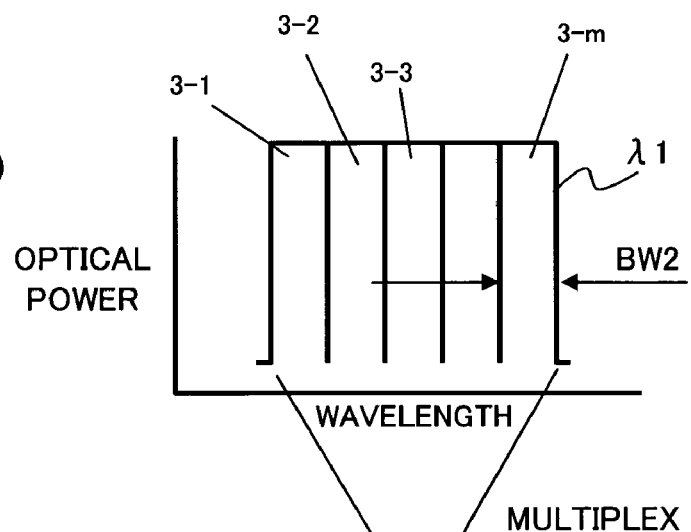
Figure 10C:
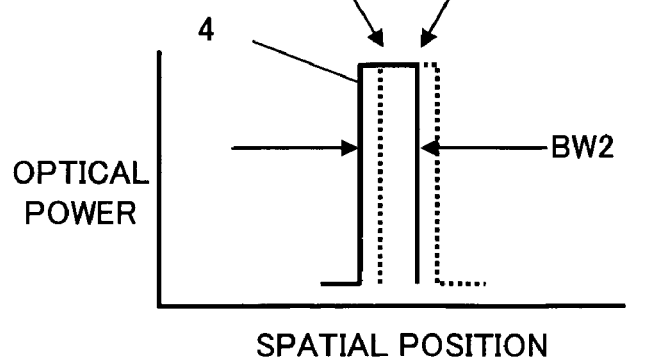

In particular, in the light dividing section 1, the light beam of λ1 having a spectrum BW1 corresponding to the first wavelength interval [refer to FIG. 10(*a*)] is, as shown in FIG. 10 (*b*), divided into m of wavelength spectrum portions which have a spectrum BW2 corresponding to the second waveband respectively. And the light beams having these wavelength spectrum portions are, as shown in FIG. 10(*c*), outputted through the diffraction grating 2 as the beams that propagate through the same light path; thus, m of divided light beams are multiplexed.

Likewise, when the light beams of wavelength λ2, λ3 allotted to the channels #2, #3 respectively, are taken as examples, as shown in FIG. 9(*b*) and FIG. 9(*c*), the light beams are outputted as wavelength-separated light beams 6-2 and 6-3 respectively. That is, the wavelength-separated light beams 6-2 and 6-3 are outputted from the lower portion in FIG. 9(*b*) and FIG. 9(*c*) including predetermined clearance respectively.

Owing to this, as shown in FIG. 9(*d*), when an input light beam I, in which wavebands λ1 to λn corresponding to the channels #1 to #n are multiplexed based on the divided wavelength, is inputted, the wavelength-separated light beams 6-1 to 6-n each including a predetermined clearance are output. The wavelength continues between the spectrum at the longest wavelength side of the spectrum 4-1 of λ1 (refer to "A" in FIG. 9(*d*)) and the spectrum at the shortest wavelength side of the spectrum 4-2 of λ2 (refer to "B" in FIG. 9(*d*)). The above is the same between the other neighboring spectrums.

In the wavelength-to-spacial-position-converter 5 in this case also, the same as the first embodiment in which the number of the divided light beams is two, a diffraction grating 2, which is formed of a member of flat plate shape having substantially two primary faces, and when wavelength of the incident light beam is fixed, the diffraction direction changes depending on the incident angle of the light beam with respect to the primary face, may be used.

As shown in FIG. 11, the light dividing section 1 divides the input light beam I in the waveband to be divided into m of spectrums (four in FIG. 11) and separates the spectrums to spatially different points s1 to s4, and outputs the same as the divided light beams 3-1 to 3-4. The divided light beams 3-1 to 3-4 are converted into collimated light beams by a first lens 61; the light beams from the first lens 61 are diffracted by the diffraction grating 2; and the light beams 4 having the same light path are outputted as the diffracted light beams.

That is, when the light beams 3-1 to 3-4 in a divided waveband are spatially separated by the light dividing section 1 and changed into collimated light beams by the first lens 61, as shown in FIG. 11, the central axis of the light path of the light beams in the divided waveband enters the diffraction grating 2 at a different angle, and the angle changes depending on the spatial position. Accordingly, by adjusting the spatial positions of the divided light beams 3-1 to 3-4, all of the light beams 3-1 to 3-4 in the divided waveband can be diffracted in the same direction.

In further particular, as for the diffraction grating 2, for example, a ruled diffraction grating may be used. The ruled diffraction grating is a diffraction grating used in the abovementioned patent documents 1 to 6; for example, VPG (Volume Phase Grating) is available. Further, the ruled diffraction grating is a grating formed of a flat plate member having substantially two primary faces, and on the surface of the primary face, line-like periodic concavities and convexities are formed at specific clearances; or, a grating which has a specific refractive index in a line shape, and distribution of refractive index with a specific period is formed in a direction perpendicular to the line-like specific distribution of the refractive index.

In FIG. 11, using the diffraction grating 2 as the ruled diffraction grating, by setting so that the spatial relative distance between the divided light beams 3-1 to 3-4, which are divided by the light dividing section 1, is a specific distance, each incident angle of the divided light beams 3-1 to 3-4 with respect to the diffraction grating 2 has, for example, a substantially specific angular difference δ like α1, α1+δ, α1+2δ and α1+3δ. Here, assuming that the incident angle of a light beam with respect to the diffraction grating 2 is α, the diffraction angle is β, grating clearance is d, diffraction order is m, and the wavelength is λ; between the incident light beam and the diffracted light beam, the following relations expressed by formulas (1) to (3) are established. Based on these formulas (1) to (3), the diffraction angle β is expressed by formula (4).

$$d\{\sin(\alpha) + \sin(\beta)\} = m\lambda \tag{1}$$

$$\sin(\alpha) + \sin(\beta) = \frac{m\lambda}{d} \tag{2}$$

$$\sin(\beta) = \frac{m\lambda}{d} - \sin(\alpha) \tag{3}$$

$$\beta = \arcsin\left(\frac{m\lambda}{d} - \sin(\alpha)\right) \tag{4}$$

Figure 12:
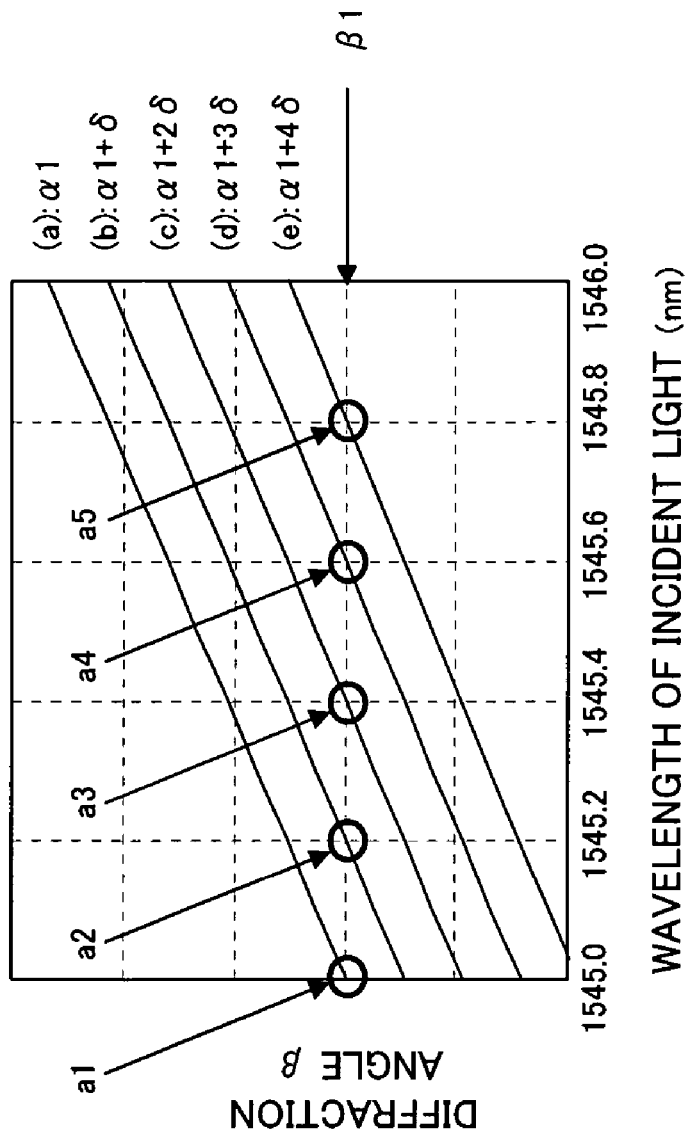

FIG. 12 shows the relation between the wavelength and the diffraction angle when the grating clearance d is 1 μm, the diffraction order is 1, the incident angles are α1, α1+δ, α1+2δ, α1+3δ and α1+4δ, α1=40° and δ=0.015°. As indicated with a1, a2, a3, a4 and a5, the light beams are diffracted in the same direction of angle β1 every 0.2 nm (every 25 GHz). Accordingly, using the ruled diffraction grating 2, the divided light beams 3-1 to 3-4 can be diffracted in the same direction.

Further, as described above, when the first lens 61 and the diffraction grating 2 are combined with each other to duplex the divided spectrums, by reducing the focal distance of the first lens 61, the optical system can be formed smaller in size. Referring to FIG. 12, for example, when the wavelength 1545.2±0.2 nm and the wavelength 1545.6±0.2 nm are selected, in the case where a spectrum of 100 GHz (0.8 nm) is divided into two and duplexed each other, to diffract the beams in the same direction of diffraction angle β1, the angular difference of the incident light beam has to be set up to 2δ (0.03°, 5.236×10−4 rad).

Referring to FIG. 11, taking the light beams outputted from the s2 port and s1 port of the light dividing section 1 as an example, assuming that the spatial distance between the s1 and s2 is Δx, and the focal distance of the lens is f, as for the angular difference of the incident light beam, the relation of formula (5) is established. From the formula (5), it is understood that the smaller value of the Δx results in the smaller value of the focal distance f of the first lens 61. In the light guide device 1d as the light dividing section 1 shown in FIG. 3, the value of the Δx can be reduced to approximately 14 μm. Accordingly, such effect that the focal distance f of the lens can be reduced to approximately 27 mm is obtained.

$$\Delta x = f*2\delta \quad (5)$$

[A-32] Modification of the Light Dividing Section 1

Figure 13:
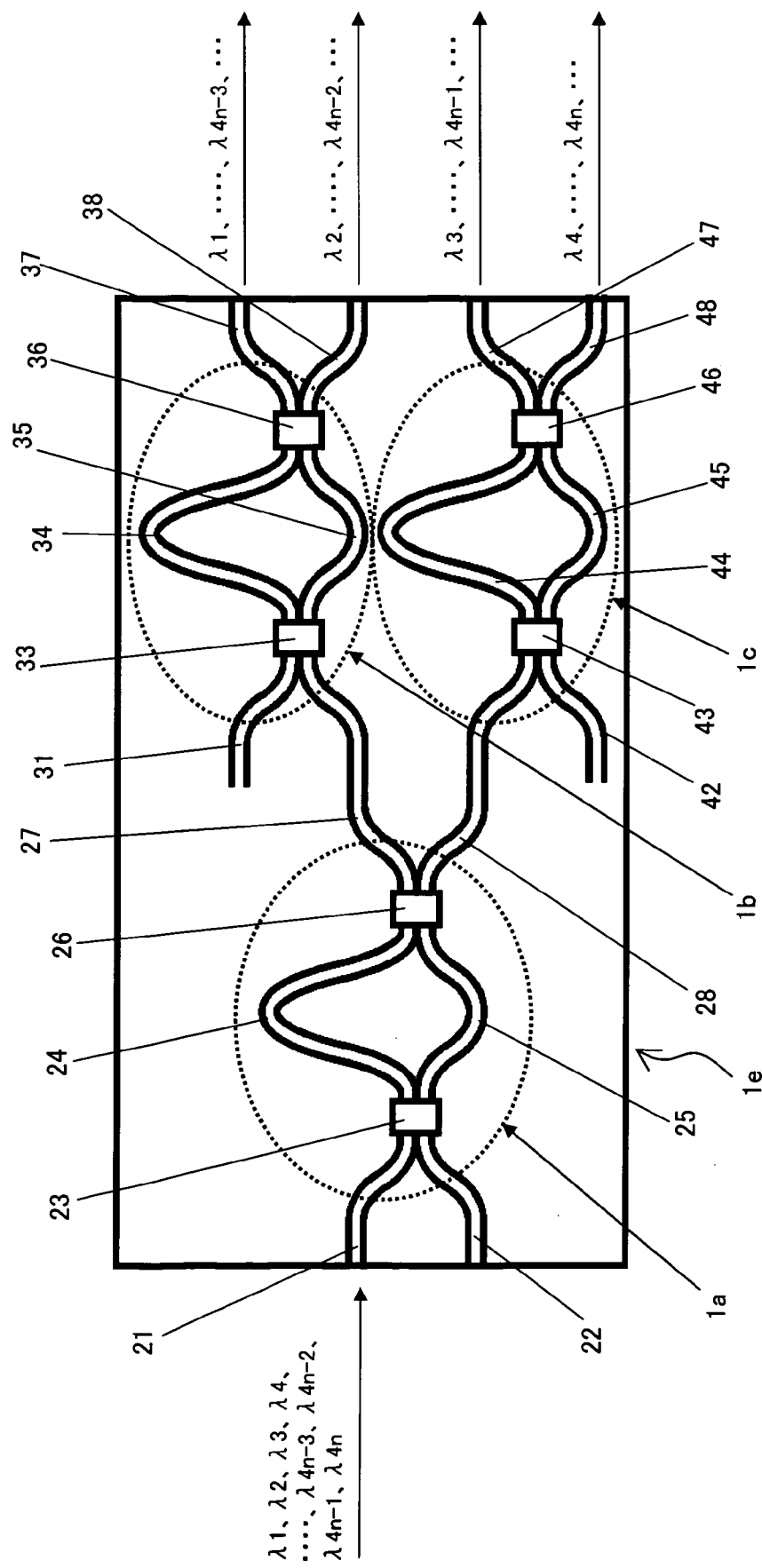
Figure 14:
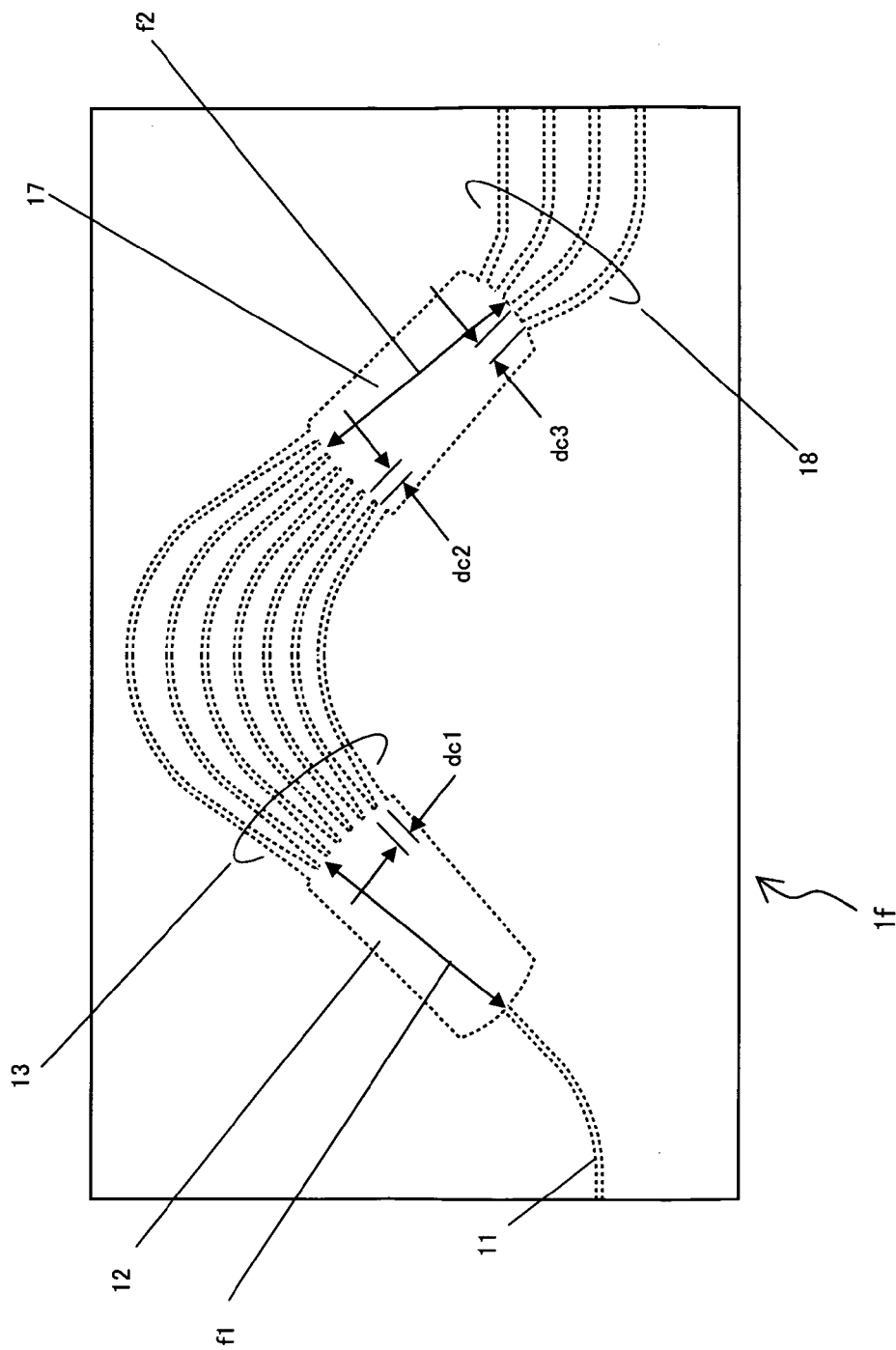

As a device for outputting divided light beams more than two as described above; for example, four divided light beams 3-1 to 3-4, from spatially different positions, a light guide device 1e as shown in FIG. 13 and an array guide grating 1f as shown in FIG. 14 are available.

The light guide device 1e shown in FIG. 13 is configured so that each of the output guides 27 and 28 of a Mach-Zehnder interferometer, which is the same as the above-described light guide device 1a shown in FIG. 2, is connected to a Mach-Zehnder interferometer 1b and 1c respectively, which has the same configuration, in series. Using the light guide device 1e, it is possible to configure so that four divided light beams 3-1 to 3-n are outputted with a relatively small sized device.

In FIG. 13, reference numerals 33, 36, 43 and 46 denote an MMI coupler respectively, 31, 34, 35, 37, 38, 42, 44, 45, 47 and 48 denote a light guide respectively. In the same configuration as the configuration of the light guide device 1e shown in FIG. 13, by connecting n-steps more than two steps of Mach-Zehnder interferometers in series, 2n of divided light beams, which have wavelength spectrum portions different from each other, can be obtained.

For example, by setting the thickness of the under clad and the over clad constituting the clad 102 is approximately 15 μm; the thickness of the core 103 is approximately 4.5 μm; and the branching ratio of the MMI couplers 23, 26, 33, 36, 43 and 46 is approximately 1 to 1 respectively; and by adjusting so that the length of the light guide 24 is longer than the light guide 25 by approximately 0.75 mm in light path length; the length of the light guide 34 is longer than the light guide 35 by approximately 0.75 mm in light path length; and the length of the light guide 44 is longer than the light guide 45 by approximately 0.75 mm in light path length, respectively, a light dividing section for dividing a spectrum of approximately 1.6 nm into four can be obtained.

Also, in the array guide grating 1f shown in FIG. 14, a flat optical circuit is configured with core and clad formed on a substrate. In the array guide grating 1f, as the core pattern, an input light guide 11 for receiving input light beams from the optical fiber 60, an input slab 12, a channel guide 13, an output slab 14 and four output guides 18 are included. Using the array guide grating 1f configured as described above, a small sized light dividing section 1 capable of outputting four divided light beams can be formed.

Here, the length f1, f2 of the input slab 12 and the output slab 14 is, for example, approximately 10 mm; the core clearances dc1, dc2 in the connecting sections between the channel guide 13 and input slab 12 and the output slab 14 are, for example, approximately 10 μm; the difference in length of the neighboring channel guides is, for example, approximately 450 μm; the number of the channel guides 13 is, for example, 25; the clearance dc3 between the output guides in the connecting section between the output guide 18 and the output slab 14 is, for example, approximately 38.4 μm; the width of the core pattern for the output guide is, for example, approximately 4.5 μm. The channel guide 13 has a tapered form, of which width becomes larger toward each of the slubs 12 and 14 in the vicinity of the connecting section of the input slab 12 and the output slab 14.

Further, as described above, when the light dividing section 1 is constituted with an array guide grating, it may be arranged so that arbitrary two or more divided light beams are outputted. For example, as shown in FIG. 15(a) and FIG. 15(b), an array guide grating 1f in which seven output guides 18-1 to 18-7 are formed as the output guide 18 may be formed. FIG. 15(a) is a front view showing the array guide grating 1f; FIG. 15(b) is a side view viewed from the arrowhead V in FIG. 15(a). The pattern of the core 103 shown in FIG. 15(a) is indicated with dotted lines. This is intended to indicate that, as shown in FIG. 15(b), the core 103 is covered by the clad 102.

Using the array guide grating 1f configured as described above, the light dividing section 1 which has, for example, a light dividing characteristics as shown in FIG. 16(a) with respect to the input light beam can be formed. The wavelength spectrum portions #1 to #16, which are divided as described above, can be divided into seven which is the same number of the output guides 18-1 to 18-7 as shown in FIG. 16 (b). In the case where a relatively large number of the divisions is required, compared to the case where a light guide device using the Mach-Zehnder interferometer shown in FIG. 13, when the array guide grating shown in FIGS. 14 and 15 is employed as the light dividing section, the device can be formed relatively smaller in size.

[A-33] Modification of the Wavelength-to-spacial-position-converter 5

Figure 17A:
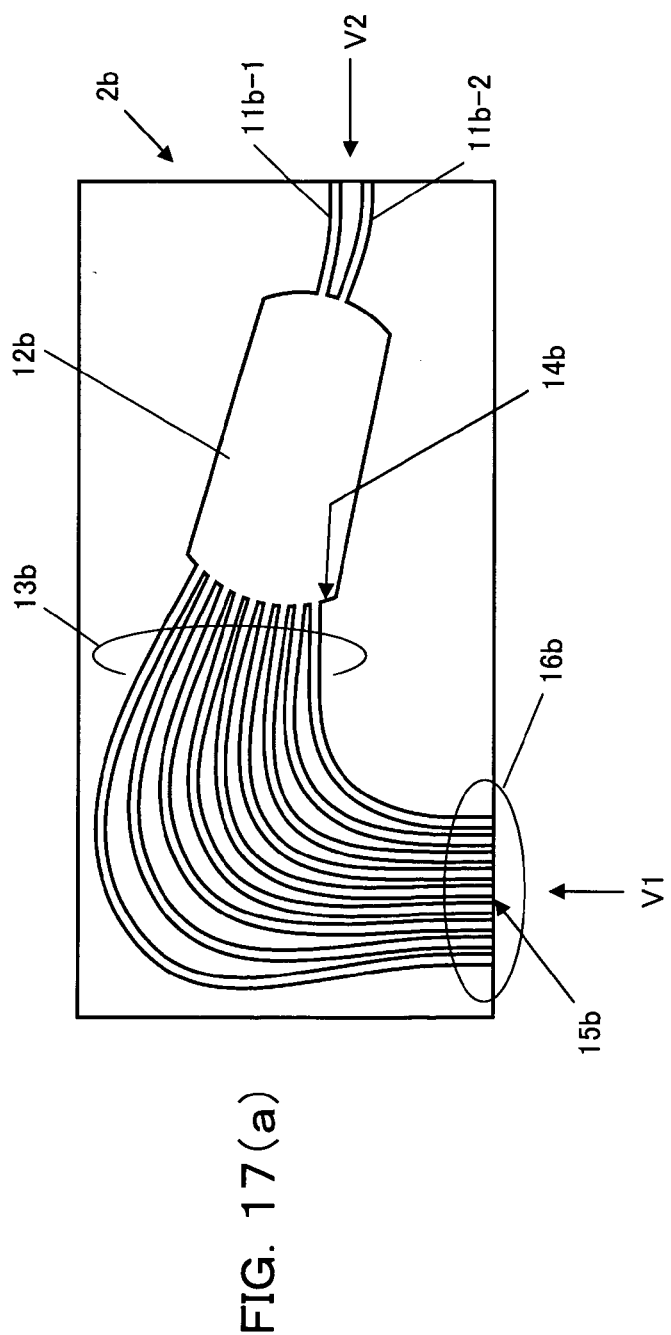
FIG. 17(a) to FIG. 17(c) are diagrams showing the modification of a wavelength-to-spacial-position-converter constituting the optical device according to the first embodiment of the present invention.
Figure 17C:
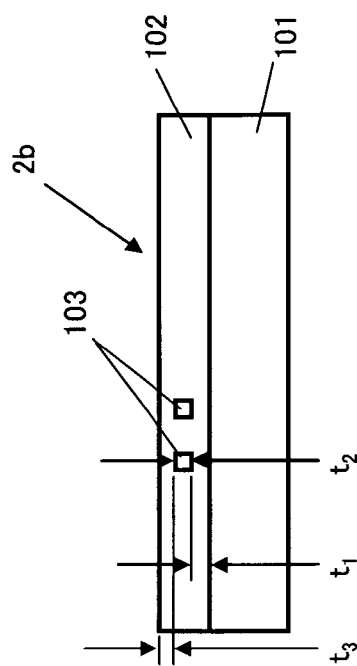

As for the configuration of the above-described wavelength-to-spacial-position-converter 5, in addition to the above-described configuration in the optical device 100 according to the first embodiment in which the first lens 61 and the ruled diffraction grating 2 are employed, for example, the wavelength-to-spacial-position-converter 5, may be configured by employing a light guide device 2b shown in FIG. 17(a) FIG. 17(c), or a light guide device 2b' shown in FIG. 19, or a light guide device 2c shown in FIG. 20(a) and FIG. 20(b).

[A-331] Light Guide Devices 2b and 2b'

Figure 17B:
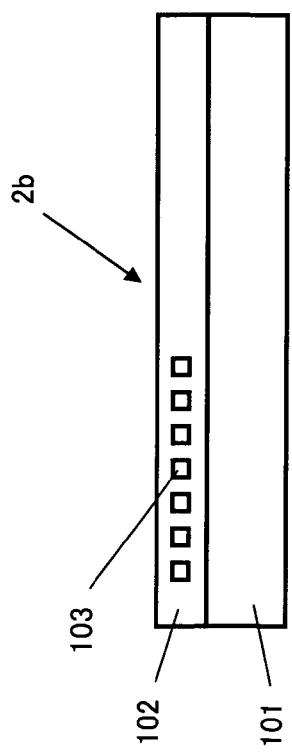

The light guide device 2b shown in FIG. 17(a) to FIG. 17(c) is also, the same as the diffraction grating 2, an optical diffraction section in which the diffraction direction changes depending on the inputting method and the light wavelength of light beam. As the inputting method of light beam, an incident-position dependent light diffraction section in which the diffraction direction changes depending on the incident position of light beams is configured.

The light guide device 2b is a light guide device constituting a flat optical circuit including a flat substrate 101, a clad 102 formed on the substrate 101 and a core 103 having a refractive index higher than that of the clad 102, which is formed being embedded in the clad 102.

FIG. 17(a) is a front view of the light guide device 2b; FIG. 17(b) is a side view of the light guide device 2b shown in FIG. 17(a) viewed from the arrowhead V1; and FIG. 17(c) is a side view of the light guide device 2b shown in FIG. 17(a) viewed from the arrowhead V2. In FIG. 17(a), the pattern of the core 103 is indicated with solid lines. However, actually, as shown in FIG. 17(b) and FIG. 17(c), the core 103 is covered with the clad 102.

The light guide device 2b includes, as the pattern of the core 103, an input light guide (input light guide pattern portion) 11b, an input slab (input slab pattern portion) 12b and a channel guide (channel guide pattern portion) 13b. The light guide device 2b is arranged so that divided light beams 3-1 and 3-2 from the light dividing section 1 are inputted via the input light guides 11b, and the light beams in which wavelength spectrum portions are multiplexed are outputted via an end surface 15b of the channel guide 13b.

The light guide device 2b is formed by, for example, depositing the clad 102 and the core 103 formed of silica (SiO2) in a manner of applying CVD method on the silicon substrate 101. As shown in FIG. 17(c), the thickness t1 and t3 of the clad may be, for example, approximately 15 μm; and the thickness of the core 103 may be approximately 4.5 μm. The width of the core 103 varies depending on the position; the width of the end face side of the input light guides 11b-1 and 11b-2, and the central area of the channel guide 13b may be approximately 4.5 μm. The length f1 of the input slab 12b is approximately 10 mm. Further, the channel guide 13b is formed so as to be, for example, approximately 39.7 μm longer with respect to the neighboring waveguide; and the number thereof may be 400.

The core pattern is formed by carrying out a transfer of a mask pattern to photoresist in a manner of photolithography processing and reactive ion etching (RIE) using the mask pattern of the photoresist as a mask.

At the position of the end faces to which a plurality of (2 in this case) divided light beams spatially divided by the light dividing section 1 is guided, a plurality of (two) input light guides 11b-1 and 11b-2 are formed with the core sections [refer to the sections of the core 103 in FIG. 17(c)] being exposed, corresponding to the number of the divided light beams. That is, it is arranged so that, for example, the output guides 28 and 27 of the light guide device 1a as the light dividing section 1 shown in FIG. 2 are connected to the input light guides 11b-1 and 11b-2 respectively so as to guide the divided light beams from the light guide device 1a to the input light guides 11b-1 and 11b-2.

Accordingly, when the light guide device 2b is employed as the wavelength-to-spacial-position-converter 5, the above-described first lens 61 shown in FIG. 1 does not have to be employed.

The input slab 12b is formed with its one end being continuous with each of the waveguides 11b-1 and 11b-2 constituting the input light guides so as to allow the light beams from the guides 11b-1 and 11b-2 to propagate freely while being diffracted and expanded. And the other end has an arc pattern around the portion where is continuous with the input light guides 11b as the center. The channel guide 13b includes a plurality of guides as the guide pattern, which is continuous with the other end of the input slab 12b, disposed in parallel so that the length thereof changes sequentially.

Further, the end portions 16b opposite to the input slab 12b in the channel guide 13b are disposed linearly including predetermined clearances and core sections thereof are exposed. It is arranged so to output light beams of which diffraction directions are changed from the core 103 section in the channel guide 13b [refer to core 103 in FIG. 17(b)].

Figure 18A:
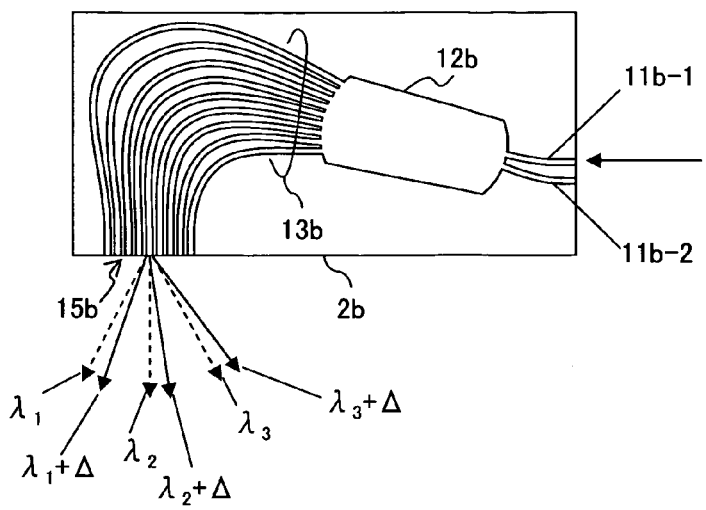
FIG. 18(a) to FIG. 18(c) are diagrams for illustrating the operation of the modification shown in FIG. 17(a) to FIG. 17(c)
Figure 18B:
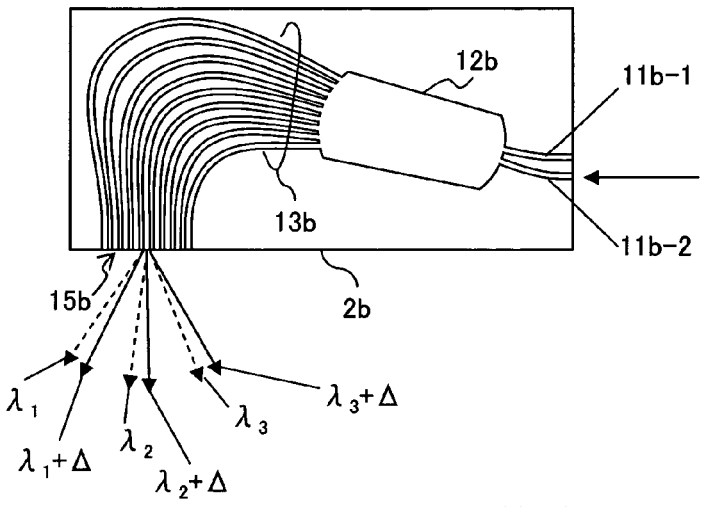
Figure 18C:
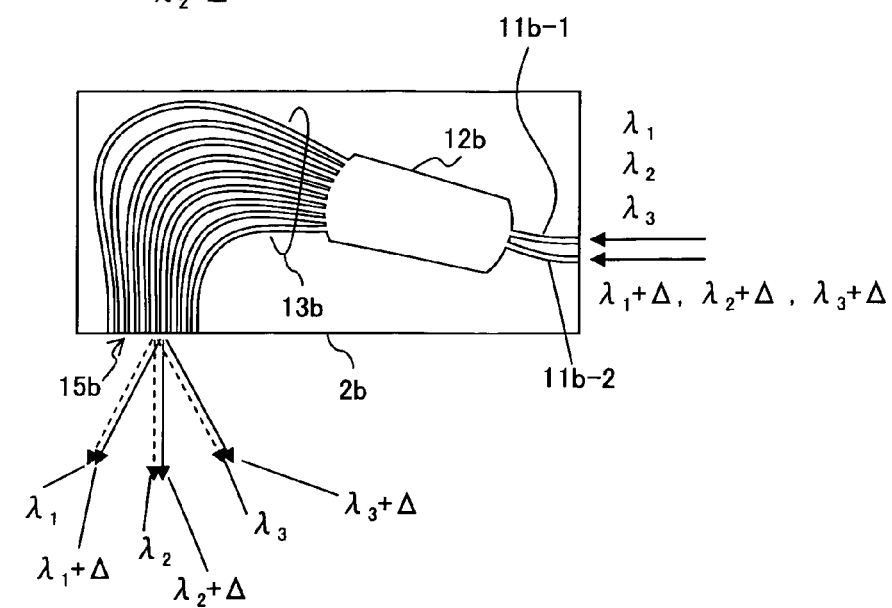

Referring to FIG. 18(a) to FIG. 18(c), a multiplexing function of the wavelength spectrum portions by the above-described light guide device 2b will be described.

FIG. 18(a) shows spectroscopy characteristics when a light beam is inputted to the input light guide 11b-1. In this case, light beams of wavelength λ1, λ2, λ3 and a little longer wavelength λ1+Δ, λ2+Δ and λ3+Δ, are spatially separated respectively as shown in FIG. 18(a). Here, the light beam of the wavelength k2 is diffracted in a direction substantially perpendicular to end face 15b. Owing to this, compared to the light beam of a wavelength λ2, the light beam of a wavelength λ2+Δ, which is longer than the wavelength λ2, is diffracted being slightly inclined leftward.

FIG. 18 (b) shows spectroscopy characteristics when a light beam is inputted to the input light guide 11b-2. Here, the light beams of wavelength λ1, λ2, λ3 and a little longer wavelength λ1+Δ, λ2+Δ, λ3+Δ are spatially separated respectively as shown in FIG. 18(b). Here, the light beam of a wavelength λ2+Δ, which is longer than the light beam of a wavelength λ2, is diffracted in a direction perpendicular to the end face 15b. Owing to this, the light beam of wavelength λ2, which is shorter wavelength, is diffracted with its front end being slightly inclined rightward.

Therefore, as shown in FIG. 18(c), when the light beams of wavelength λ1, λ2 and λ3 are inputted to the input light guide 11b-1, and the light beams of wavelength λ1+Δ, λ2+Δ, and λ3+Δ are inputted to the input light guide 11b-2, the light beam of the wavelength λ1 and the light beam of the wavelength λ1+Δ, the light beam of the wavelength k2 and the light beam of the wavelength λ2+Δ, and the light beam of the wavelength λ3 and the light beam of the wavelength λ3+Δ are diffracted respectively being overlapped with each other at the same angle. Owing to this, the light guide device 2b can be employed as an optical diffraction section for outputting light beams having different spectrums while spatially overlapping with each other.

In the light guide device 2b shown in FIG. 17(a) to FIG. 17(c), only by connecting and bonding the input light guides 11b-1 and 11b-2 the above-described light guide device 1a as the light dividing section 1 shown as an example in FIG. 2 so that the output guides 28 and 27 come into contact therewith, the light beams can be inputted thereto. Therefore, compared to the configuration in which the diffraction grating 2 is used, optical coupling by the first lens 61 is not required. Thus, such effect that the device can be fabricated easily and reduced in size is obtained.

As a light guide device 2b' shown in FIG. 19, the end portion 16b opposite to the input slab 12b of the channel guide 13b in the light guide device 2b shown in FIG. 17(a) and FIG. 17(c) may be formed into a core pattern which is integrally formed as an integral portion 16b'.

[A-332] Light Guide Device 2c

Same as the light guide device 2b shown in FIG. 17(a) to FIG. 17(c), a light guide device 2c shown in FIG. 20(a) and FIG. 20(b) also constitutes an optical diffraction section through which the diffraction direction changes depending on the inputting method of light beam and the light wavelength. As the inputting method of light beam, an incident-position dependent light diffraction section through which the diffraction direction changes depending on the incident-position light beam is configured. FIG. 20(a) is a front view of the light guide device 2c; and FIG. 20(b) is a side view of the light guide device 2c in FIG. 20(a) viewed from the arrowhead V3.

Same as the above-described light guide device 2b shown in FIG. 17(a) to FIG. 17(c), the light guide device 2c is also a flat light guide device which includes a flat substrate 101, a clad 102 formed on the substrate 101, and a core 103 having a refractive index higher than that of the clad 102. An array guide grating is formed with a pattern of the core 103.

That is, the pattern of the core 103 includes, basically the same as the above-described light guide device 2b (refer to reference numeral 11b-1, 11b-2, 12b and 13b), input light guides (input light guide pattern portion) 11c-1, 11c-2, an input slab (input slab pattern portion) 12c and a channel guide (channel guide pattern portion) 13c as well as an output slab (output slab pattern portion) 17c and an output guide (output guide pattern portion) 18c.

That is, a plurality (2) of input light guides 11c-1, 11c-2 corresponding to the number of the divided light beams (2, in this case) are formed with core section exposed at the end face position [refer to core 103 in FIG. 20(b)] to which a plurality of divided light beams, which are spatially divided by the light dividing section 1, are guided. Also, the input light guides 11c-1 and 11c-2 are connected to, for example, the output guides 28 and 27 of the light guide device 1a as the light dividing section 1 shown in FIG. 2, respectively and arranged so that the divided light beams from the light guide device 1a are guided to these input light guides 11c-1 and 11c-2.

Accordingly, when the light guide device 2c is employed as the wavelength-to-spacial-position-converter 5, the above-described first lens 61 shown in FIG. 1 does not have to be used.

Further, the input slab pattern portion 12c is formed with its one end continuously with the input light guides 11c-1 and 11c-2 so as to allow the light beams from the input light guides 11c-1 and 11c-2 to propagate freely while being diffracted and expanded, and the other end thereof has an arc pattern.

The output guide 18c includes a plurality of guide patterns, in which the section of the cores 103 is exposed at the output end face 15c. The output slab pattern portion 17c is formed with its one end continuous with the output guide 18c to allow the light beams from the output guide 18c to propagate freely while being diffracted and expanded, and the other end thereof has an arc pattern.

The channel guide 13c connects the arc pattern portion of the input slab pattern portion 12c to the arc pattern portion of the output slab pattern portion 17c, and the channel guide 13c includes a plurality of guide patterns disposed in parallel so that the length thereof changes sequentially.

Owing to this, the light guide device 2c as the incident-position dependent light diffraction section is arranged so that two divided light beams 3-1 and 3-2 are inputted to the input light guides 11c-2 and 11c-1 respectively, and the light beams in which each of the wavelength spectrum portions of the two divided light beams from the light dividing section 1 are multiplexed are outputted via the output guide 18c.

Multiplexing operation of wavelength spectrum portions in the divided light beams 3-1 and 3-2 by the light guide device 2c configured as described above will be described below.

FIG. 21(a) schematically shows the distribution of optical power in the boundary between the output slab 17c and the output guide 18c (hereinafter, referred to as imaginary plane) when light beams with wavelengths of λ1 and λ2, wavelength of λ1+Δ (Δ is ½ of difference between λ2 and λ1), which is an intermediate wavelength between λ1 and λ2, and wavelength of λ2+Δ, which is longer than λ2 by Δ, are inputted to the lower input light guide 11c-2. The clearance of the output guide 18c is adjusted so that the outputted wavelength difference is 2Δ (equal to the wavelength difference between λ2 and λ1).

In the case shown in FIG. 21(a), a light beam of wavelength λ2 is outputted to the output guide 18c-3, and a light beam of wavelength λ1 is outputted to the output guide 18c-4. On the other hand, the light beams of wavelength λ1+Δ and wavelength λ2+Δ hit on the midpoint between the output guides 18-3 and 18-4 and scattered. Therefore, the spectrums of the light beams, which are outputted from the output guides 18c-3 and 18c-4, are the spectrums from which the spectrums adjacent to the wavelength λ1+Δ and wavelength λ2+Δ are lost.

FIG. 21(b) schematically shows the distribution of optical power on the imaginary plane when a light beam of wavelengths λ1, λ2, λ1+Δ and λ2+Δ is inputted to the upper input light guide 11c-1. In the case shown in FIG. 21(b), a light beam with wavelength of λ2+Δ is outputted to the output guide 18c-3 and a light beam with wavelength of λ1+Δ is outputted to the output guide 18c-4. On the other hand, light beams with wavelength λ1 and wavelength λ2 hit on the midpoint between the output guides 18c-3 and 18c-4 and are scattered. Therefore, the spectrums of the light beam outputted from the output guides 18c-3 and 18c-4 are the spectrums from which spectrums adjacent to the wavelength λ1 and the wavelength λ2 are lost.

Figure 22:
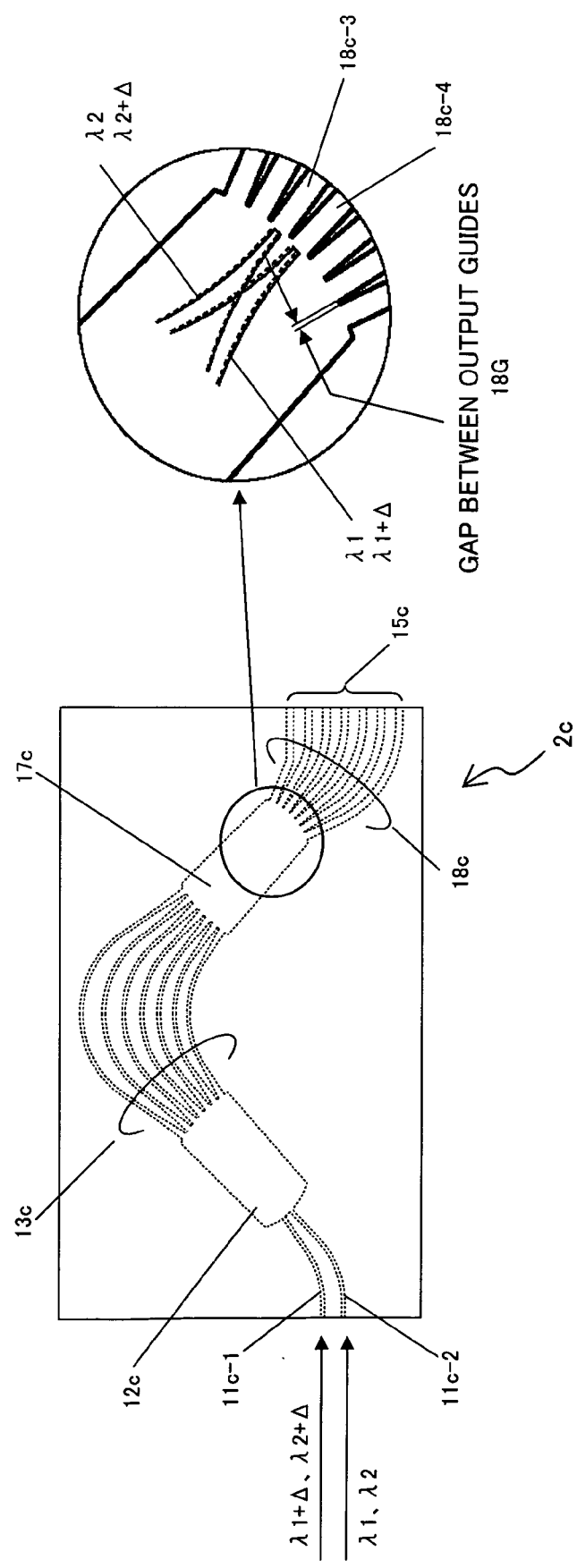

FIG. 22 schematically shows the distribution of the optical power on the imaginary plane when light beams with wavelength of λ1+Δ and wavelength of λ2+Δ are inputted to the upper input light guide 11c-1, and light beams with wavelength of λ1 and λ2 are inputted to the lower input light guide 11c-2. In this case, the light beams with wavelength λ1 and λ1+Δ are multiplexed and coupled to the output guide 18c-4; and the light beams with wavelength λ2 and λ2+Δ are multiplexed and coupled to the output guide 18c-3.

Therefore, when light beams having the wavelength distribution as shown in FIG. 22 are inputted to the input light guides 11c-1 and 11c-2, the light beams with spectrums adjacent to the wavelength λ2 and λ2+Δ are outputted (being multiplexed) to the output guide 18c-3; the light beams with spectrums adjacent to wavelength λ1 and λ1+Δ are outputted (being multiplexed) to the output guide 18c-4. In this case, there is no spectrum that hits on the midpoint between the output guides and scattered; thus, such effect that no spectrum is lost is obtained.

The light beams with wavelength distribution shown in FIG. 22 are, same as the divided light beams 3-1 and 3-2 outputted from the light guide device 1a shown in FIG. 2, the light beams in which wavelength spectrum portion is distributed. Accordingly, by coupling the input light guides 11c-1 and 11c-2 on the light guide device 2c having such configuration as shown in FIG. 20(a) and FIG. 20(b) with, for example, the output guides 28 and 27 of the light guide device 1a shown in FIG. 2, light beams in which the wavelength spectrum portions are multiplexed can be outputted through each of the output guides 18c without loss of spectrum. That is, multiplexed light beams, which are separated based on wavelength, can be outputted including a spatial clearance respectively.

When the above-described gaps 18G between the output guides shown in FIG. 22 are made smaller, the spectrum can be further prevented from being lost.

[A-333] Others

As described in detail in [A-31] of the above-described first embodiment, in the case where the light dividing section 1 is configured so as to output two or more divided light beams, by appropriately changing the number of input light guides in the light guide device 2b, 2b' or 2c corresponding to the number of divided light beams, the light dividing section 1 can be configured so as to multiplex the wavelength spectrum portions with respect to the divided light beams. Further, the number of the output guides 18c also may be appropriately changed corresponding to the number of the wavelength spectrum portions (divided wavebands) included in a divided light beam.

[B] Description of Second Embodiment

[B-11] Configuration

Figure 23:
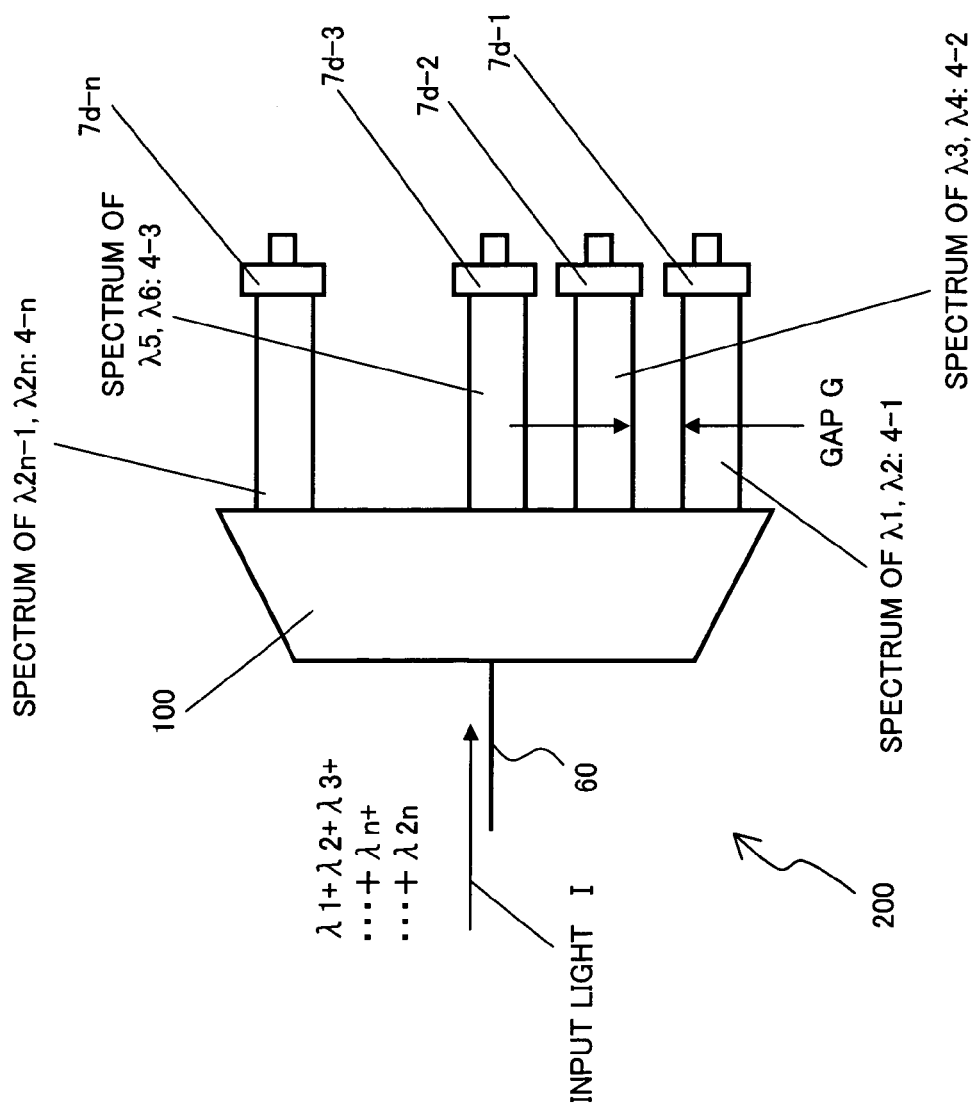
FIG. 23 and FIG. 24 are diagrams each showing an optical device according to a second embodiment of the present invention.
Figure 24:
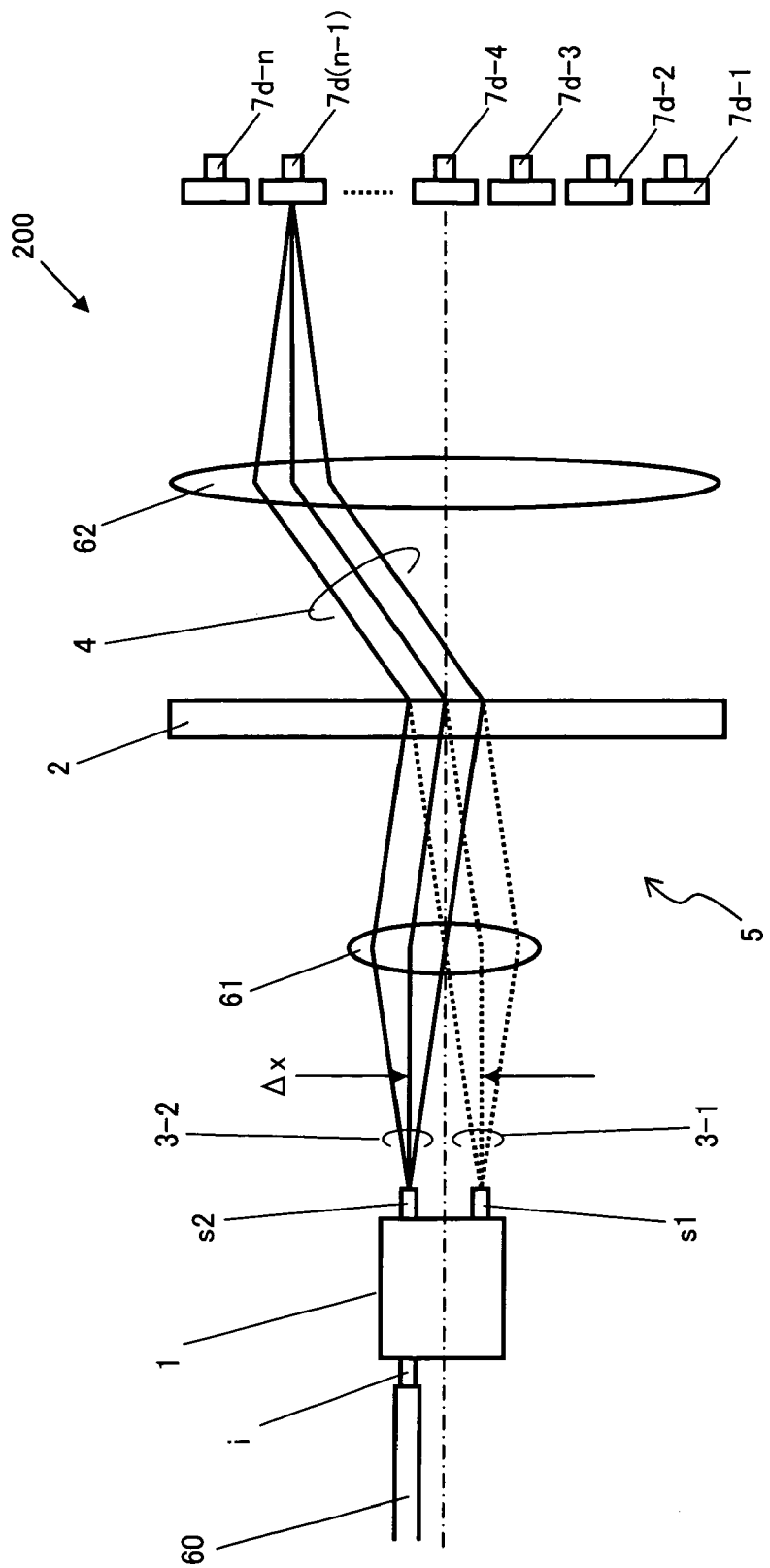

FIG. 23 and FIG. 24 show an optical device 200 according to a second embodiment of the present invention. As shown in FIG. 23 and FIG. 24, the optical device 200 according to the second embodiment includes a light dividing section 1, a first lens 61, a diffraction grating 2 and a second lens 62, which are the same as those in the above-described optical device 100 according to the first embodiment. However, the optical device 200 is different from the optical device 100 in a point that photo electric transfer elements 7d-1 to 7d-n corresponding to the number of second wavebands constituting multiplexed wavelength spectrum portion; that is, the number (n) of wavelength-separated light beams 6-1 to 6-n are included.

The photo electric transfer elements 7d-1 to 7d-n constitute optical elements that process the light beams constituting wavelength spectrum portions, which are spatially multiplexed by the wavelength-to-spacial-position-converter 5. In particular, the photo electric transfer elements 7d-1 to 7d-n are adapted so as to receive, respectively, wavelength-separated light beams 6-1 to 6-n outputted from the second lens 62 and convert to electrical signals corresponding to the received optical power.

That is, same as the case of the first embodiment, the wavelength-separated light beams 6-1 to 6-n, which are outputted from the second lens 62, include spatial clearances G. Accordingly, the photoelectric transfer elements 7d-1 to 7d-n for receiving the wavelength-separated light beams 6-1 to 6-n are adopted respectively so as to receive wavelength-separated light beams 6-1 to 6-n (refer to FIG. 23) having spectrums 4-1 to 4-n, which are multiplexed by the diffraction grating 2.

In these wavelength-separated light beams 6-1 to 6-n, as shown in FIG. 7, the wavebands of the spatially neighboring light beams, which are separated based on wavelength, are continuous with each other including the clearance G. Accordingly, the photoelectric transfer elements 7d-1 to 7d-n can reduce the power error in the received light beams due to the fluctuation of the wavelength.

[B-12] Working-effect

In the optical device 200 also, which is configured as described above, when a multiplexed light beam divided based on wavelength as the input light beam I is inputted through the optical fiber 60, the wavelength-separated light beams 6-1 to 6-n are outputted through the first lens 61, the diffraction grating 2 and the second lens 62. In these wavelength-separated light beams 6-1 to 6-n, the neighboring wavelength-separated light beams 6-1 to 6-n are provided with spatial clearance G respectively, and in the wavebands 4-1 to 4-n in each of the wavelength-separated light beams 6-1 to 6-n, the wavelength spectrum portions, which are divided by the light dividing section 1, are multiplexed.

The wavelength-separated light beams 6-1 to 6-n, which are outputted as described above, are condensed respectively at the light receiving surfaces of the photoelectric transfer elements 7d-1 to 7d-n while the wavelength spectrum portions are multiplexed through the second lens 62. Accordingly, using the photoelectric transfer elements 7d-1 to 7d-n, which have a limited opening respectively, the optical power can be monitored with a small power error due to fluctuation of wavelength.

In particular, since the opening width of the photoelectric transfer elements 7d-1 to 7d-n can be made wider than the spatial width occupied by the wavelength-separated light beams 6-1 to 6-n, when each of the wavelength-separated light beams 6-1 to 6-n is photoelectrically transferred by the photoelectric transfer elements 7d-1 to 7d-n, photoelectric transfer having a flat spectrum can be obtained in a wide waveband including no loss of spectrum. Accordingly, such effect is obtained; that is, the optical power can be monitored with a small power error due to the fluctuation of wavelength.

For example, assuming that the diffraction grating 2 is a transmissive diffraction grating having in-grating pitch of 1 μm; the second lens 62 is a condenser having the focal distance of approximately 95 mm; clearance between the ports s1 and s2 of the light dividing section 1 is approximately 14 μm; and the focal distance of the first lens 61 is approximately 27 mm, the wavelength-separated light beams 6-1 to 6-n, which are divided based on wavelength including clearance of approximately 0.8 nm (100 GHZ), can be outputted through the second lens 62. Accordingly, the photoelectric transfer elements 7d-1 to 7d-n can be disposed in an array-like configuration at approximately 100 μm pitch. Here, when the width of the light-receiving surface of each of the photoelectric transfer elements 7d-1 to 7d-n is set to approximately 70 μm, the wavelength components divided by the light dividing section 1 can be received with no loss.

As described above, the optical device 200 in accordance with the second embodiment includes, in addition to the light dividing section 1 and the wavelength-to-spacial-position-converter 5, the photoelectric transfer elements 7d-1 to 7d-n. Therefore, photoelectric transfer having a flat spectrum can be achieved in a wide band including no loss of spectrum. Thus, such effect that optical power can be monitored with a small power error due to the fluctuation of wavelength is obtained.

Same as the case of the first embodiment, by setting the focal distance of the second lens 62 as the clearance-adjusting element, the clearances G between the wavelength-separated light beams 6-1 to 6-n can be changed. Therefore, by employing the second lens 62 of which focal distance is appropriately set up in accordance with the scale of the photoelectric transfer elements 7d-1 to 7d-n that receive the wavelength-separated light beams 6-1 to 6-n, the size of the device can be optimized while preventing the loss of spectrum in the photoelectric transfer elements 7d-1 to 7d-n.

[B-2] Modification

Figure 25:
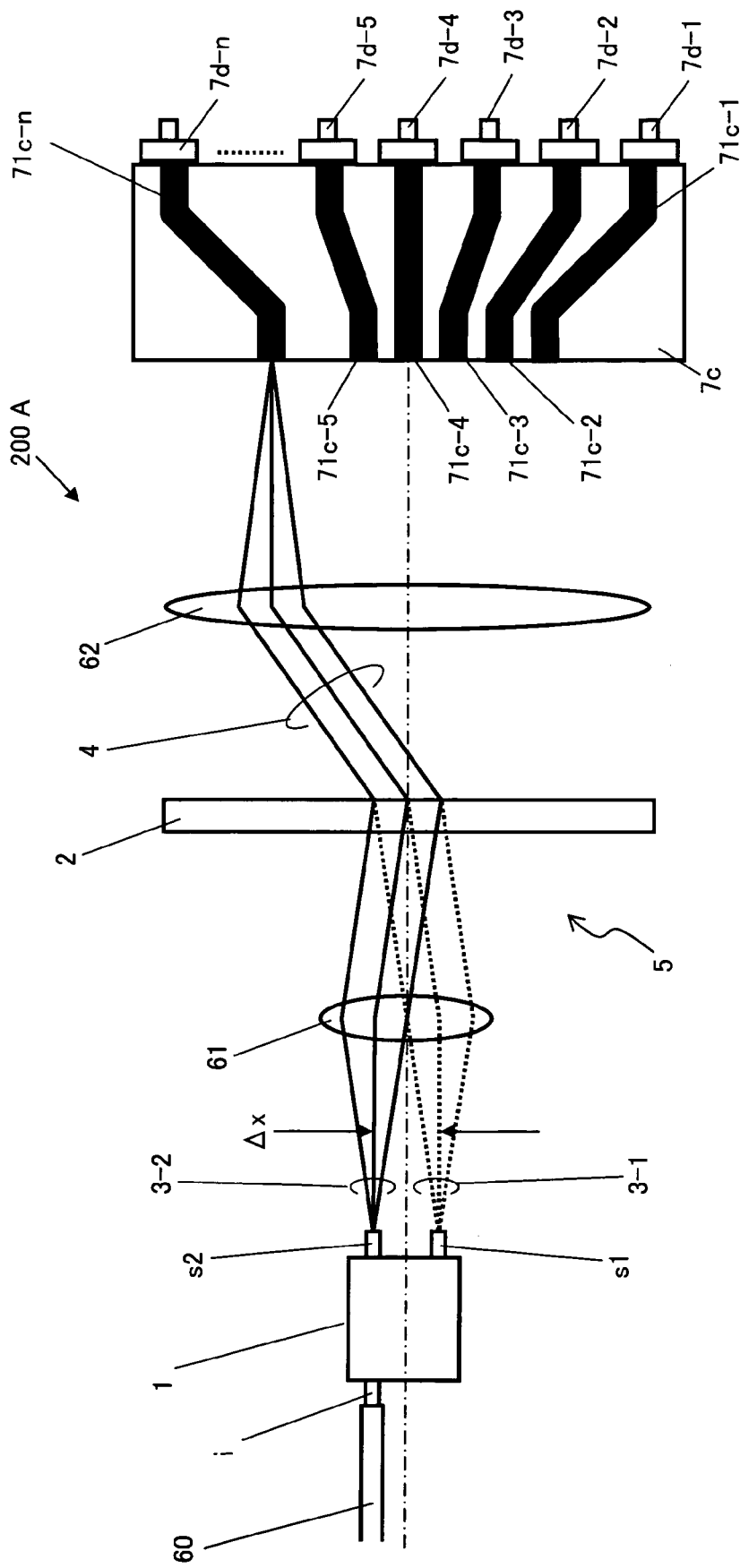
FIG. 25 to FIG. 30 are diagrams each showing an optical device according to a modification of the second embodiment of the present invention.

[B-21] Optical Device 200a Shown in FIG. 25

In the above-described second embodiment, for example, like an optical device 200A shown in FIG. 25, between the second lens 62 in the optical device 200 shown in FIG. 23 and FIG. 24 and the photoelectric transfer elements 7d-1 to 7d-n, a light guide device 7c for guiding the wavelength-separated light beams 6-1 to 6-n outputted from the second lens 62 to the photo electric transfer elements 7d-1 to 7d-n may be interposed.

The light guide device 7c includes n of light guides 71c-1 to 71c-n, and is adapted so that wavelength-separated light beams 6-1 to 6-n outputted from the second lens 62 are condensed respectively at one ends of these n of light guides 71c-1 to 71c-n. Owing to this, the wavelength-separated light beams 6-1 to 6-n can be optically coupled to the light guides 71c-1 to 71c-n respectively.

As shown in FIG. 25, in order to couple the wavelength-separated light beams 6-1 to 6-n with the light guides 71c-1 to 71c-n at relatively high efficiency, one end of the light guides 71c-1 to 71c-n is formed including in guide clearances G equivalent to the clearances G included in the wavelength-separated light beams 6-1 to 6-n, and the respective clearances expand at the other end. Owing to this, it is arranged so that the wavelength-separated light beams 6-1 to 6-n are outputted including clearances larger than the clearances G at a point when the light beams are inputted to the light guides 71c-1 to 71c-n.

Therefore, the above light guide device 7c constitutes a clearance-adjusting element for adjusting the clearances of the wavelength-separated light beams 6-1 to 6-n along with the second lens 62.

The photoelectric transfer elements 7d-1 to 7d-n are connected and fixed to the other end of the light guides 71c-1 to 71c-n respectively to receive wavelength-separated light beams 6-1 to 6-n, which propagate through the light guides 71c-1 to 71c-n and are outputted therefrom, and output electrical signals corresponding to the received optical power.

In the optical device 200A configured as described above, since the light guide device 7c is provided, the pitch of the wavelength-separated light beams 6-1 to 6-n, which are outputted through the light guide device 7c, can be enlarged. For example, as the photodiodes, using separate airtight-sealed photodiodes may be employed and disposed at a larger pitch. Also, by employing a photodiode, which has a large light receiving section, the positional displacement tolerance of the photodiode can be set largely. Further, such effect that, for example, an optical fiber array with pitch of approximately 250 μm can be connected and the like is obtained.

For example, by setting the clearance between the ports s1 an s2 of the light dividing section 1 to approximately 14 μm; the focal distance of the first lens 61 to approximately 27 mm; the width of the light guides 71c-1 to 71c-n constituting the light guide device 7c to 70 μm; the pitch of the input side end portion of the light guides 71c-1 to 71c-n to approximately 100 μm; and the pitch of the output side end portion to approximately 250 μm being disposed in an array, the above-described effect can be obtained.

Or, each of the wavelength-separated light beams 6-1 to 6-n can be guided to an arbitrary point. Therefore, the layout position of the photoelectric transfer elements 7d-1 to 7d-n can be prevented from interfering each other. In particular, photoelectric transfer elements 7d-1 to 7d-n, which has a relatively large opening (light receiving section), can be disposed easily; thus, the device can be fabricated easily.

The above-described mode that the light guide device 7c is provided behind the second lens 62 as shown in FIG. 25 can be applied to the above-described optical device 100 according to the first embodiment. By arranging as described above, the following effect such that the control of light path, for example, to change the pitch of the wavelength-separated light beams 6-1 to 6-n or the propagation direction of the light beams can be obtained.

[B-22] Modification of the Wavelength Spectrum Multiplexing Section 5

In the above-described optical device 200 according to the second embodiment also, various modifications of the first embodiment can be appropriately applied.

Figure 26:
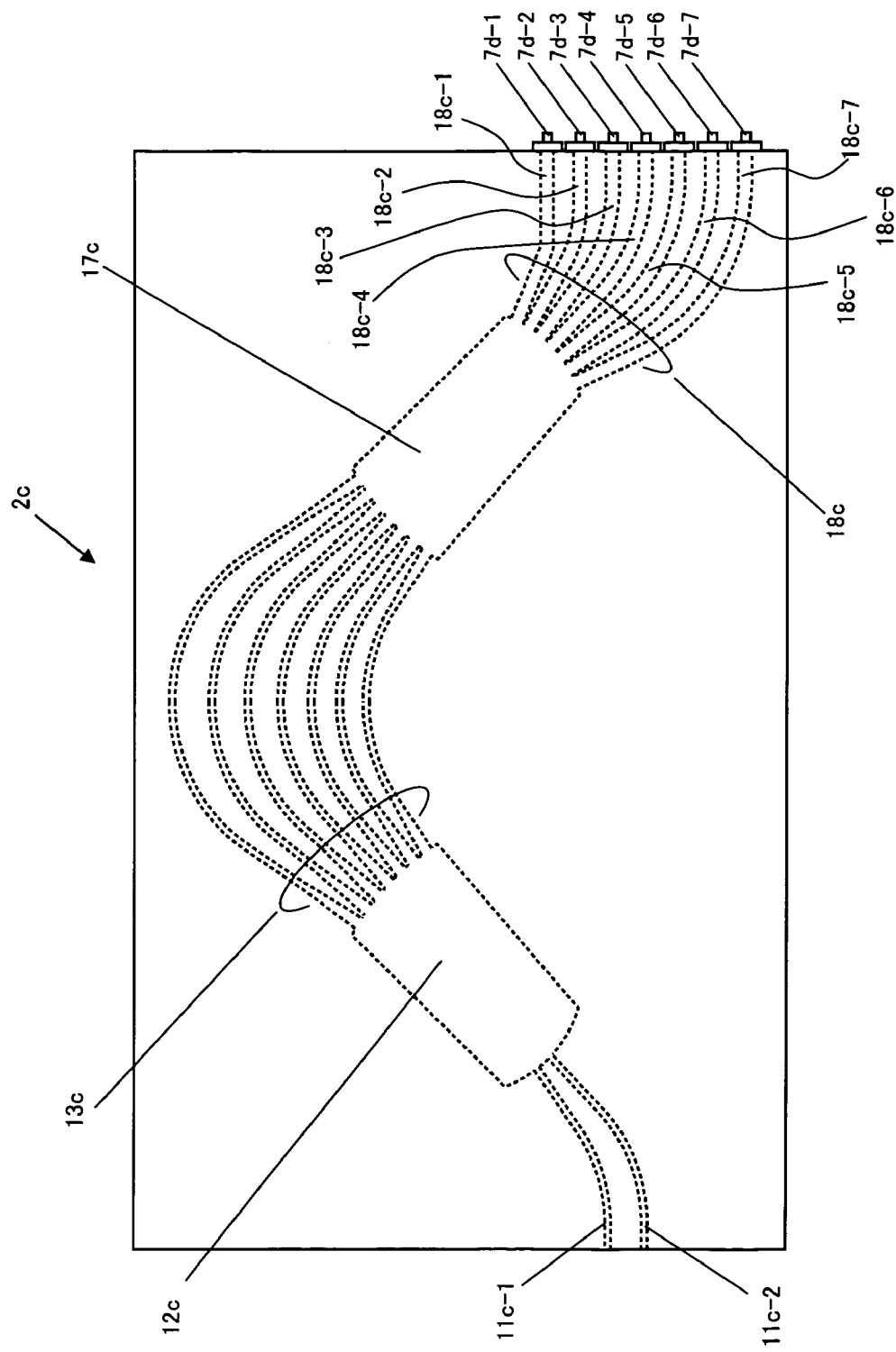

For example, when the above-described light guide device 2c shown in FIG. 20 is applied as the wavelength-to-spacial-position-converter 5, as show in FIG. 26, each of the photoelectric transfer elements 7d-1 to 7d-n (in case, n=7) can be connected and fixed to the output end portion of 7 waveguides 18c-1 to 18c-7 constituting the output guide 18c.

Owing to this, compared to the case where the first lens 61 and the diffraction grating 2 are used for the wavelength-to-spacial-position-converter 5, not only the first lens 61 but also the second lens 62 does not have to be interposed between the diffraction grating 2 and the photoelectric transfer elements 7d-1 to 7d-7.

By appropriately changing the forming pattern of the seven waveguides 18c-1 to 18c-7, which constitute the output guide 18c, the output guide 18c has a function as a clearance-adjusting element for adjusting the clearance of the wavelength-separated light beams 6-1 to 6-n in which wavelength spectrum portions are multiplexed.

Further, between the above-described waveguides 18c-1 to 18c-7 of the light guide device 2c, a portion for containing a gas may be formed. Owing to this, the difference between the refractive index of the core 103 constituting the output guide 18c and the ambient refractive index can be secured. Thus, the sealing effect of the wavelength-separated light beams in the waveguides 18c-1 to 18c-7 can be increased and defect of the spectrum can be further reduced.

Figure 27:
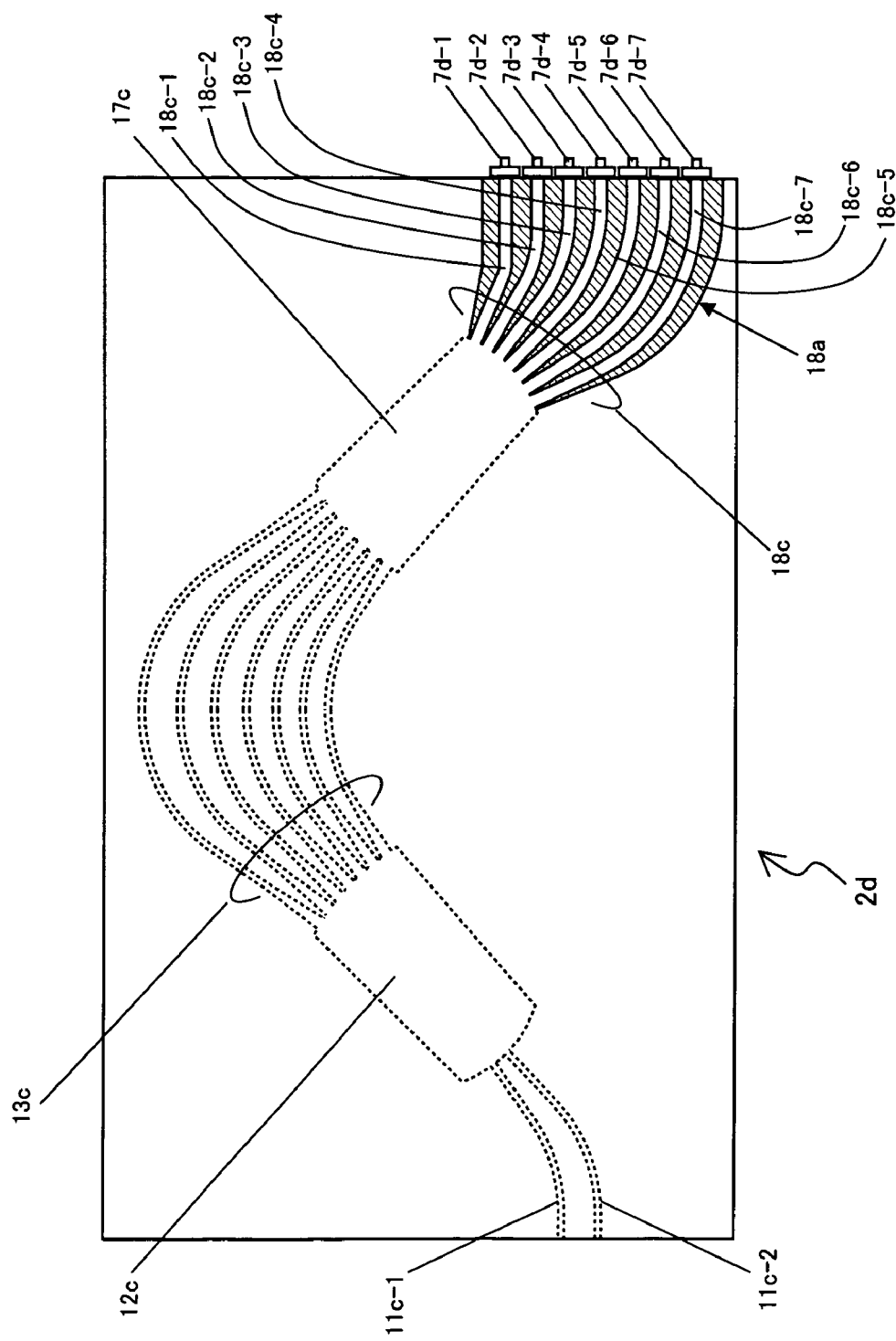
Figure 28:
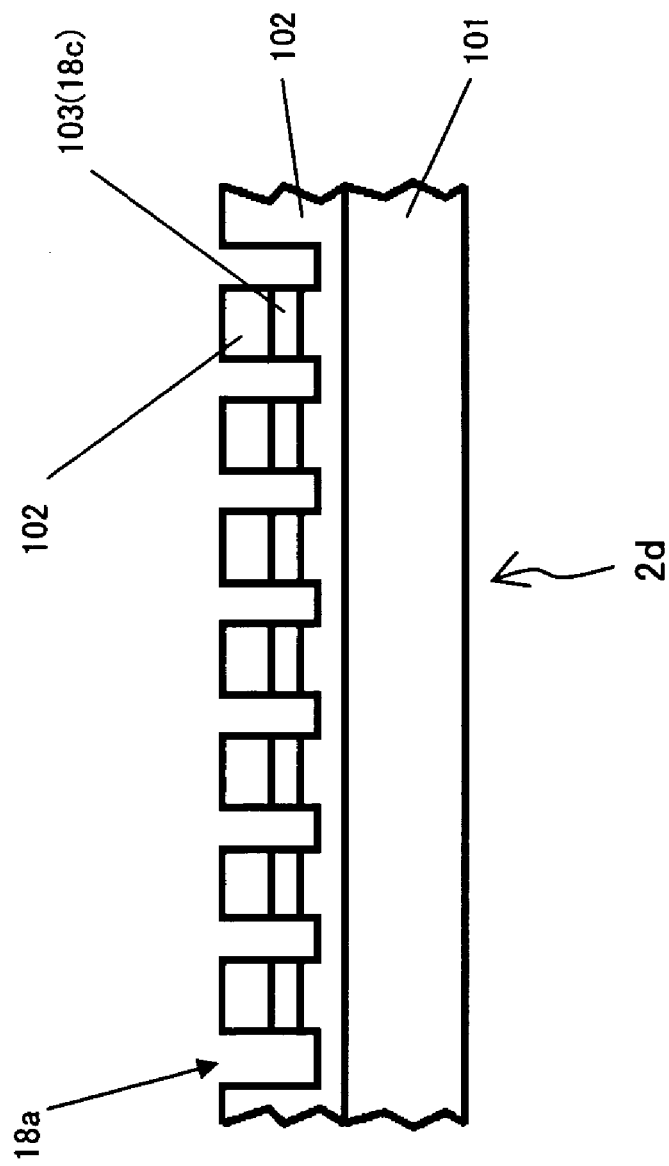

For example, like a light guide device 2d shown in FIG. 27 and FIG. 28, between the plurality of waveguides 18c-1 to 18c-7 constituting the output guides 18c, grooves 18a are formed. FIG. 28 is a sectional view of the light guide device 2d shown in FIG. 27 taking a portion of the waveguides 18c-1 to 18c-7 as an example. As shown in FIG. 28, since both sides of the core 103 constituting the output guides 18c are formed as an air layer, the difference of refractive index between the waveguides 18c-1 to 18c-7 and the ambient can be secured.

Accordingly, same as the above-described light guide device 2c, in the light guide device 2d shown in FIG. 27 also, in addition to the following effects that flat light receiving characteristics with respect to the wavelength in a wide band can be obtained; and even when the wavelength of the light source changes, since the light receiving efficiency does not change, error in light output measurement is reduced, the sealing effect of the wavelength-separated light beams propagating through the waveguides 18c-1 to 18c-7 is increased; thus, the loss due to scattering can be reduced.

Figure 29:
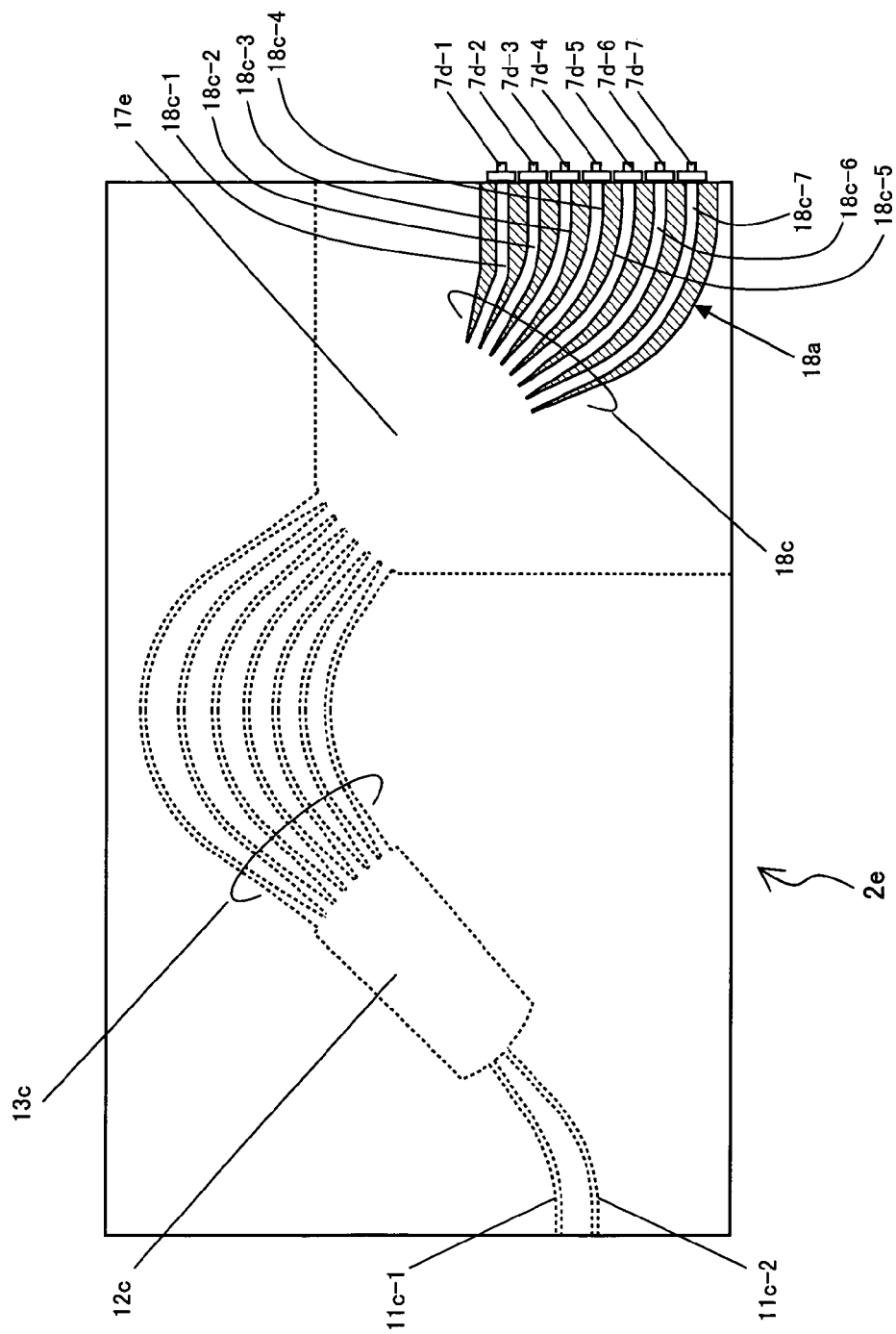

Further, for example, like a light guide device 2e shown in FIG. 29, the core pattern, which functions as the output slab and the output guide may be modified. That is, the core pattern at the side, to which photoelectric transfer elements 7d-1 to 7d-7 are connected and fixed and is opposite to the channel guide 13c, is formed like a core pattern 17e shown in FIG. 29, and grooves 18a having the same pattern as the above-described case shown in FIG. 27 and FIG. 28 are formed. Owing to this, like the case shown in FIG. 27 and FIG. 28, the areas sandwiched by these grooves 18a can be utilized as the waveguides 18c-1 to 18c-7 constituting the output guides.

In the light guide device 2e configured as described above, since the light beams outputted from the channel guide 13c are diffracted, same as the above-described case shown in FIG. 22, each of the wavelength components are coupled to waveguides 18c-1 to 18c-7. Accordingly, in these waveguides 18c-1 to 18c-7 also, same as the case shown in FIG. 20, the wavelength-separated light beams can be outputted therefrom while securing the sealing effect of the propagating light beams.

Figure 30:
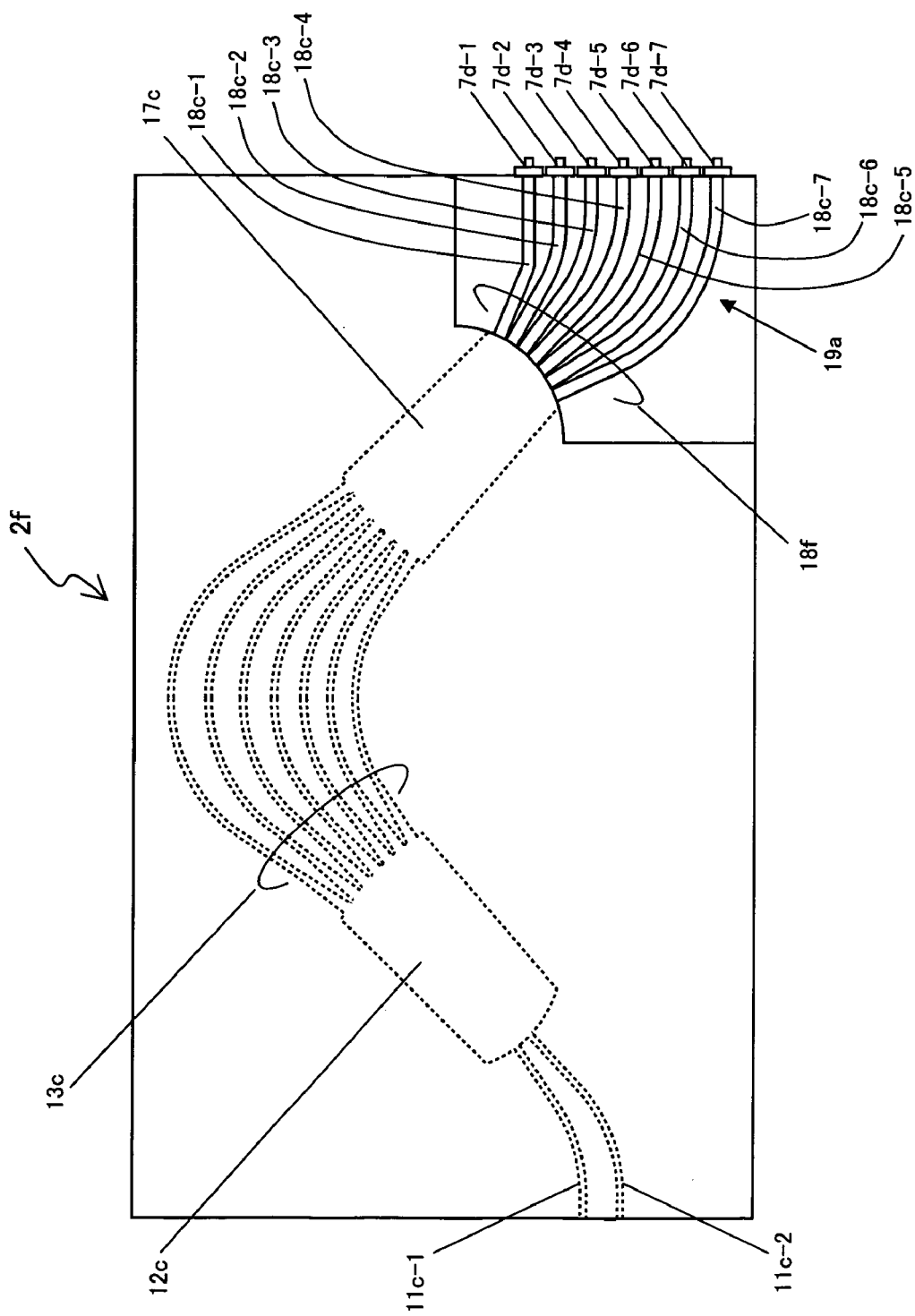
Figure 31:
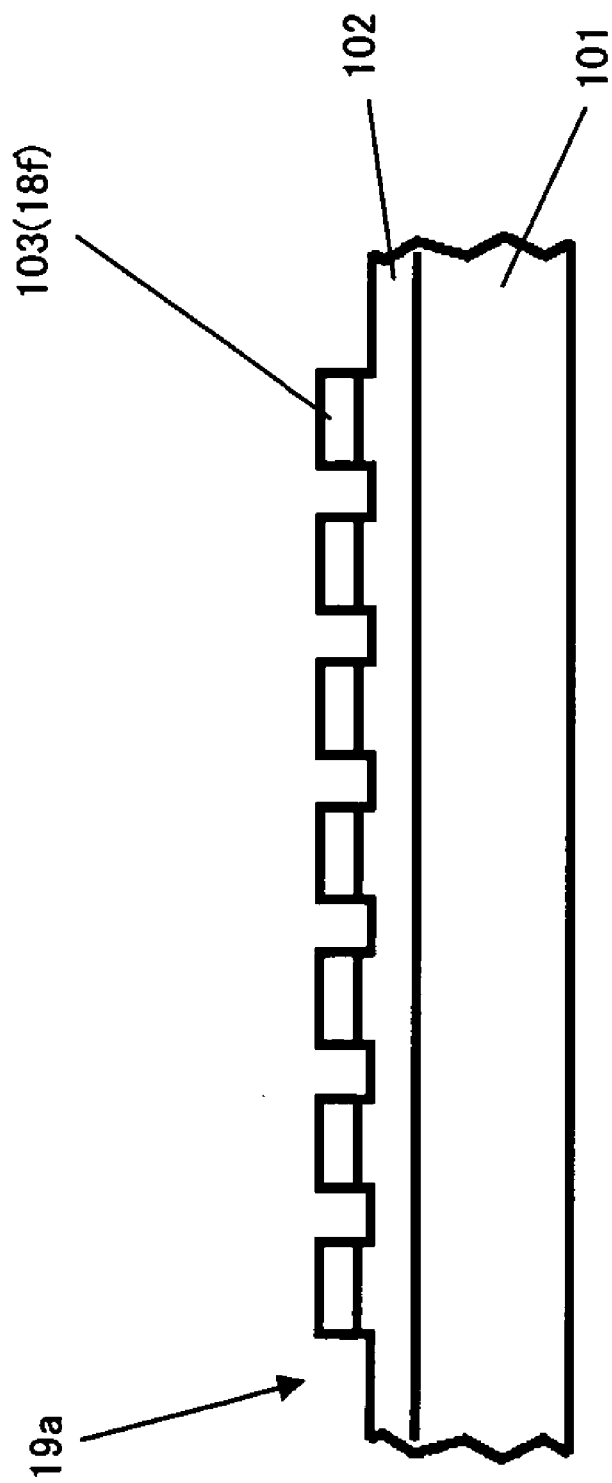
FIG. 31 is a diagram showing an essential portion of the optical device shown in FIG. 30.

Further, like a light guide device 2f shown in FIG. 30 and FIG. 31, along the forming line of the one end of the output slab 17c, the over clad 102 of an area 19a including at least output guide 18f is removed. FIG. 31 is a sectional view of the light guide device 2f shown in FIG. 30 taking a portion of the waveguides 18f-1 to 18f-7 as an example. As shown in FIG. 31, by removing the over clad (clad of the upper layer with respect to the substrate 101 of the core 103) 102 of the area 19a, such configuration that the core 103 as the waveguides 18f-1 to 18f-7 is exposed is obtained.

Figure 32:
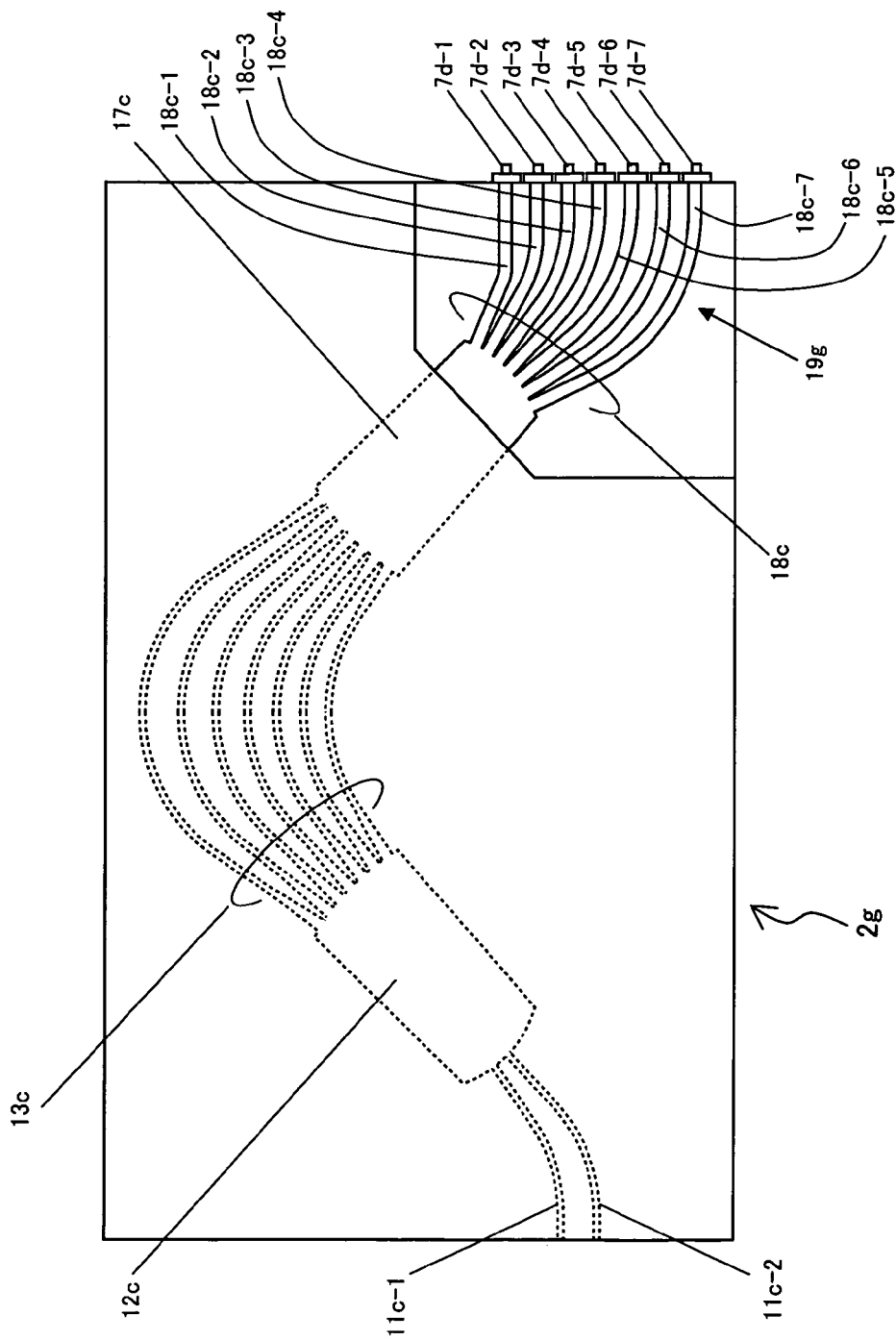
FIG. 32 to FIG. 34 are diagrams each showing an optical device according to a modification of the second embodiment of the present invention.
Figure 33:
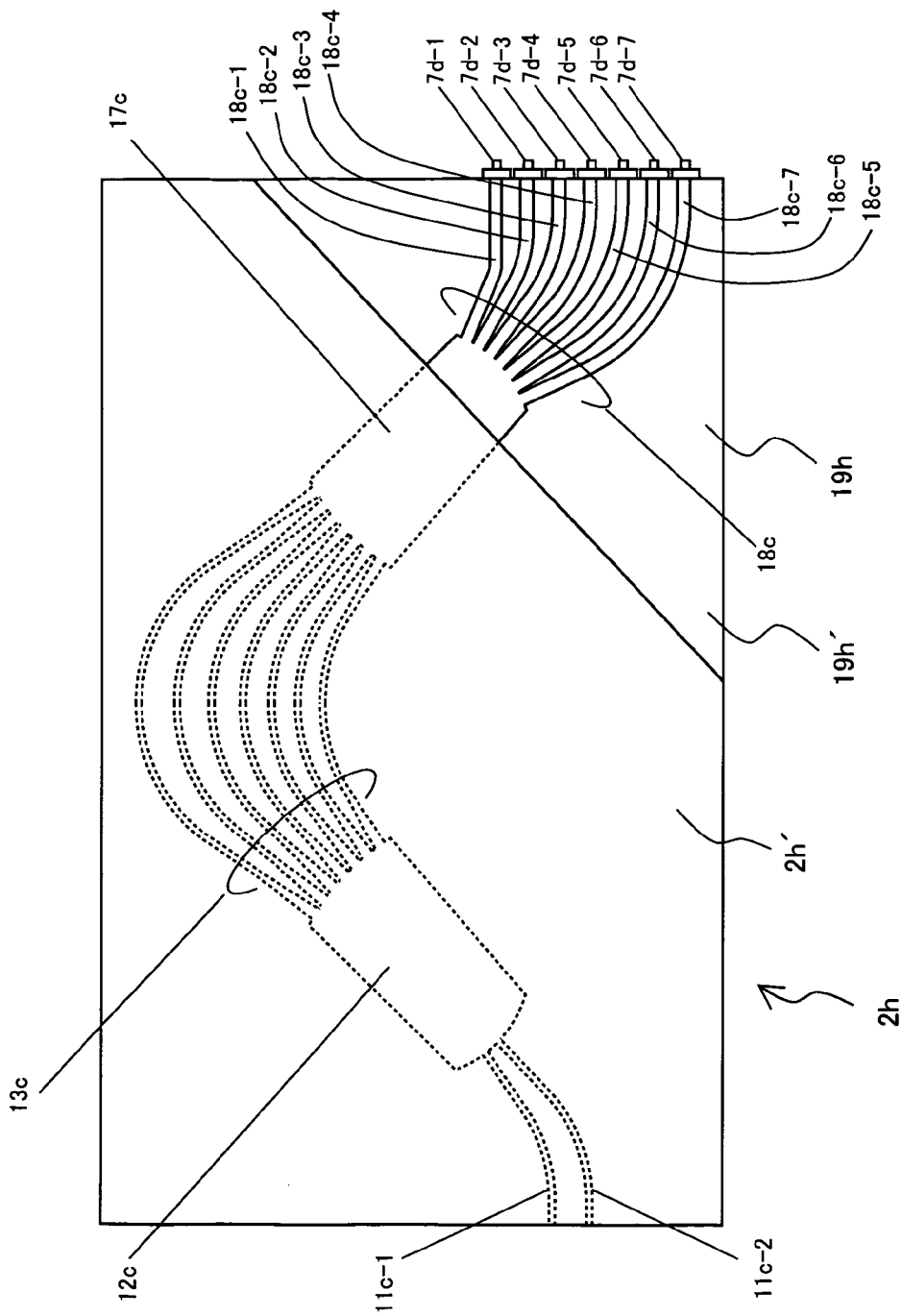

The pattern of area 19, in which the above-described over clad 102 shown in FIG. 30 is removed to expose the core 103, for example, may be appropriately modified like an area 19g, 19h of a light guide device 2g, 2h shown in FIG. 32 or FIG. 33. In these cases, since it is not necessary to remove the over clad 102 along one end portion of the output slab 17c, it is not necessary to precisely position a mask pattern such as photo resist for defining the portion from which the over clad should be removed; thus, the manufacturing thereof becomes easier.

Further, in the light guide device 2h shown in FIG. 33, the portion of the area 19h is configured as a flat optical circuit chip 19h' of a separate element. That is, the light guide device 2h includes a chip 2h' on which the input light guides 11c-1 and 11c-2, the input slab 12c, the channel guide 13c and a part of the output slab 17c are formed, and also includes a chip 19h' on which the rest of the output slab 17c and the core 103 constituting the output guide 18c are exposed with the over clad 102 removed, and the chip 2h' and the chip 19h' are bonded and connected to each other.

In the light guide device 2h configured as described above, since the flat optical circuit chip 19h' as a separate component is used, the following effect is obtained. That is, since the chip 2h' on which the input light guides 11c-1 and 11c-2, the input slab 12c, the channel guide 13c and a part of the output slab 17c are formed and the chip 19h' are bonded, the manufacturing process for partially removing the over clad is not necessary.

Figure 34:
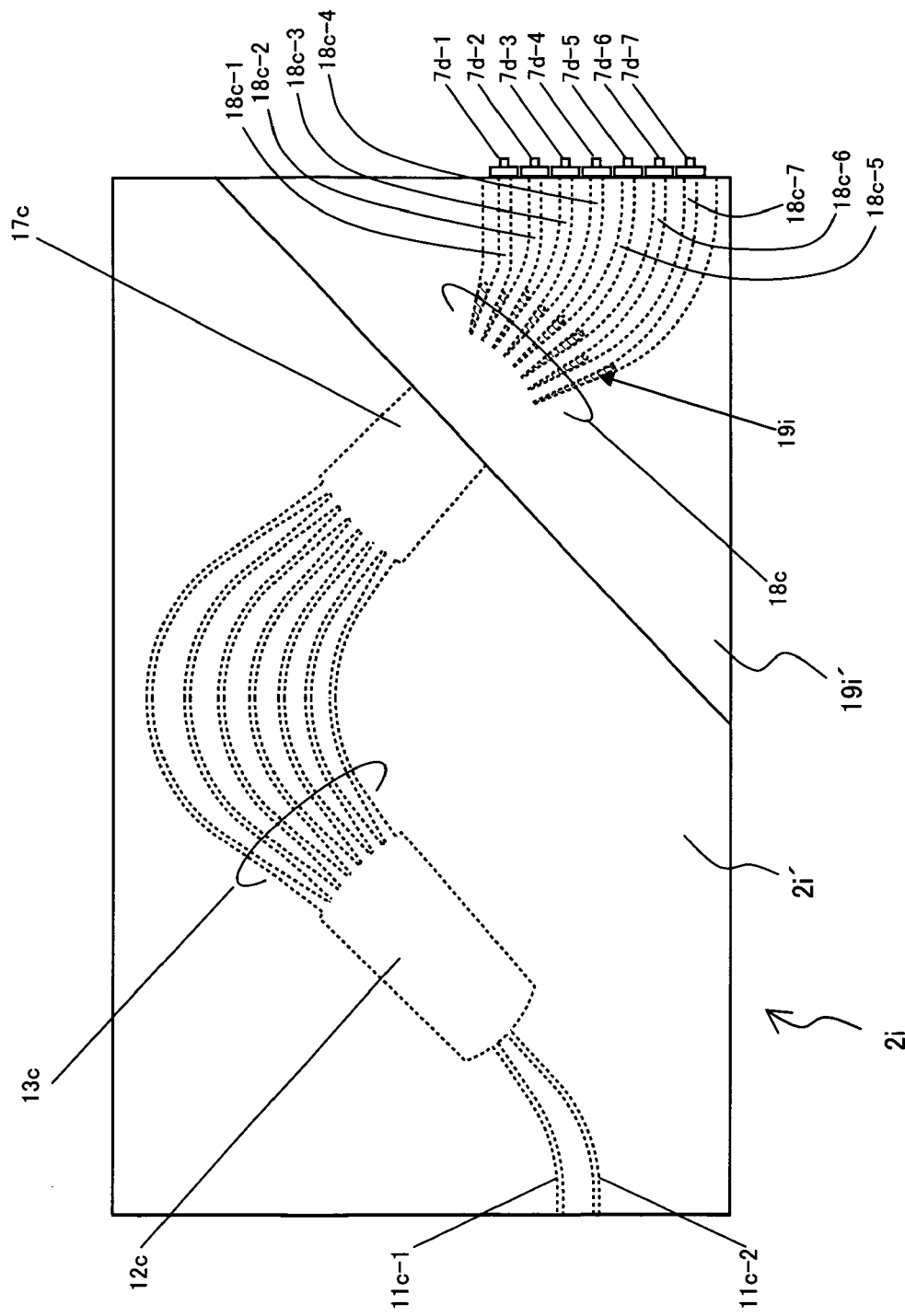

Further, a light guide device 2i shown in FIG. 34 is different from the light guide device 2h in a point that a chip 19i' of which configuration is different from that of the flat optical circuit chip 19h' is bonded and connected to a chip 2i' which is the same as the light guide device 2h shown in FIG. 33. Here, on the flat optical circuit chip 19i', the rest pattern (refer to FIG. 33) of the output slab 17c is not formed, but only the pattern of the waveguides 18c-1 to 18c-7 constituting the output guide 18c is formed as the pattern of the core 103.

Here, the pattern of the core 103 as the output guide 18c is formed by transferring a mask pattern to photoresist by means of photolithography processing, which is a standard manufacturing process for light guide device and by carrying out reactive ion etching (RIE) using the mask pattern of the photoresist as a mask. And for example, for depositing the material for over clad after forming the pattern of the core 103 constituting the output guide 18c, a technique of CVD is applied.

Figure 35:
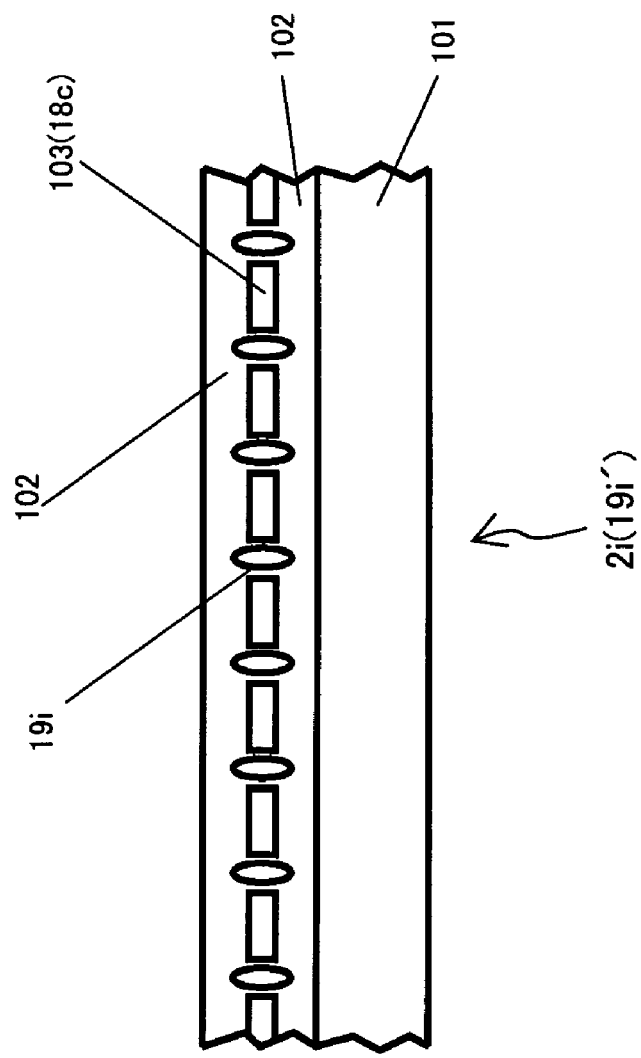
FIG. 35 shows an essential portion of the optical device shown in FIG. 34.

FIG. 35 is a sectional view taking the portion of the waveguide 18c-1 to 18c-7 in the light guide device 2i shown in FIG. 34 as an example. By applying the technique of CVD method for depositing the material of the over clad, as shown in FIG. 35, between the waveguides 18c-1 to 18c-7 at the side to which a part of the output slab 17c is connected, spaces 19i in which a gas is embedded can be formed.

As for the space 19i, the size thereof varies depending on the heat treatment temperature; the higher temperature of heat treatment results in the smaller size; and when the temperature of heat treatment exceeds a specific value, the space 19i disappears. For example, when the chip 2h' is heat-treated at a high temperature, and the chip 19i' is heat-treated at a low temperature, the chip 2h' without the space 19i and the chip 19i' with the space 19i can be manufactured.

Therefore, according to the light guide device 2i shown FIG. 34, same as the above-described case shown in FIG. 26, light beams in which wavelength spectrum portions are multiplexed can be outputted through the waveguides 18c-1 to 18c-7, and since extremely narrow space (clearance) 19i can be formed, such effect that the gap between the cores 103 constituting the waveguides 18c-1 to 18c-7 can be reduced is obtained. The smaller gap between the cores 103 results in the smaller defect in the spectrum of the outputted light beam.

The light guide devices 2d to 2i, which are shown as examples of modification of the above described wavelength-to-spacial-position-converter 5, are connected to the photoelectric transfer elements 7d-1 to 7d-7 respectively. Thus, the modification of the optical device 200 according to the second embodiment is constituted. The present invention is not limited to the above. Needles to say, these light guide devices 2d to 2i may be applied to the wavelength-to-spacial-position-converter 5 in the optical device 100 according to the first embodiment.

[B-3] Others

Further, the optical device 200 according to the second embodiment and the devices of the modification of the second embodiment may be appropriately modified and carried out for the substantially same purpose described in detail in [A-3] of the first embodiment.

[C] Description of Third Embodiment

[C-11] Configuration

Figure 36:
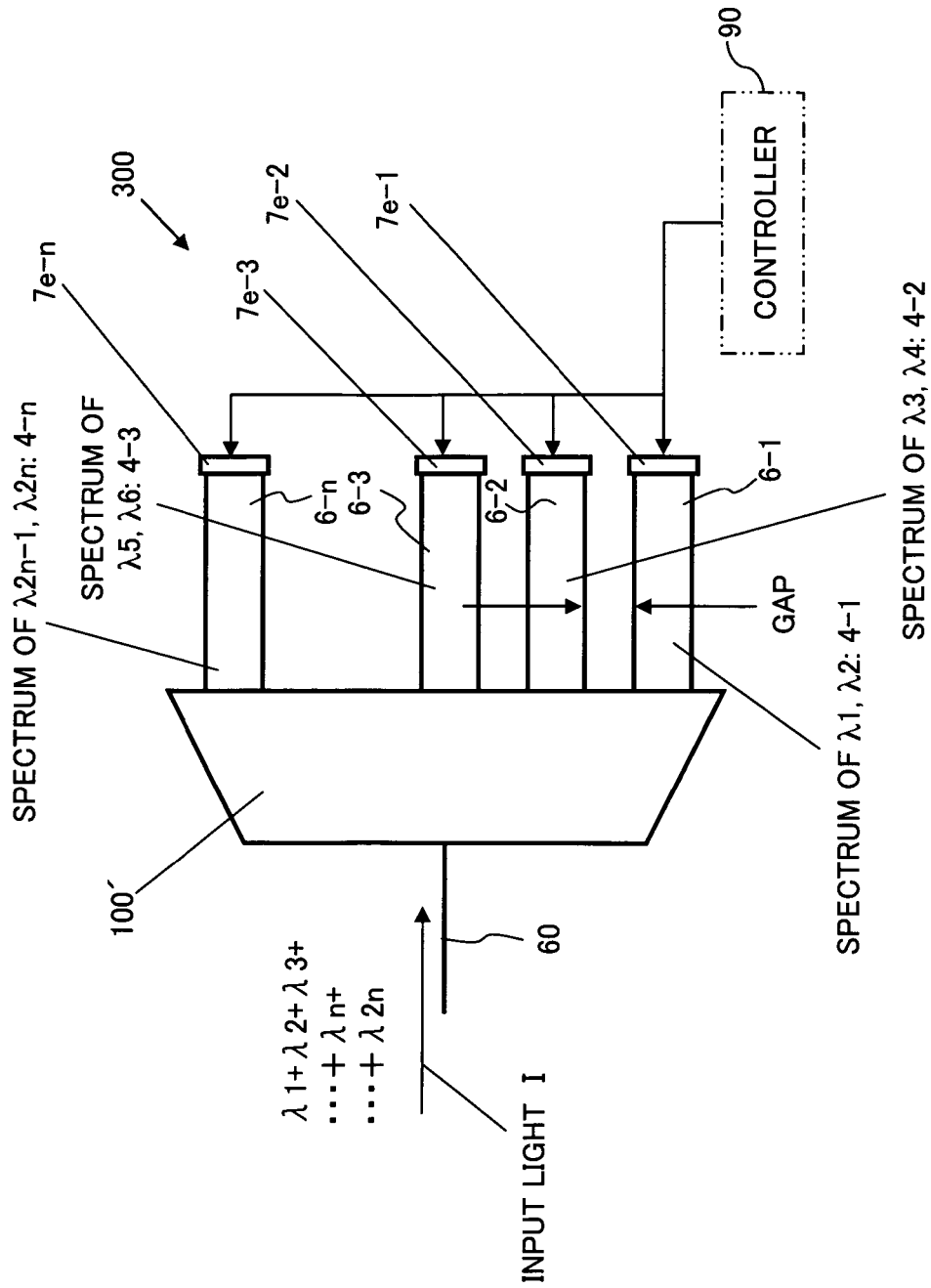
FIG. 36 shows an optical device according to a third embodiment of the present invention.

FIG. 36 shows an optical device 300 according to a third embodiment of the present invention. The optical device 300 according to the third embodiment includes an optical module 100', which is the same as the above-described optical device 100 according to the first embodiment. However, the optical device 300 is different from the optical device 100 in a point that the optical device 300 further includes a plurality of mirrors 7e-1 to 7e-n as optical elements of number corresponding to the number of second wavebands, which are the multiplexed wavelength spectrum portions; i.e., the number (n) of the wavelength-separated light beams 6-1 to 6-n, and a control section 90.

When an input light beam is inputted via the optical fiber 60, same as the case of the above described first embodiment, the optical module 100' outputs the wavelength-separated light beams 6-1 to 6-n of the inputted light beam through the light dividing section 1, the first lens 61, the diffraction grating 2 and the second lens 62 including the clearances G. These wavelength-separated light beams 6-1 to 6-n can be reflected by the mirrors 7e-1 to 7e-n respectively and returned to the optical fiber 60.

In the optical module 100', which has the same configuration as that of the optical device 100 according to the first embodiment, each component elements has a reversible function with respect to the light beams in the direction opposite the propagation direction of the input light beams (light beams, which are guided to the optical fiber 60 through the second lens 62, the diffraction grating 2, the first lens 61 and the light dividing section 1). The optical module 100' is adapted so that, when the reflected light beams with respect to the wavelength-separated light beams 6-1 to 6-n are inputted to the second lens 62, the reflected wavelength-separated light beams are subjected to the wavelength-division multiplex through the diffraction grating 2, the first lens 61 and the light dividing section 1, and guided to the optical fiber 60.

Same as the photoelectric transfer elements 7d-1 to 7d-n according to the above-described second embodiment, the mirrors 7e-1 to 7e-n also constitute optical elements that process the light beams constituting the wavelength spectrum portions, which are spatially multiplexed by the wavelength-to-spacial-position-converter 5. That is, these mirrors 7e-1 to 7e-n are configured as light reflecting elements that are capable of reflecting the light beams constituting the wavelength spectrum portions multiplexed by the wavelength-tospacial-position-converter 5 and changing the inclination angle with respect to the reflecting surface.

The control section 90 that controls to change the inclination angle with respect to the reflection plane of the mirrors 7e-1 to 7e-n is provided to control the reflection status of the light beams reflected by each of the mirrors 7e-1 to 7e-n. That is, an optical power control device, which changes the amount of the wavelength-separated light beams 6-1 to 6-n reflected by the mirrors 7e-1 to 7e-n to be coupled with the optical fiber 60 through the second lens 62, the diffraction grating 2 and the first lens 61, thereby controls the optical power based on the wavelength component of the inputted light beams, is obtained.

Each of the mirrors 7e-1 to 7e-n uses a mirror with a reflection plane having an area wider than the spatial spread of the wavelength-separated light beams 6-1 to 6-n. Accordingly, the optical power control device, which has no defect in the spectrum and flat optical transmission characteristics in wide band, is obtained.

[C-12] Working-effect

In the optical device 300 configured as described above also, when a wavelength-division multiplexed light beam is inputted as the input light beam I through the optical fiber 60, the wavelength-separated light beams 6-1 to 6-n are outputted through the first lens 61, the diffraction grating 2 and the second lens 62. In these wavelength-separated light beams 6-1 to 6-n, spatial clearances G are provided between the neighboring wavelength-separated light beams 6-1 to 6-n, and in the wavebands 4-1 to 4-n of each of the wavelength-separated light beams 6-1 to 6-n, wavelength spectrum portions divided by the light dividing section 1 are multiplexed.

The mirrors 7e-1 to 7e-n reflect and return these wavelength-separated light beams 6-1 to 6-n to the optical fiber 60 through the second lens 62, the diffraction grating 2 and the first lens 61. Here, the inclination angle with respect to the reflection plane of the mirrors 7e-1 to 7e-n is changed, and thereby the amount of the wavelength-separated light beams 6-1 to 6-n, which are reflected by the mirrors 7e-1 to 7e-n and coupled with the optical fiber 60, is changed. Owing to this, the optical power can be controlled based on the wavelength component of the inputted light beam.

The wavelength-separated light beams 6-1 to 6-n, which are outputted as described above, are, being multiplexed in their wavelength spectrum portions respectively, condensed on the light-receiving surface of the mirrors 7e-1 to 7e-n through the second lens 62. Using the mirrors 7e-1 to 7e-n, which have a reflection plane with limited area respectively, the optical power control device with a small power error due to fluctuation of wavelength can be realized.

As described above, the optical device 300 according to the third embodiment of the present invention includes, in addition to the light dividing section 1 and the wavelength-to-spacial-position-converter 5, the mirrors 7e-1 to 7e-n. Accordingly, such an advantage that the optical power control with small power error due to the fluctuation of wavelength can be made is obtained.

[C-2] Modification

Figure 37:
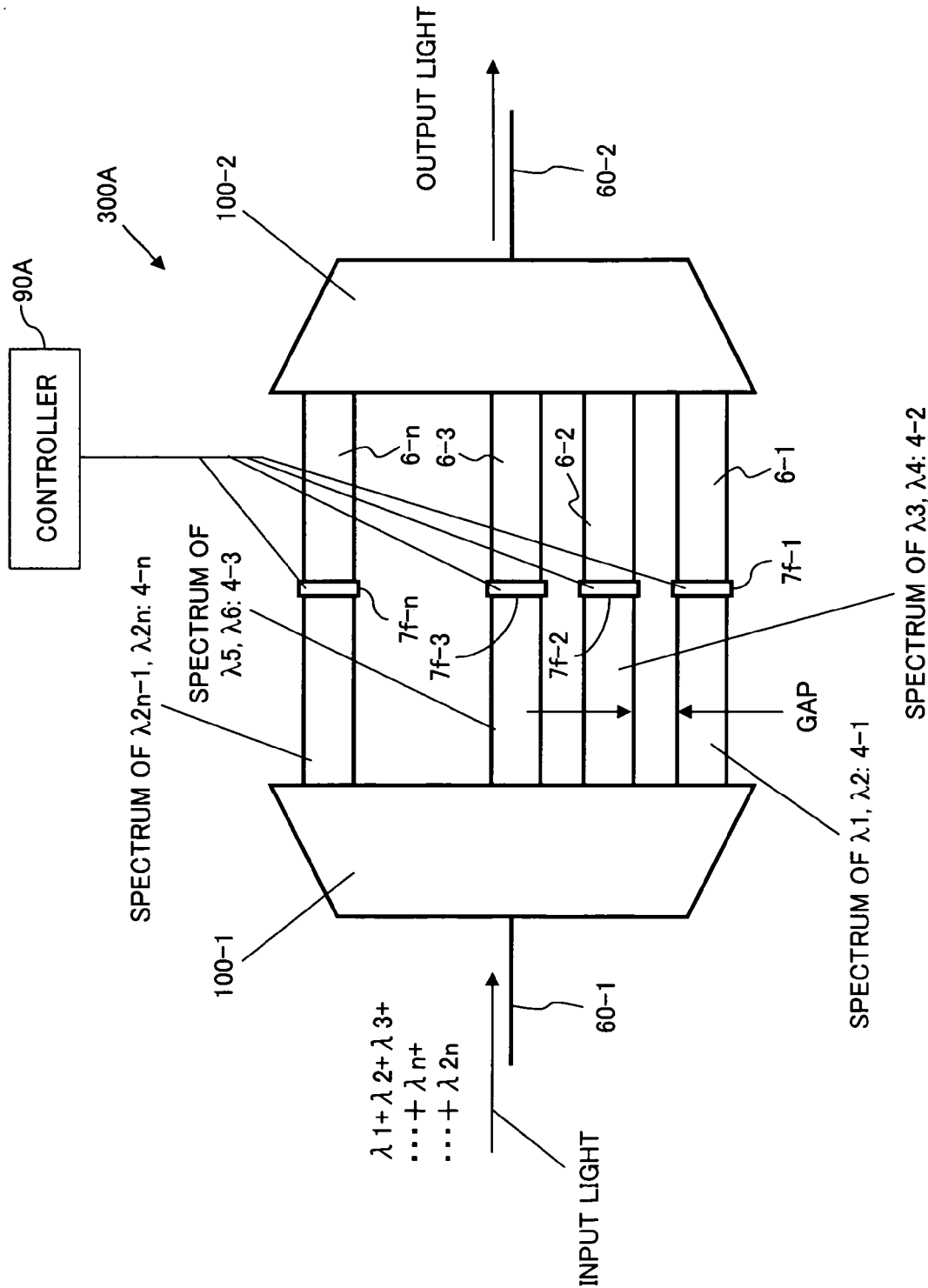
FIG. 37 shows an optical device according to a modification of the third embodiment of the present invention.

FIG. 37 shows an optical device 300A according to a modification of the third embodiment of the present invention. The optical device 300A shown in FIG. 37 is, same as the above-described optical device 300 according to the third embodiment, configured as a device capable of controlling the optical power based on the wavelength component of the input light beam. The optical device 300 according to the third embodiment is a device of reflective type; the optical device 300A shown in FIG. 37 is a transmissive type.

That is, the optical device 300A includes optical modules 100-1 and 100-2, which have the same configuration in the case of the first embodiment (refer to reference numeral 100) and transmission light variable elements 7f-1 to 7f-n and a control section 90A. The optical device 300A is adapted so that the light beams input from the optical module 100-1 through the optical fiber 60-1 are controlled by the transmission light variable elements 7f-1 to 7f-n to guide to the optical module 100-2 (or, to the optical fiber 60-2) based on the wavelength component.

Here, the optical modules 100-1 and 100-2 are disposed so that the respectively second lenses 62 face to each other. Between the second lenses 62 of the optical module 100-1 and the optical module 100-2, a plurality of transmission light variable elements 7f-1 to 7f-n corresponding to the number of the second wavebands, which are the wavelength spectrum portions multiplexed by the optical module 100-1, that is, the number of the wavelength-separated light beams 6-1 to 6-n (n) are provided in parallel. That is, component elements (refer to reference numerals 1, 61, 2, 62) constituting the optical modules 100-1 and 100-2 are disposed so as to be symmetrically with respect to the transmission light variable elements 7f-1 to 7f-n, which are disposed in parallel.

The transmission light variable elements 7f-1 to 7f-n constitute optical elements for processing the light beams constituting wavelength spectrum portions, which are spatially multiplexed by the wavelength-to-spacial-position-converter 5 constituting optical modules 100-1 and 100-2. In particular, each of the transmission light variable elements 7f-1 to 7f-n is capable of varying the transmission light intensity of the light beams constituting the wavelength spectrum portions multiplexed by the wavelength spectrum multiplexing section 5 in the optical module 100-1. The transmission light variable elements 7f-1 to 7f-n may be constituted of, for example, a liquid crystal device 7ff shown in FIG. 38, or a transmission light variable element, which utilizes the electro-optic effect or magneto-optical effect, may be used.

Figure 38:
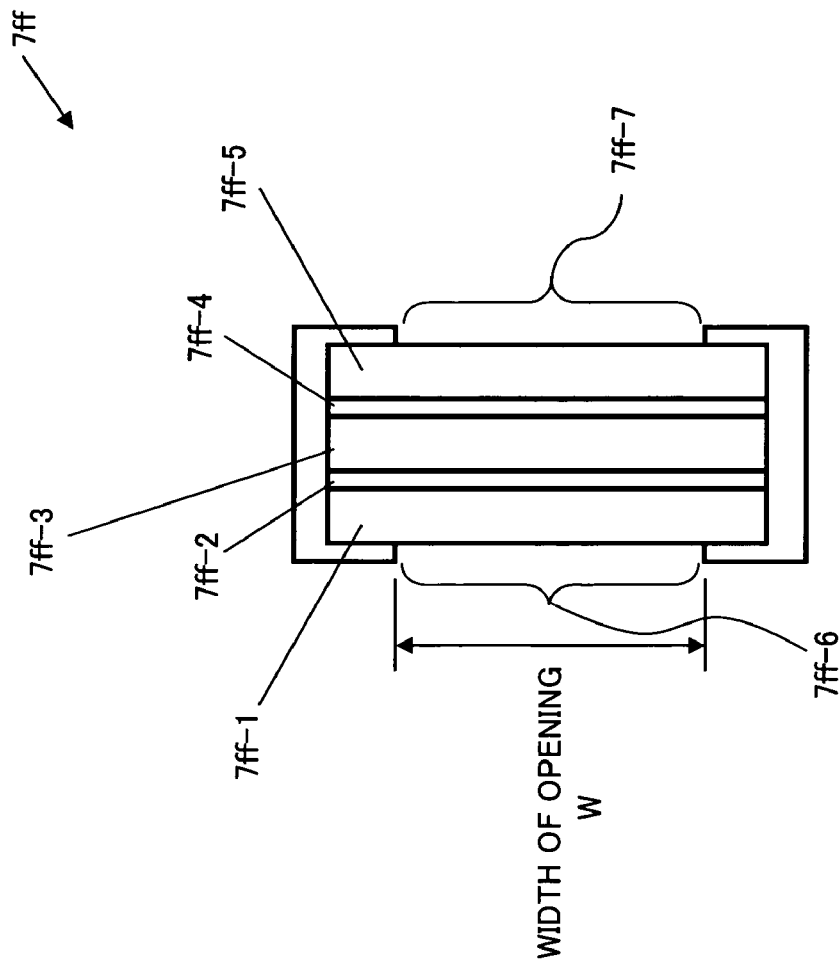
FIG. 38 shows a configuration of an essential portion of the optical device shown in FIG. 37.

The liquid crystal device 7ff shown in FIG. 38 is configured including a light polarizer 7ff-1, a transparent electrode 7ff-2, a liquid crystal layer 7ff-3, a transparent electrode 7ff-4 and an optical detector 7ff-5 being piled up. The light transmission of the light beams inputted to the light polarizer 7ff-1 constituting an opening 7ff-6 for receiving the light beams is changed by means of electrical control to the liquid crystal layer 7ff-3 through the transparent electrodes 7ff-2 and 7ff-4. It is adapted so that light beams, which have passed through the liquid crystal layer 7ff-3 and the optical detector 7ff-5, can be outputted through the opening 7ff-7.

That is, when the above-described liquid crystal devices 7ff are disposed as the transmission light variable elements 7f-1 to 7f-n, since the opening 7ff-6 of each of the liquid crystal devices 7ff has a limited opening width W, gaps G are formed between the liquid crystal devices 7ff as the transmission light variable elements 7f-1 to 7f-n. However, since the beam diameter of the wavelength-separated light beams 6-1 to 6-n can be made smaller than the opening width W of the liquid crystal devices 7ff as the transmission light variable elements 7f-1 to 7f-n, transmission of each of the wavelength-separated light beams 6-1 to 6-n is controlled to receive without loss.

The control section 90A shown in FIG. 37 supplies electrical control signals to the transparent electrodes 7ff-2 and 7ff-4 in the liquid crystal devices 7ff as the above-described transmission light variable elements 7f-1 to 7f-n. Owing to this, in the liquid crystal devices 7ff as the transmission light variable elements 7f-1 to 7f-n, the polarization rotation of a light beam from the light polarizer 7ff-1 is controlled by the liquid crystal layer 7ff-3, thus, the light intensity (that is, light intensity guided to the optical module 100-2), which is outputted through the optical detector 7ƒƒ-5 can be variably controlled.

In the optical device 300A configured as described above also, when a wavelength-division multiplexed light beam is inputted as an input light beam I to the optical module 100-1 through the optical fiber 60-1, the optical module 100-1 outputs wavelength-separated light beams 6-1 to 6-n. Each of the transmission light variable element 7ƒ-1 to 7ƒ-n receives the wavelength-separated light beams 6-1 to 6-n respectively without loss and under the control of the control section 90A, the light intensity of the light beams outputted to the optical module 100-2 side is changed.

The optical module 100-2 carries out wavelength-division multiplex on the light beams from the transmission light variable elements 7ƒ-1 to 7ƒ-n through the second lens 62, the diffraction grating 2 and the first lens 61 (refer to the configuration of the optical device 100 shown in FIG. 1) constituting the optical module 100-2 and outputs the beam through the optical fiber 60-2.

As described above, the optical device 300A according to the modification of the third embodiment of the present invention includes, in addition to the light dividing section 1 and the wavelength-to-spacial-position-converter 5, the transmission light variable elements 7ƒ-1 to 7ƒ-n. Accordingly, same as the above-described third embodiment, an optical power control with a small power error due to fluctuation of wavelength can be carried out.

In the optical device 300 (refer to FIG. 36), which has the same function as that of the optical device 300A, which has the configuration of transmissive type shown in FIG. 37, it is understood that the above-described first and second optical modules 100-1 and 100-2 commonly have the configuration as the optical module 100'.

[C-3] Others

In the optical device 300 or the modified device 300A according to the above-described third embodiment also, the optical module 100', 100-1, 100-2 may be appropriately modified and carried out with the substantially same purpose described in detail in [A-3] of the first embodiment.

[D] Description of Fourth Embodiment

[D-1] Configuration

Figure 39:
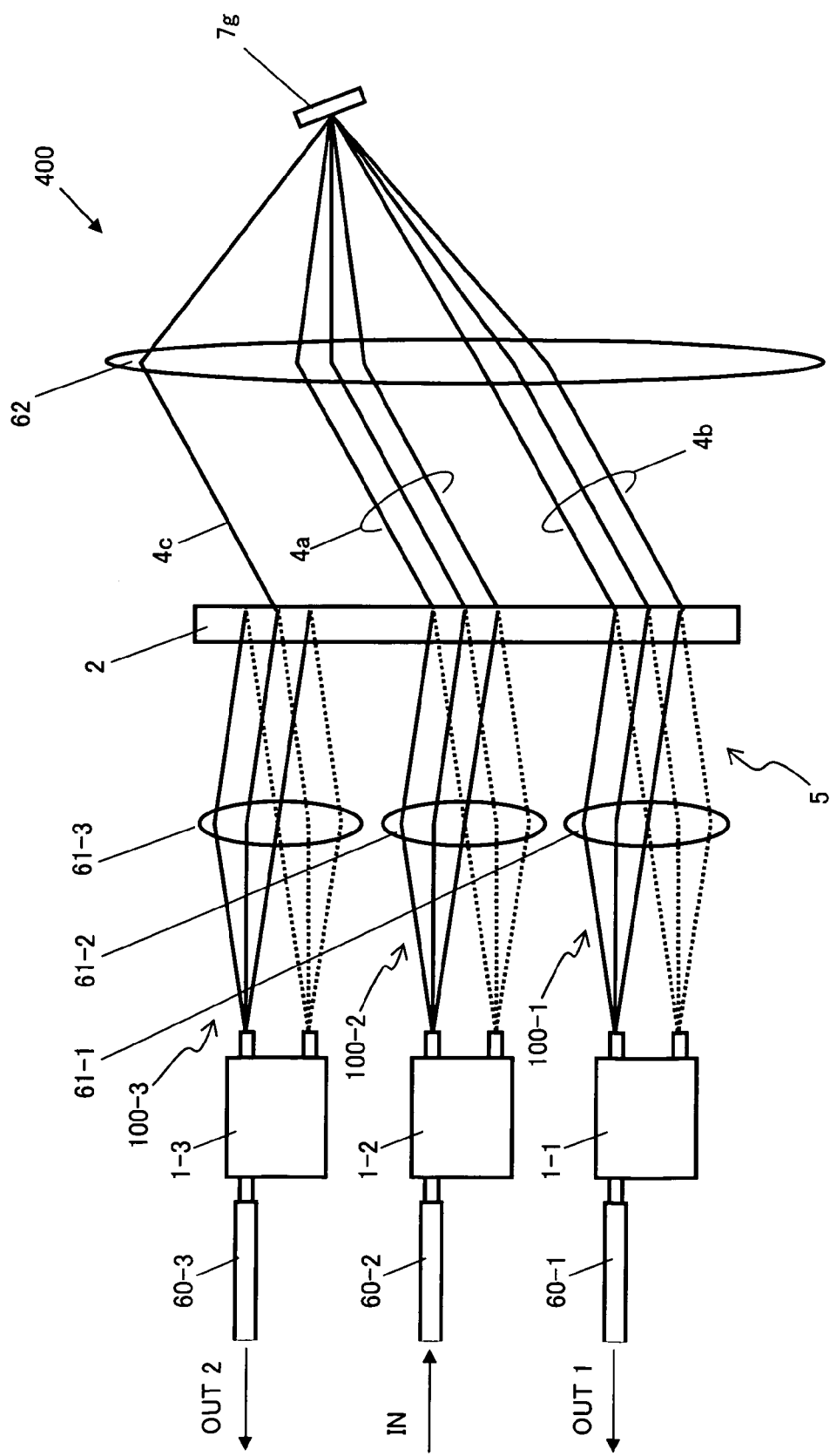
FIG. 39 shows an optical device according to a fourth embodiment of the present invention.

FIG. 39 shows an optical device 400 according to a fourth embodiment of the present invention. The optical device 400 according to the fourth embodiment includes optical modules 100-1 to 100-3 disposed in parallel, which have the same configuration as that of the above-described optical device 100 according to the first embodiment. On the light path of the wavelength-separated light beams outputted from the optical module 100-3, a plurality of mirrors 7g as reflecting members are disposed in parallel corresponding to the number (3n) of wavelength-separated light beams 6-1 to 6-n outputted from each of the optical modules 100-1 to 100-3.

That is, in addition to light dividing sections 1-1 to 1-3 and a first lenses 61-1 to 61-3, which are the same as the above-described optical device 100, each of the optical modules 100-1 to 100-3 includes a diffraction grating 2 and a second lens 62, which are integrally formed respectively.

The optical modules 100-1 to 100-3 are connected to the optical fibers 60-1 to 60-3 respectively. The optical modules 100-1 to 100-3 are adapted to, for example, divide light beam inputted from the optical fiber 60-2 based on the wavelength and output the light beams to the optical fiber 60-1 or the optical fiber 60-3 based on the wavelength. Owing to this, a function as a wavelength selection switch can be achieved.

As described above, the mirrors 7g are provided corresponding to the number of second wavebands constituting the multiplexed wavelength spectrum portions in which the light beams constituting wavelength spectrum portions, which are spatially multiplexed by the wavelength-to-spacial-position-converter 5 constituting each of the optical modules 100-1 to 100-3; i.e., the number (3n) of the wavelength-separated light beams which can be outputted from the optical modules 100-1 to 100-3.

Each of the mirrors 7g is configured as a minute mirror capable of rotating in the direction parallel to the drawing of FIG. 39 around an axis perpendicular to the drawing of FIG. 39 as the center. Each of the mirrors 7g is adapted so as to change the inclination angle of the surface, which reflects the wavelength-separated light beam outputted from one optical module (in the case of FIG. 39, optical module 100-2). Thereby, light beams are guided to the wavelength-to-spacial-position-converter 5 constituting the other optical modules (in the case of FIG. 39, optical modules 100-1 and 100-3).

A control section 90B (not shown) controls the inclination angle of the reflection plane of the mirrors 7g separately, which are disposed in parallel as described above. Owing to this, it is adapted to switch over selectively between the optical fibers 60-1 to 60-3 to which the reflected wavelength-separated light beam should be outputted. For example, when the control section 90B controls the inclination angle of a mirror 7g that reflects the wavelength-separated light beams 4a, which are outputted from the optical module 100-2, the wavelength-separated light beams 4a can be reflected as the reflected light beams 4b to be coupled with the optical module 100-1; or the reflected light beam 4c to be coupled with the optical module 100-3.

As described above, it is arranged so that the wavelength-separated light beams, which are guided to the other wavelength spectrum multiplexing sections 5, are subject to the wavelength-division multiplex respectively by the other optical modules 100-1 and 100-3, and outputted as wavelength-division multiplexed light beams through the optical fibers 60-1 and 60-3.

By employing, for example, a transmissive diffraction grating of 1 μm pitch as the diffraction grating 2 and a condenser with focal distance approximately 95 mm as the second lens 62, and by setting clearance between the ports s1 and s2 of the light dividing sections 1-1 to 1-3 to approximately 14 μm and the focal distance of the first lenses 61-1 to 61-3 to approximately 27 mm, the light beam inputted from the optical module 60-2 is divided based on the wavelength including 0.8 nm (100 GHz) clearances.

Owing to this, assuming that the width of the mirrors 7g is approximately 70 μm, by disposing the mirrors at 100 μm pitch in an array configuration, a wavelength selection switch that outputs to the optical fiber 60-1 or optical fiber 60-3 based on the wavelength can be configured.

[D-2] Working-effect

In the optical device 400 configured as described above, for example, the wavelength-division multiplexed light beam as the input light beam inputted through the optical fiber 60-2 is divided by the optical module 100-2 based on the wavelength, and outputted as a plurality of wavelength-separated light beams including clearances. The mirrors 7g reflect the wavelength-separated light beams outputted from the optical module 60-2 at an inclination angle of the reflection plane, which is set up by the control section 90B based on the waveband, thereby the wavelength-separated light beams are selectively switched between the optical fibers 60-1 and 60-3 based on the wavelength component.

That is, by switching over the inclination angle of the reflection plane of the mirrors 7g, the wavelength-separated light beams 4a, which are divided by the optical module 100-2 based on the wavelength, are optically coupled with the optical module 100-1 or the optical module 100-3 in the inverse direction; thus, the wavelength-separated light beams are outputted through the optical fiber 60-1 or the optical fiber 60-3.

As described above, since the optical device 400 according to the fourth embodiment of the present invention is equipped with the optical modules 100-1 to 100-3 and the mirrors 7g, in addition to the same advantage as that in the above-described first embodiment, a wavelength selection switch with flat loss characteristics in wavelength component is obtained.

In the optical device 400 according to the fourth embodiment also, the optical modules 100-1 to 100-3 may be appropriately modified and carried out with the substantially same purpose described in detail in [A-3] of the above described first embodiment.

What is claimed is:

1. An optical device, comprising:
   a light dividing section capable of dividing a light beam having a first waveband into a plurality of second waveband; and
   a wavelength-to-spatial-position-converter capable of converting said light beams having a first waveband and second wavebands into spatially spread light beams; wherein
   said light beam having a first waveband is a channel waveband of wavelength division multiplexing optical transport system;
   said spatially spread light beams are spread so that the spatially position occupied by a component of said spread light beams and a wavelength component of said light beams are correlated, and spatially width occupied by a light beam is proportional to the width of the wavelength range included said light beam; and
   said light dividing section and said wavelength-to-spatial-position-converter are arranged so that sum of the spatially width occupied by said a plurality of light beam having second wavebands are narrower than the spatially width occupied by said light beam having a first waveband.

2. The optical device according to claim 1, wherein said light dividing section is comprised of a flat optical circuit.

3. The optical device according to claim 2, wherein said flat optical circuit is comprised of an asymmetric Mach-Zehnder interferometer.

4. The optical device according to claim 2, wherein said flat optical circuit is comprised of a plurality of asymmetric Mach-Zehnder interferometers being connected to each other in series, which determines phase of interfering light beam and have two branch guides of which length is different from each other.

5. The optical device according to claim 2, wherein said flat optical circuit is comprised of an array guide grating.

6. The optical device according to claim 1, wherein said wavelength-to-spatial-converter includes an optical diffraction section of which diffraction direction changes depending on both inputting method and the light wavelength of the light beam, and
   said optical diffraction section is arranged so that said plurality of divided light beams from said light dividing section are diffracted thereby the light beams in which each of the wavelength spectrum portions is spatially multiplexed and outputted therefrom.

7. The optical device according to claim 6, wherein said optical diffraction section is formed as an incident-angle dependent light diffraction section in which, as said inputting method of the light beam, the diffraction direction changes depending on the incident angle of the light beam, and
   arranged so as to output the light beams, in which, owing to the diffraction in said incident-angle dependent light diffraction section, each of the wavelength spectrum portions with respect to said plurality of divided light beams from said light dividing section is spatially multiplexed.

8. The optical device according to claim 7, wherein said incident-angle dependent light diffraction section includes:
   a diffraction grating, which is formed in a substantially flat plate shape having two primary faces, for causing the diffraction direction to change depending on the incident angle of the light beam with respect to the primary face under the wavelength of the incident light being fixed, and
   a first lens for guiding the plurality of divided light beams from said light dividing section to said diffraction grating at an incident angle arranged for each of said plurality of divided light beams.

9. The optical device according to claim 8, wherein said diffraction grating is comprised of a ruled diffraction grating.

10. The optical device according to claim 6, wherein said optical diffraction section constituting said wavelength-to-spatial-position-converter is formed as an incident-position dependent light diffraction section in which, as said light inputting method, the diffraction direction changes depending on the incident-position of the light beam, and
    arranged so as to output the light beams, in which, owing to the diffraction in said incident-position dependent light diffraction section, each of the wavelength spectrum portions with respect to said plurality of divided light beams from the light dividing section is spatially multiplexed.

11. The optical device according to claim 10, wherein the incident-position dependent light diffraction section is comprised of a flat light guide device, which includes a flat substrate and is comprised of a clad formed on said substrate and a core having a refractive index higher than that of the clad, and
    the pattern of said core comprises:
    an input light guide pattern portion comprised of a plurality of guide patterns formed corresponding to the number of said divided light beams, of which core section is exposed at the end surface position to which a plurality of divided light beams spatially divided by said light dividing section is guided;
    an input slab pattern portion of which one end is formed continuously with said input light guide pattern portion so as to allow the light beams from said input light guide pattern portion to propagate freely while spreading being diffracted, and the other end thereof has an arc pattern around the portion continuing with the input light guide pattern portion; and
    a channel guide pattern portion comprised of a plurality of guide patterns disposed in parallel, which continues with the other end of said input slab pattern portion so that the length thereof changes sequentially, and
    the end portion opposite to said input slab pattern portion in said channel guide pattern portion is arranged so as to be disposed linearly at predetermined clearance with the core section being exposed so that the light beams of which diffraction direction is changed are output from said core section in said channel guide pattern portion.

12. The optical device according to claim 10, wherein said incident-position dependent optical circuit is comprised of a flat light guide device, which includes a flat substrate and is comprised of a clad formed on the substrate and a core having a refractive index higher than that of the clad, and the pattern of said core comprises:

an input light guide pattern portion comprised of a plurality of guide patterns formed corresponding to the number of said divided light beams, of which core section is exposed at the end surface position to which a plurality of divided light beams spatially divided by said light dividing section is guided;

an input slab pattern portion of which one end is formed continuously with said input light guide pattern portion so as to allow the light beam from said input light guide pattern portion to propagate freely while spreading being diffracted, and the other end thereof has an arc pattern;

an output guide pattern portion comprised of a plurality of guide patterns of which core section is exposed at the output end face;

an output slab pattern portion of which one end is formed continuously with said output light guide pattern portion so as to allow the light beam from said output light guide pattern portion to propagate freely while spreading being diffracted, and the other end thereof has an arc pattern; and a channel guide pattern portion which connects the arc pattern portion of said input slab pattern portion and the arc pattern portion of said output slab pattern portion and is comprised of a plurality of guide patterns disposed in parallel so that the length thereof changes sequentially, and said plurality of divided light beams are input to said input light guide pattern portion and the light beams in which each of the wavelength spectrum portions with respect to said plurality of divided light beams from said light dividing section is multiplexed through said output guide pattern portion is outputted therefrom.

13. The optical device according to claim 12, wherein a portion for containing a gas is formed between a plurality of guide patterns constituting said output guide pattern portion.

14. The optical device according to claim 13, wherein a groove is formed between a plurality of guide patterns constituting said output guide pattern portion.

15. The optical device according to claim 13, wherein a plurality of cores as the guide patterns constituting said output guide pattern portions is exposed.

16. The optical device according to claim 12, wherein a void is embedded in the clad between a plurality of guide patterns constituting said output guide pattern portion.

17. The optical device according to claim 12, wherein the portion constituting said output guide pattern portion is formed in an element separately from the other portion constituting said flat light guide device, and the separate element is connected being bonded to said other portion.

18. The optical device according to claim 1, wherein each of said divided light beams include a plurality of the wavelength spectrum portions each of which has a bandwidth of second waveband and is distributed at interval of a first waveband, and the first waveband is allotted in accordance with the second waveband.

19. The optical device according to claim 18, wherein said wavelength-to-spatial-position converter is arranged so as to output the light beams which are the result of said spatially multiplexing of the wavelength spectrum portions, as a plurality of wavelength-separated light beams provided with spatial clearance.

20. An optical device, comprising:

a light dividing section capable of dividing wavelength spectrum in input light and outputting a plurality of divided light beams spatially separated from each other, each having a wavelength spectrum portion different from each other, and a wavelength spectrum portion multiplexing section capable of spatially multiplexing the wavelength spectrum portions with respect to said plurality of divided light beams from said light dividing section, wherein:

each of said divided light beams include a plurality of the wavelength spectrum portions each of which has a bandwidth of second waveband and is distributed at interval of a first waveband, and the first waveband is allotted in accordance with the second waveband;

said wavelength spectrum portion multiplexing section is arranged so as to output the light beams which are the result of said spatially multiplexing of the wavelength spectrum portions, with providing spatial clearance corresponding to the number of the second wavebands; and a plurality of optical elements for processing the light beams constituting said wavelength spectrum portions spatially multiplexed by said wavelength spectrum portion multiplexing section is provided corresponding to the number of the second wavebands constituting said multiplexed wavelength spectrum portions.

21. The optical device according to claim 20, wherein the optical device further comprises a clearance-adjusting element capable of adjusting the spatial clearance between the light beams outputted from said wavelength spectrum multiplexing section.

22. The optical device according to claim 21, wherein said clearance-adjusting element is comprised of a lens disposed behind said wavelength spectrum multiplexing section.

23. The optical device according to claim 21, wherein said clearance-adjusting element is comprised of a light guide device disposed behind said wavelength spectrum multiplexing section.

24. The optical device according to claim 20, wherein said optical element is comprised of a light-reflecting element capable of reflecting the light beams constituting wavelength spectrum portions multiplexed by said wavelength spectrum portion multiplexing section and varying the inclination angle with respect to said reflecting surface.

25. The optical device according to claim 20, wherein said optical element is comprised of a transmission light variable element capable of varying transmission light intensity with respect to the light beams constituting wavelength spectrum portions multiplexed by said wavelength spectrum portion multiplexing section.

26. The optical device according to claim 20, wherein said optical element is comprised of a photoelectric transfer element for performing photoelectric transfer with respect to the light beams constituting wavelength spectrum portions multiplexed by said wavelength spectrum multiplexing section.

27. An optical device, comprising:

a first and a second optical modules, each of which includes a light dividing section capable of dividing wavelength spectrum in input light and outputting a plurality of divided light beams spatially separated from each other, each having a wavelength spectrum portion different from each other, and a wavelength spectrum portion multiplexing section capable of spatially multiplexing the wavelength spectrum portions with respect to said plurality of divided light beams from said light dividing section, disposed being faced to each other so that the divided light beams outputted from said wavelength spectrum portion multiplexing section in one of the first and second optical modules are optically connected to the other wavelength spectrum portion multiplexing section, wherein a plurality of the wavelength spectrum portions constituting each of said divided light beams with a bandwidth of a second waveband are included leaving a first waveband clearance, the first waveband in each of said divided light beams is allotted in accordance with the second waveband in said plurality of divided light beams, and the optical device further comprises:

a plurality of optical elements for processing the light beams constituting said wavelength spectrum portions, which are spatially multiplexed by said wavelength spectrum portion multiplexing section, is provided on light paths between said optically connected wavelength spectrum portion multiplexing sections corresponding to the number of the second wavebands constituting said multiplexed wavelength spectrum portion.

28. An optical device, comprising:

a plurality of optical modules each of which including a light dividing section capable of dividing wavelength spectrum in input light and outputting a plurality of divided light beams spatially separated from each other, each having a wavelength spectrum portion different from each other, and a wavelength spectrum portion multiplexing section capable of spatially multiplexing the wavelength spectrum portions with respect to said plurality of divided light beams from said light dividing section, wherein a plurality of the wavelength spectrum portions constituting each of said divided light beams with a bandwidth of a second waveband are included leaving a first waveband clearance, the first waveband in each of said divided light beams is allotted in accordance with the second waveband in said plurality of divided light beams, and the optical device further comprises:

a plurality of reflecting members, which are capable of reflecting the light beams constituting said wavelength spectrum portions spatially multiplexed by said wavelength spectrum portion multiplexing section constituting each of the optical modules corresponding to the number of the second wavebands constituting said multiplexed wavelength spectrum portion and varying the inclination angle of said reflecting surface, are provided; wherein the plurality of reflecting members are arranged so as to vary the inclination angle with respect to said reflecting surface so that light beams constituting wavelength spectrum portions from said wavelength spectrum portion multiplexing section constituting one optical module are guided to wavelength spectrum portion multiplexing section constituting the other optical module.

29. A light control method, comprising:

dividing an input first light beam having a plurality of first wavebands into a plurality of second light beams having a plurality of second wavebands, each of the plurality of second wavebands being divided from one of the plurality of first wavebands and having wavelength spectrum positions that are different from each other;

spatially spreading each of the plurality of second light beams and bundling the second wavebands spread from the plurality of second light beams in a unit of one of the first wavebands corresponding thereto; and processing a light of the second wavebands bundles in one optical element.

30. The optical device according to claim 1, wherein a wavelength spectrum of the input light corresponds to a wavelength spectrum of single channel in Wavelengh Division Multiplexing.

31. An optical device comprising a light dividing means which spatially divides optical waveband to first spatial wavebands and second spatial wavebands, which are formed to divide said first waveband to a plurality of spectral components, so as to occupy certain spatial widths correspondent to these spectral distributions; wherein said first wavebands have center optical frequencies of substantially uniform frequency difference between adjacent wavebands and spatially disposed substantially at an uniform space, and spatial widths occupied by one of said first wavebands (I1) is wider than the sum of spatial width occupied by all second wavebands (I2) created from one of said first waveband.

32. An optical device comprising;

a first light dividing means which spectoroscopically divides plurality of first wavebands (I1) to a plurality of second wavebands (I2) so as to spectoroscopically divide each of said first waveband to a plurality of spectral waveband component correspondent to said a plurality of second waveband, and a second light dividing means which spatially divides said a plurality of second waveband so as to occupy certain spatial widths correspondent to these spectral distributions, wherein said first wavebands have center optical frequencies of substantially uniform frequency difference between adjacent wavebands, and by the cooperation of said first light dividing means and said second light dividing means, said first wavebands and said second wavebands are spatially divided as the manner of that spatial widths occupied by one of said first wavebands (I1) is wider than the sum of spatial width occupied by said a plurality of waveband component correspondent to said second wavebands (I2).

33. A light control method, comprising the steps of:

dividing each first wavebands having center optical frequency of substantially uniform frequency difference between adjacent wavebands to a plurality of second wavebands having substantially same wavelength bandwidth, dividing each said first waveband and said second waveband spatially as the manner of that said first waveband are disposed in a straight line at substantially uniform first space correspondent to said center frequency difference of said first wavebands, and simultaneously said a plurality of second waveband are disposed in a strait line so as that spatial width occupied said first space is wider than the sum of spatial width occupied said a plurality of second waveband.

* * * * *